(12) United States Patent
Tsumori et al.

(10) Patent No.: US 9,932,460 B2
(45) Date of Patent: Apr. 3, 2018

(54) RUBBER COMPOSITION AND PNEUMATIC TIRE

(75) Inventors: Isamu Tsumori, Kobe (JP); Kenichi Uesaka, Kobe (JP); Naoya Omura, Kobe (JP); Tetsuya Kunisawa, Kobe (JP); Tatsuhiro Tanaka, Kobe (JP); Kazuyuki Nishioka, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 270 days.

(21) Appl. No.: 14/002,881

(22) PCT Filed: Apr. 20, 2012

(86) PCT No.: PCT/JP2012/060658
§ 371 (c)(1),
(2), (4) Date: Sep. 3, 2013

(87) PCT Pub. No.: WO2012/144577
PCT Pub. Date: Oct. 26, 2012

(65) Prior Publication Data
US 2013/0345337 A1 Dec. 26, 2013

(30) Foreign Application Priority Data

| Apr. 22, 2011 | (JP) | 2011-096565 |
| May 23, 2011 | (JP) | 2011-115058 |
| May 23, 2011 | (JP) | 2011-115059 |
| Jun. 8, 2011 | (JP) | 2011-128471 |
| Jul. 5, 2011 | (JP) | 2011-149416 |

(51) Int. Cl.
*C08K 3/36* (2006.01)
*B60C 1/00* (2006.01)
*C08C 19/44* (2006.01)

(52) U.S. Cl.
CPC .............. *C08K 3/36* (2013.01); *B60C 1/0016* (2013.01); *C08C 19/44* (2013.01); *Y02T 10/862* (2013.01)

(58) Field of Classification Search
CPC ......... B60C 1/0016; C08C 19/44; C08K 3/36; C08L 15/00; Y02T 10/862
See application file for complete search history.

(56) References Cited

U.S. PATENT DOCUMENTS

| 3,937,681 | A | * | 2/1976 | Nordsiek | ................ | 524/571 |
| 4,836,262 | A | * | 6/1989 | Nishizawa et al. | ............ | 152/451 |
| 5,087,668 | A | * | 2/1992 | Standstrom | ............... | C08L 7/00 152/905 |
| 5,189,109 | A | | 2/1993 | Imai et al. | | |
| 6,147,178 | A | | 11/2000 | Nakamura et al. | | |
| 6,294,624 | B1 | | 9/2001 | Inoue et al. | | |
| 6,590,017 | B1 | | 7/2003 | Hergenrother et al. | | |
| 2002/0011293 | A1 | | 1/2002 | Zanzig et al. | | |
| 2004/0152845 | A1 | | 8/2004 | Oshima et al. | | |
| 2004/0254301 | A1 | | 12/2004 | Tsukimawashi et al. | | |
| 2005/0119399 | A1 | | 6/2005 | Nishioka et al. | | |
| 2005/0209390 | A1 | | 9/2005 | Yagi et al. | | |
| 2005/0272852 | A1 | | 12/2005 | Sandstrom et al. | | |
| 2006/0173118 | A1 | | 8/2006 | Hochi et al. | | |
| 2007/0123636 | A1 | | 5/2007 | Hattori et al. | | |
| 2007/0149688 | A1 | | 6/2007 | Hochi | | |
| 2007/0167557 | A1 | | 7/2007 | Dumke et al. | | |
| 2008/0027166 | A1 | | 1/2008 | Hochi et al. | | |
| 2009/0176910 | A1 | | 7/2009 | Anbe et al. | | |
| 2009/0247692 | A1 | | 10/2009 | Oshima et al. | | |

(Continued)

FOREIGN PATENT DOCUMENTS

| CN | 1578790 A | 2/2005 |
| CN | 1670062 A | 9/2005 |

(Continued)

OTHER PUBLICATIONS

"Standard Test Method for Precipitated Silica-Surface Area by Multipoint BET Nitrogen Adsorption", pp. 1-2, obtained online from: http://www.astm.org/Standards/D1993.htm.*
English translation of JP 05-214170, pp. 1-9.*
Non-Final Office Action dated Mar. 5, 2015, in U.S. Appl. No. 13/982,160.
International Search Report for International Application No. PCT/JP2012/060658 dated Jul. 24, 2012.
United States Final Office Action for copending U.S. Appl. No. 13/700,300 dated Aug. 4, 2014.
United States Final Office Action for copending U.S. Appl. No. 13/700,300 dated Oct. 22, 2014.

(Continued)

*Primary Examiner* — Alexander Kollias
(74) *Attorney, Agent, or Firm* — Birch, Stewart, Kolasch & Birch, LLP

(57) ABSTRACT

The present invention provides a rubber composition that can enhance the fuel economy, wet-grip performance, and abrasion resistance in a balanced manner, and a pneumatic tire using this rubber composition. The present invention relates to a rubber composition that contains a rubber component, silica, and a liquid resin having a softening point of −20 to 20° C., wherein the rubber component contains, based on 100% by mass of the rubber component, not less than 5% by mass of a conjugated diene polymer containing a constituent unit based on a conjugated diene and a constituent unit represented by formula (I) below, at least one terminal of the polymer being modified with a specific compound; and an amount of the silica is 5 to 150 parts by mass per 100 parts by mass of the rubber component.

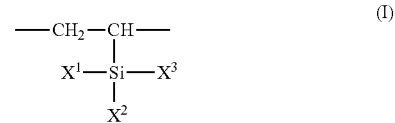

(I)

6 Claims, No Drawings

(56) References Cited

U.S. PATENT DOCUMENTS

| | | | |
|---|---|---|---|
| 2010/0056703 A1 | 3/2010 | Oshima | |
| 2010/0056709 A1 | 3/2010 | Oshima | |
| 2010/0056710 A1 | 3/2010 | Oshima | |
| 2010/0056712 A1 | 3/2010 | Oshima | |
| 2010/0056713 A1* | 3/2010 | Oshima | 524/572 |
| 2010/0099795 A1 | 4/2010 | Uesaka | |
| 2010/0108213 A1 | 5/2010 | Miyazaki | |
| 2010/0113683 A1 | 5/2010 | Matsumoto et al. | |
| 2010/0144954 A1 | 6/2010 | Kikuchi et al. | |
| 2010/0184908 A1 | 7/2010 | Kikuchi et al. | |
| 2012/0016056 A1* | 1/2012 | Miyazaki | 523/156 |
| 2012/0149806 A1 | 6/2012 | Kondo et al. | |

FOREIGN PATENT DOCUMENTS

| | | |
|---|---|---|
| CN | 1821293 A | 8/2006 |
| CN | 101360784 A | 2/2009 |
| CN | 101659728 A | 3/2010 |
| CN | 101659729 A | 3/2010 |
| CN | 101659731 A | 3/2010 |
| CN | 101659732 A | 3/2010 |
| CN | 101671418 A | 3/2010 |
| EP | 0042481 A1 | 12/1981 |
| EP | 0493364 A2 | 7/1992 |
| EP | 1 075 967 A1 | 2/2001 |
| EP | 2 062 620 A1 | 5/2009 |
| EP | 2 098 564 A | 9/2009 |
| EP | 2196324 A1 | 6/2010 |
| JP | 1-217047 A | 8/1989 |
| JP | 04-077536 A | 3/1992 |
| JP | 5-214170 A | 8/1993 |
| JP | 2000-344955 A | 12/2000 |
| JP | 2003-192842 A | 7/2003 |
| JP | 2003-533574 A | 11/2003 |
| JP | 2005-213486 A | 8/2005 |
| JP | 2005-263956 A | 9/2005 |
| JP | 2006-233177 A | 9/2006 |
| JP | 2007-177209 A | 7/2007 |
| JP | 2007-197671 A | 8/2007 |
| JP | 2008-50570 A | 3/2008 |
| JP | 2008-101127 A | 5/2008 |
| JP | 2008-150435 A | 7/2008 |
| JP | 2008-280438 A | 11/2008 |
| JP | 2009-91482 A | 4/2009 |
| JP | 2009-114262 A | 5/2009 |
| JP | 2009-126907 A | 6/2009 |
| JP | 2010-077412 A | 4/2010 |
| JP | 2010-077413 A | 4/2010 |
| JP | 2010-077414 A | 4/2010 |
| JP | 2010-077415 A | 4/2010 |
| JP | 2010-116556 A | 5/2010 |
| JP | 2010-215832 A | 9/2010 |
| JP | 2010-270292 A | 12/2010 |
| WO | WO 2007/081018 A1 | 7/2007 |

OTHER PUBLICATIONS

United States Office Action for copending U.S. Appl. No. 14/005,781 dated Aug. 29, 2014.
Heisler, "Advanced Vehicle Technology", Elsevier, 2nd edition, 2002, pp. 281-282.
International Search Report for International Application No. PCT/JP2011/066689 dated on Aug. 16, 2011.
International Search Report for International Application No. PCT/JP2012/057498 dated Jun. 19, 2012.
International Search Report for International Application No. PCT/JP2012/060342 dated Jul. 17, 2012.
International Search Report for International Application No. PCT/JP2012/061345 dated Aug. 7, 2012 (with English translation).
Machine English translation for JP-2010-77412-A dated Apr. 8, 2010.
United States Office Action for copending U.S. Appl. No. 13/700,300 dated Mar. 20, 2014.
Full English machine translation for JP-2005-213486-A dated Aug. 11, 2005.
Full English machine translation for JP-2007-177209-A dated Jul. 12, 2007.
International Search Report (Form PCT/ISA/210) for International Application No. PCT/JP2011/066700, dated Oct. 18, 2011.
U.S. Office Action for U.S. Appl. No. 13/323,426, dated Dec. 24, 2013.
U.S. Office Action for U.S. Appl. No. 13/323,426, dated Mar. 25, 2015.
U.S. Office Action for U.S. Appl. No. 13/323,426, dated May 2, 2014.
U.S. Office Action for U.S. Appl. No. 13/323,426, dated Oct. 27, 2014.
U.S. Office Action for U.S. Appl. No. 13/701,366, dated Mar. 23, 2015.

* cited by examiner

RUBBER COMPOSITION AND PNEUMATIC TIRE

TECHNICAL FIELD

The present invention relates to a rubber composition and a pneumatic tire produced using the rubber composition.

BACKGROUND ART

The demands on automobiles for better fuel economy have been increasing in recent years as concern with environmental issues has been rising. Good fuel economy is also being required of the rubber compositions used for automotive tires. For example, rubber compositions containing a conjugated diene polymer (e.g., polybutadiene, butadiene-styrene copolymer) and a filler (e.g., carbon black, silica) are used for the rubber compositions for automotive tires.

Patent Literature 1 and Patent Literature 2, for example, propose methods for enhancing the fuel economy. The method of Patent Literature 1 uses a diene rubber that has been modified with an organosilicon compound containing an amino group and an alkoxy group. The method of Patent Literature 2 uses a specific silane coupling agent containing a mercapto group. These days, however, further enhancement of the fuel economy has been demanded.

Other methods for enhancing fuel economy are known, such as reduction of the amount of a reinforcing filler or use of a silane coupling agent containing a mercapto group. In the former method, however, the hardness of the rubber composition is reduced such that a tire containing the rubber composition softens. Thus, the handling property (handling stability) or wet-grip performance of vehicles may be reduced. Also, the reinforcing property is not sufficiently achieved so that the abrasion resistance tends to decrease. The latter method tends to reduce the scorch time to deteriorate, the processability.

Normal rubber compositions for tires contain oils like aromatic oil to enhance the processability or wet-grip performance. However, addition of such oils tends to increase the rolling resistance or reduce the fuel economy.

As mentioned earlier, fuel economy assumes an inverse relationship with such properties as wet-grip performance or abrasion resistance. Thus, it has been difficult to obtain these properties at high levels in a balanced manner.

CITATION LIST

Patent Literature

Patent Literature 1: JP 2000-344955 A
Patent Literature 2: JP 2009-126907 A

SUMMARY OF INVENTION

Technical Problem

An object of the present invention is to solve the problems identified above by providing a rubber composition that provides a well-balanced enhancement of fuel economy, wet-grip performance, and abrasion resistance, and by providing a pneumatic tire produced using the rubber composition.

Solution to Problem

The present invention relates to a rubber composition, including a rubber component, silica, and a liquid resin having a softening point of −20 to 20° C.,
wherein the rubber component contains, based on 100% by mass of the rubber component, not less than 5% by mass of a conjugated diene polymer containing a constituent unit based on a conjugated diene and a constituent unit represented by formula (I) below, at least one terminal of the polymer being modified with at least one compound selected from the group consisting of a compound represented by formula (II) below, a compound containing a group represented by formula (III) below, a compound represented by formula (IV) below, a silicon compound containing at least one of a group represented by formula (V) below and a group represented by formula (VI) below, and a compound containing a group represented by formula (VII) below, and an amount of the silica is 5 to 150 parts by mass per 100 parts by mass of the rubber component,

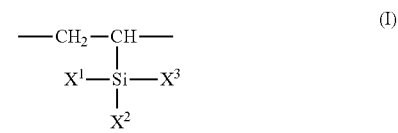

wherein $X^1$, $X^2$, and $X^3$ each independently represent a group represented by formula (Ia) below, a hydroxyl group, a hydrocarbyl group, or a substituted hydrocarbyl group, and at least one of $X^1$, $X^2$, and $X^3$ is a hydroxyl group or a group represented by the following formula (Ia):

wherein $R^1$ and $R^2$ each independently represent a $C_{1-6}$ hydrocarbyl group, a $C_{1-6}$ substituted hydrocarbyl group, a silyl group, or a substituted silyl group, and $R^1$ and $R^2$ may be bonded to each other to form a cyclic structure together with the nitrogen atom;

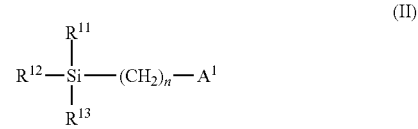

wherein n represents an integer of 1 to 10; $R^{11}$, $R^{12}$, and $R^{13}$ each independently represent a $C_{1-4}$ hydrocarbyl group or a $C_{1-4}$ hydrocarbyloxy group, and at least one of $R^{11}$, $R^{12}$, and $R^{13}$ is a hydrocarbyloxy group; and $A^1$ represents a nitrogen atom-bearing functional group;

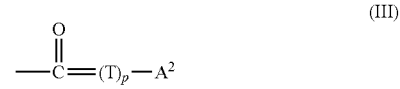

wherein p represents an integer of 0 or 1; T represents a $C_{1-20}$ hydrocarbylene group or a $C_{1-20}$ substituted hydrocarbylene group; and $A^2$ represents a nitrogen atom-bearing functional group;

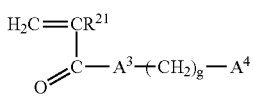 (IV)

wherein g represents an integer of 1 to 10; $R^{21}$ represents a hydrogen atom, a $C_{1-6}$ hydrocarbyl group, or a $C_{1-6}$ substituted hydrocarbyl group; $A^3$ represents an oxygen atom or the following group: —$NR^{22}$— where $R^{22}$ represents a hydrogen atom or a $C_{1-10}$ hydrocarbyl group; and $A^4$ represents a functional group bearing at least one of a nitrogen atom and an oxygen atom;

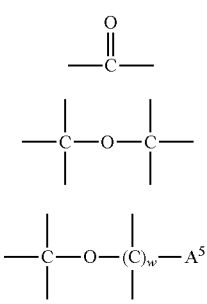

(V)

(VI)

(VII)

wherein w represents an integer of 1 to 11, and $A^5$ represents a nitrogen atom-bearing functional group.

$R^1$ and $R^2$ in formula (Ia) are preferably $C_{1-6}$ hydrocarbyl groups.

Two of $X^1$, $X^2$, and $X^3$ in formula (I) are preferably selected from a group represented by formula (Ia) and a hydroxyl group.

$A^1$ in formula (II) is preferably a group represented by the following formula (IIa):

 (IIa)

wherein $R^{14}$ and $R^{15}$ each independently represent a $C_{1-6}$ group optionally containing at least one atom selected from the group consisting of a nitrogen atom, an oxygen atom, and a silicon atom, $R^{14}$ and $R^{15}$ may be bonded to each other to form a cyclic structure together with the nitrogen atom, and $R^{14}$ and $R^{15}$ may form a single group bonded to the nitrogen via a double bond.

The group represented by formula (III) is preferably a group represented by the following formula (IIIa):

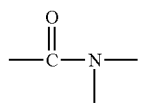 (IIIa)

The compound containing a group represented by formula (III) is preferably at least one compound selected from the group consisting of a compound represented by formula (IIIa-1) below, a compound represented by formula (IIIa-2) below, and a compound represented by formula (IIIa-3) below,

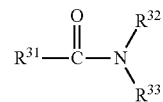 (IIIa-1)

wherein $R^{31}$ represents a hydrogen atom, a $C_{1-10}$ hydrocarbyl group, a $C_{1-10}$-substituted hydrocarbyl group, or a heterocyclic group containing at least one of a nitrogen atom and an oxygen atom as a heteroatom; and $R^{32}$ and $R^{33}$ each independently represent a $C_{1-10}$ group optionally containing at least one atom selected from the group consisting of a nitrogen atom, an oxygen atom, and a silicon atom, $R^{32}$ and $R^{33}$ may be bonded to each other to form a cyclic structure together with the nitrogen atom, and $R^{32}$ and $R^{33}$ may form a single group bonded to the nitrogen via a double bond;

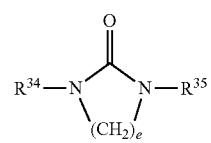 (IIIa-2)

wherein e represents an integer of 0 to 10, and $R^{34}$ and $R^{35}$ each independently represent a $C_{1-20}$ hydrocarbyl group or a $C_{1-20}$ substituted hydrocarbyl group;

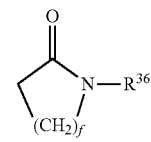 (IIIa-3)

wherein f represents an integer of 0 to 10, and $R^{36}$ represents a $C_{1-20}$ hydrocarbyl group or a $C_{1-20}$ substituted hydrocarbyl group.

The compound containing a group represented by formula (III) is preferably a compound represented by the following formula (IIIb-1):

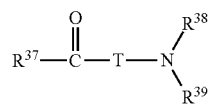 (IIIb-1)

wherein $R^{37}$ represents a hydrogen atom, a $C_{1-10}$ hydrocarbyl group, a $C_{1-10}$ substituted hydrocarbyl group, or a heterocyclic group containing at least one of a nitrogen atom and an oxygen atom as a heteroatom; $R^{38}$ and $R^{39}$ each independently represent a $C_{1-10}$ group optionally containing at least one atom selected from the group consisting of a nitrogen atom, an oxygen atom, and a silicon atom, $R^{38}$ and $R^{39}$ may be bonded to each other to form a cyclic structure together with the nitrogen atom, and $R^{38}$ and $R^{39}$ may form a single group bonded to the nitrogen via a double bond; and T represents a $C_{1-20}$ hydrocarbylene group or a $C_{1-20}$ substituted hydrocarbylene group.

The compound represented by formula (IIIb-1) is preferably at least one compound selected from the group consisting of a compound represented by formula (IIIb-1-1) below, and a compound represented by formula (IIIb-1-2) below,

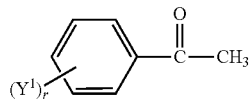

(IIIb-1-1)

wherein r represents an integer of 1 or 2; and $Y^1$ represents a nitrogen atom-bearing functional group that is a substituent on the benzene ring, and when a plurality of $Y^1$'s are present, the plurality of $Y^1$'s may be the same as or different from one another;

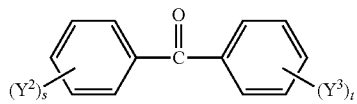

(IIIb-1-2)

wherein s represents an integer of 1 or 2; t represents an integer of 0 to 2; $Y^2$ and $Y^3$ each represent a nitrogen atom-bearing functional group that is a substituent on the benzene ring, and when a plurality of $Y^2$'s are present, the plurality of $Y^2$'s may be the same as or different from one another, and when a plurality of $Y^3$'s are present, the plurality of $Y^3$'s may be the same as or different from one another.

$A^4$ in formula (IV) is preferably a hydroxyl group or a group represented by the following formula (IVa):

(IVa)

wherein $R^{23}$ and $R^{24}$ each independently represent a $C_{1-6}$ group optionally containing at least one atom selected from the group consisting of a nitrogen atom, an oxygen atom, and a silicon atom, $R^{23}$ and $R^{24}$ may be bonded to each other to form a cyclic structure together with the nitrogen atom, and $R^{23}$ and $R^{24}$ may form a single group bonded to the nitrogen via a double bond.

The silicon compound preferably contains a group represented by the following formula (VIII):

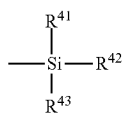

(VIII)

wherein $R^{41}$, $R^{42}$, and $R^{43}$ each independently represent a $C_{1-4}$ hydrocarbyl group or a $C_{1-4}$ hydrocarbyloxy group, and at least one of $R^{41}$, $R^{42}$, and $R^{43}$ is a hydrocarbyloxy group.

The silicon compound preferably contains a group represented by the following formula (Va):

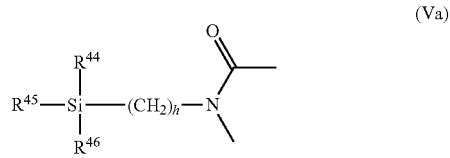

(Va)

wherein h represents an integer of 1 to 10, and $R^{44}$, $R^{45}$, and $R^{46}$ each independently represent a $C_{1-4}$ hydrocarbyl group or a $C_{1-4}$ hydrocarbyloxy group, and at least one of $R^{44}$, $R^{45}$, and $R^{46}$ is a hydrocarbyloxy group.

The compound containing a group represented by formula (VII) is preferably a compound represented by the following formula (VII-1):

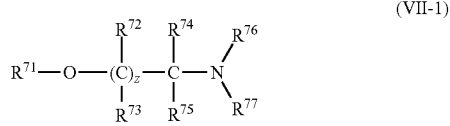

(VII-1)

wherein z represents an integer of 0 to 10; $R^{71}$ represents a $C_{1-5}$ hydrocarbyl group; $R^{72}$, $R^{73}$, $R^{74}$ and $R^{75}$ each independently represent a hydrogen atom, a $C_{1-5}$ hydrocarbyl group, a $C_{1-5}$ substituted hydrocarbyl group, or a $C_{1-5}$ hydrocarbyloxy group, and when a plurality of $R^{72}$'s and a plurality of $R^{73}$'s are present, the plurality of $R^{72}$'s and the plurality of $R^{73}$'s may be the same as or different from one another; and $R^{76}$ and $R^{77}$ each independently represent a $C_{1-6}$ group optionally containing at least one atom selected from the group consisting of a nitrogen atom, an oxygen atom, and a silicon atom, $R^{76}$ and $R^{77}$ may be bonded to each other to form a cyclic structure together with the nitrogen atom, and $R^{76}$ and $R^{77}$ may form a single group bonded to the nitrogen via a double bond.

One of $R^{74}$ and $R^{75}$ in formula (VII-1) is preferably a hydrogen atom.

The conjugated diene polymer preferably has a vinyl bond content of at least 10 mol % but not more than 80 mol % per 100 mol % of the constituent unit based on a conjugated diene.

Preferably, the rubber composition contains at least one of natural rubber and butadiene rubber.

The silica preferably has a nitrogen adsorption specific surface area of 40 to 400 m²/g.

An amount of the liquid resin is preferably 1 to 60 parts by mass per 100 parts by mass of the rubber component.

The liquid resin is preferably at least one selected from the group consisting of liquid coumarone-indene resin, liquid indene resin, and liquid α-methylstyrene resin.

The rubber composition is preferably for use as a rubber composition for a tread.

The present invention also relates to a pneumatic tire, produced using the foregoing rubber composition.

Advantageous Effects of Invention

The present invention relates to a rubber composition including a specific conjugated diene polymer, silica, and a specific liquid resin. Thus, the present invention can provide a pneumatic tire that is improved in fuel economy, wet-grip performance, and abrasion resistance in a balanced manner.

DESCRIPTION OF EMBODIMENTS

The rubber composition of the present invention contains silica, a liquid resin having a specific softening point, and a conjugated diene polymer containing a constituent unit based on a conjugated diene and a constituent unit represented by formula (I) below, at least one terminal of the polymer being modified with at least one compound selected from the group consisting of a compound represented by formula (II) below, a compound containing a group represented by formula (III) below, a compound represented by formula (IV) below, a silicon compound containing a group represented by formula (V) below and/or a group represented by formula (VI) below, and a compound containing a group represented by formula (VII) below. The above combination enables favorable dispersion of the silica in the rubber component. As a result, excellent wet-grip performance is achieved, as well as both good fuel economy and high abrasion resistance are achieved. Moreover, the achievement of both good fuel economy and high abrasion resistance is favorable for the environment.

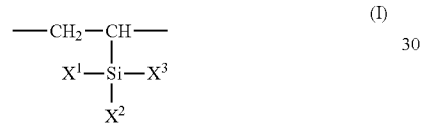
(I)

In the formula, $X^1$, $X^2$, and $X^3$ each independently represent a group represented by formula (Ia) below, a hydroxyl group, a hydrocarbyl group, or a substituted hydrocarbyl group, and at least one of $X^1$, $X^2$, and $X^3$ is a hydroxyl group or a group represented by the following formula (Ia):

(Ia)

wherein $R^1$ and $R^2$ each independently represent a $C_{1-6}$ hydrocarbyl group, a $C_{1-6}$ substituted hydrocarbyl group, a silyl group, or a substituted silyl group, and $R^1$ and $R^2$ may be bonded to each other to form a cyclic structure together with the nitrogen atom.

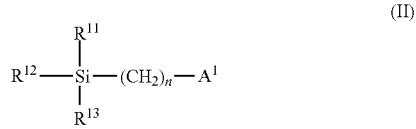
(II)

In the formula, n represents an integer of 1 to 10; $R^{11}$, $R^{12}$, and $R^{13}$ each independently represent a $C_{1-4}$ hydrocarbyl group or a $C_{1-4}$ hydrocarbyloxy group, and at least one of $R^{11}$, $R^{12}$, and $R^{13}$ is a hydrocarbyloxy group; and $A^1$ represents a nitrogen atom-bearing functional group.

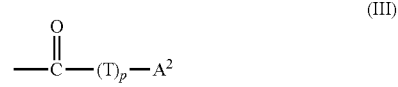
(III)

In the formula, p represents an integer of 0 or 1; T represents a $C_{1-20}$ hydrocarbylene group or a $C_{1-20}$ substituted hydrocarbylene group; and $A^2$ represents a nitrogen atom-bearing functional group.

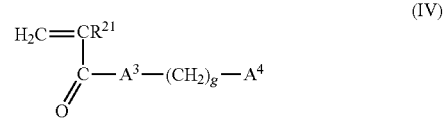
(IV)

In the formula, g represents an integer of 1 to 10; $R^{21}$ represents a hydrogen atom, a $C_{1-6}$ hydrocarbyl group, or a $C_{1-6}$ substituted hydrocarbyl group; $A^3$ represents an oxygen atom or the following group: —$NR^{22}$— where $R^{22}$ represents a hydrogen atom or a $C_{1-10}$ hydrocarbyl group; and $A^4$ represents a functional group bearing a nitrogen atom and/or an oxygen atom.

(V)

(VI)

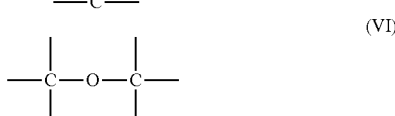

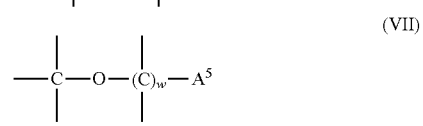
(VII)

In the formula, w represents an integer of 1 to 11, and $A^5$ represents a nitrogen atom-bearing functional group.

The conjugated dienes for the conjugated diene-based constituent unit can be exemplified by 1,3-butadiene, isoprene, 1,3-pentadiene, 2,3-dimethyl-1,3-butadiene, and 1,3-hexadiene, and one, or two or more of these may be used. Preferred are 1,3-butadiene and isoprene, in view of ease of availability.

$X^1$, $X^2$, and $X^3$ in formula (I) of the constituent unit represented by formula (I) each independently represent a group represented by formula (Ia), a hydroxyl group, a hydrocarbyl group, or a substituted hydrocarbyl group, and at least one of $X^1$, $X^2$, and $X^3$ is a group represented by formula (Ia) or a hydroxyl group.

$R^1$ and $R^2$ in formula (Ia) each independently represent a $C_{1-6}$ hydrocarbyl group, a $C_{1-6}$ substituted hydrocarbyl group, a silyl group, or a substituted silyl group, and $R^1$ and $R^2$ may be bonded to each other to form a cyclic structure together with the nitrogen atom.

As used herein, the term "hydrocarbyl group" denotes a monovalent hydrocarbon residue. This hydrocarbon residue refers to a group obtained by removing hydrogen from a hydrocarbon. The term "substituted hydrocarbyl group" denotes a group obtained by substituting one or more hydrogen atoms of a monovalent hydrocarbon residue by substituent groups. The term "hydrocarbyloxy group"

denotes a group obtained by substituting the hydrogen atom of a hydroxyl group by a hydrocarbyl group. The term "substituted hydrocarbyloxy group" denotes a group obtained by substituting one or more hydrogen atoms of a hydrocarbyloxy group by substituent groups. The term "hydrocarbylene group" denotes a divalent hydrocarbon residue. The term "substituted hydrocarbylene group" denotes a group obtained by substituting one or more hydrogen atoms of a divalent hydrocarbon residue by substituent groups. The term "substituted silyl group" denotes a group obtained by substituting one or more hydrogen atoms of a silyl group by substituent groups.

The $C_{1-6}$ hydrocarbyl groups encompassed by $R^1$ and $R^2$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The $C_{1-6}$ substituted hydrocarbyl groups encompassed by $R^1$ and $R^2$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups. The groups containing a silicon atom-bearing group as a substituent can be exemplified by trialkylsilylalkyl groups such as a trimethylsilylmethyl group.

The substituted silyl groups encompassed by $R^1$ and $R^2$ can be exemplified by trialkylsilyl groups such as trimethylsilyl, triethylsilyl, and t-butyldimethylsilyl groups.

The groups in which $R^1$ and $R^2$ are bonded to each other can be exemplified by $C_{1-12}$ divalent groups optionally containing at least one atom selected from the group consisting of a nitrogen atom, an oxygen atom, and a silicon atom. Specific examples thereof include alkylene groups such as trimethylene, tetramethylene, pentamethylene, and hexamethylene groups; oxydialkylene groups such as oxydiethylene and oxydipropylene groups; and nitrogenous groups such as a group represented by —CH$_2$CH$_2$—NH—CH$_2$— and a group represented by —CH$_2$CH$_2$—N=CH—.

The group in which $R^1$ and $R^2$ are bonded to each other is preferably a nitrogenous group, and more preferably a group represented by —CH$_2$CH$_2$—NH—CH$_2$— or a group represented by —CH$_2$CH$_2$—N=CH—.

The hydrocarbyl group encompassed by $R^1$ and $R^2$ is preferably an alkyl group, more preferably a $C_{1-4}$ alkyl group, further preferably a methyl group, an ethyl group, an n-propyl group, or an n-butyl group, and particularly preferably an ethyl group or an n-butyl group. The substituted hydrocarbyl group encompassed by $R^1$ and $R^2$ is preferably an alkoxyalkyl group, and more preferably a $C_{1-4}$ alkoxyalkyl group. The substituted silyl group encompassed by $R^1$ and $R^2$ is preferably a trialkylsilyl group, and more preferably a trimethylsilyl group.

Preferably, $R^1$ and $R^2$ are a nitrogenous group in which $R^1$ and $R^2$ are bonded to each other, or are each independently an alkyl group, an alkoxyalkyl group, or a substituted silyl group, more preferably an alkyl group, still more preferably a $C_{1-4}$ alkyl group, and further preferably a methyl group, an ethyl group, an n-propyl group, or an n-butyl group.

The group represented by formula (Ia) may be an acyclic amino group or a cyclic amino group.

The acyclic amino groups can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino groups; di(alkoxyalkyl)amino groups such as di(methoxymethyl)amino, di(methoxyethyl)amino, di(ethoxymethyl)amino, and di(ethoxyethyl)amino groups; and di(trialkylsilyl)amino groups such as di(trimethylsilyl)amino and di(t-butyldimethylsilyl)amino groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino groups can also be exemplified by 1-imidazolyl, 4,5-dihydro-1-imidazolyl, 1-imidazolidinyl, 1-piperazinyl, and morpholino groups.

In view of economic efficiency and ease of availability, the group represented by formula (Ia) is preferably an acyclic amino group, more preferably a dialkylamino group, still more preferably a dialkylamino group which contains a $C_{1-4}$ alkyl group as a substituent, and further preferably a dimethylamino group, a diethylamino group, a di(n-propyl)amino group, or a di(n-butyl)amino group.

The hydrocarbyl groups encompassed by $X^1$, $X^2$, and $X^3$ in formula (I) can be exemplified by alkyl groups such as methyl, ethyl, n-propyl, isopropyl, n-butyl, sec-butyl, and tert-butyl groups. The substituted hydrocarbyl groups can be exemplified by alkoxyalkyl groups such as methoxymethyl, ethoxymethyl, methoxyethyl, and ethoxyethyl groups.

The hydrocarbyl group encompassed by $X^1$, $X^2$, and $X^3$ is preferably an alkyl group, more preferably a $C_{1-4}$ alkyl group, and still more preferably a methyl group or an ethyl group. The substituted hydrocarbyl group encompassed by $X^1$, $X^2$, and $X^3$ is preferably an alkoxyalkyl group, and more preferably a $C_{1-4}$ alkoxyalkyl group.

The hydrocarbyl group or substituted hydrocarbyl group encompassed by $X^1$, $X^2$, and $X^3$ is preferably an alkyl group or an alkoxyalkyl group, more preferably a $C_{1-4}$ alkyl group or a $C_{1-4}$ alkoxyalkyl group, still more preferably a $C_{1-4}$ alkyl group, and further preferably a methyl group or an ethyl group.

At least one of $X^1$, $X^2$, and $X^3$ in formula (I) is a hydroxyl group or a group represented by formula (Ia). Preferably at least two of $X^1$, $X^2$, and $X^3$ are each a hydroxyl group or a group represented by formula (Ia), and more preferably two of $X^1$, $X^2$, and $X^3$ are each a hydroxyl group or a group represented by formula (Ia). In view of achieving the fuel economy, wet-grip performance, and abrasion resistance at high levels in a balanced manner, preferably at least one of $X^1$, $X^2$, and $X^3$ is a hydroxyl group, more preferably at least two of $X^1$, $X^2$, and $X^3$ are hydroxyl groups, and still more preferably two of $X^1$, $X^2$, and $X^3$ are hydroxyl groups.

In view of enhancing the fuel economy, wet-grip performance, and abrasion resistance in a balanced manner, the constituent unit represented by formula (I) is preferably a constituent unit in which two of $X^1$, $X^2$, and $X^3$ are, independently, an acyclic amino group or a hydroxyl group. The constituent unit in which two of $X^1$, $X^2$, and $X^3$ are acyclic amino groups is preferably a bis(dialkylamino)alkylvinylsilane unit and is more preferably a bis(dimethylamino)methylvinylsilane unit, bis(diethylamino)methylvinylsilane unit, bis(di(n-propyl)amino)methylvinylsilane unit, or bis(di(n-butyl)amino)methylvinylsilane unit. The constituent unit in which two of $X^1$, $X^2$, and $X^3$ are hydroxyl groups is preferably a dihydroxyalkylvinylsilane unit, and more preferably a dihydroxymethylvinylsilane unit.

In view of enhancing the fuel economy, wet-grip performance, and abrasion resistance in a balanced manner, the content of the constituent unit represented by formula (I) in the conjugated diene polymer, expressed per unit mass of the polymer, is preferably at least 0.001 mmol/g-polymer but not more than 0.1 mmol/g-polymer, more preferably at least 0.002 mmol/g-polymer but not more than 0.07 mmol/g-polymer, and even more preferably at least 0.003 mmol/g-polymer but not more than 0.05 mmol/g-polymer.

At least one terminal of the conjugated diene polymer is modified with a specific compound (modifying agent 1 to 5). This causes interaction with silica, thereby enhancing the fuel economy, wet-grip performance, and abrasion resistance in a balanced manner.

The following explains the compound (modifying agent 1) represented by formula (II) below.

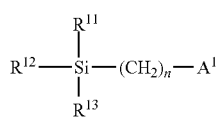

(II)

In the formula, n represents an integer of 1 to 10; $R^{11}$, $R^{12}$, and $R^{13}$ each independently represent a $C_{1-4}$ hydrocarbyl group or a $C_{1-4}$ hydrocarbyloxy group, and at least one of $R^{11}$, $R^{12}$, and $R^{13}$ is a hydrocarbyloxy group; and $A^1$ represents a nitrogen atom-bearing functional group.

$R^{11}$, $R^{12}$, and $R^{13}$ in formula (II) each independently represent a $C_{1-4}$ hydrocarbyl group or a $C_{1-4}$ hydrocarbyloxy group, and at least one of $R^{11}$, $R^{12}$, and $R^{13}$ is a hydrocarbyloxy group.

The hydrocarbyl groups encompassed by $R^{11}$, $R^{12}$, and $R^{13}$ can be exemplified by alkyl groups such as methyl, ethyl, n-propyl, isopropyl, n-butyl, sec-butyl, and tert-butyl groups. The hydrocarbyloxy groups encompassed by $R^{11}$, $R^2$, and $R^{13}$ can be exemplified by alkoxy groups such as methoxy, ethoxy, n-propoxy, isopropoxy, n-butoxy, sec-butoxy, and t-butoxy groups.

The hydrocarbyl group encompassed by $R^{11}$, $R^{12}$, and $R^{13}$ is preferably an alkyl group, more preferably a $C_{1-3}$ alkyl group, and still more preferably a methyl group or an ethyl group. The hydrocarbyloxy group encompassed by $R^{11}$, $R^{12}$, and $R^{13}$ is preferably an alkoxy group, more preferably a $C_{1-3}$ alkoxy group, and still more preferably a methoxy group or an ethoxy group.

In view of enhancing the fuel economy, wet-grip performance, and abrasion resistance in a balanced manner, preferably at least two of $R^{11}$, $R^{12}$, and $R^{13}$ are hydrocarbyloxy groups, and more preferably the three of $R^{11}$, $R^{12}$, and $R^{13}$ are hydrocarbyloxy groups.

In formula (II), n represents an integer of 1 to 10. In view of enhancing the fuel economy, wet-grip performance, and abrasion resistance in a balanced manner, n is preferably not less than 3. In view of enhancing the economic efficiency, n is preferably not more than 4. Particularly preferably, n is 3.

$A^1$ in formula (II) is a nitrogen atom-bearing functional group and examples thereof include amino, isocyano, cyano, pyridyl, piperidyl, pyrazinyl, and morpholino groups.

$A^1$ is preferably a group represented by the following formula (IIa).

(IIa)

In the formula, $R^{14}$ and $R^{15}$ each independently represent a $C_{1-6}$ group optionally containing at least one atom selected from the group consisting of a nitrogen atom, an oxygen atom, and a silicon atom, $R^{14}$ and $R^{15}$ may be bonded to each other to form a cyclic structure together with the nitrogen atom, and $R^{14}$ and $R^{15}$ may form a single group bonded to the nitrogen via a double bond.

Examples of $R^{14}$ and $R^{15}$ in formula (IIa) include $C_{1-6}$ hydrocarbyl groups, $C_{1-6}$ substituted hydrocarbyl groups, and substituted silyl groups.

The hydrocarbyl groups encompassed by $R^{14}$ and $R^{15}$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The substituted hydrocarbyl groups encompassed by $R^{14}$ and $R^{15}$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups; alkylene oxide groups such as epoxy and tetrahydrofuranyl groups; and alkylene oxide alkyl groups such as glycidyl and tetrahydrofurfuryl groups. The groups containing a silicon atom-bearing group as a substituent can be exemplified by trialkylsilylalkyl groups such as a trimethylsilylmethyl group.

As used herein, the term "alkylene oxide group" denotes a monovalent group obtained by removing a hydrogen atom from the ring of a cyclic ether compound. The term "alkylene oxide alkyl group" denotes a group obtained by substituting at least one hydrogen atom of an alkyl group by an alkylene oxide group.

The substituted silyl groups encompassed by $R^{14}$ and $R^{15}$ can be exemplified by trialkylsilyl groups such as trimethylsilyl, triethylsilyl, and t-butyldimethylsilyl groups, and trialkoxysilyl groups such as a trimethoxysilyl group.

The groups in which $R^{14}$ and $R^{15}$ are bonded to each other can be exemplified by $C_{2-12}$ divalent groups optionally containing at least one atom selected from the group consisting of a nitrogen atom, an oxygen atom, and a silicon atom. Specific examples thereof include alkylene groups such as trimethylene, tetramethylene, pentamethylene, and hexamethylene groups; oxydialkylene groups such as oxydiethylene and oxydipropylene groups; and nitrogenous groups such as a group represented by —$CH_2CH_2$—NH—$CH_2$— and a group represented by —$CH_2CH_2$—N=CH—.

The group in which $R^{14}$ and $R^{15}$ are bonded to each other is preferably a nitrogenous group, and more preferably a group represented by —$CH_2CH_2$—NH—$CH_2$— or a group represented by —$CH_2CH_2$—N=CH—.

Examples of the single group bonded to the nitrogen via a double bond, formed by $R^{14}$ and $R^{15}$, include $C_{2-12}$ divalent groups optionally containing at least one atom selected from the group consisting of a nitrogen atom, an oxygen atom, and a silicon atom. Specific examples thereof include an ethylidene group, a 1-methylpropylidene group, a 1,3-dimethylbutylidene group, a 1-methylethylidene group, and a 4-N,N-dimethylaminobenzylidene group.

The hydrocarbyl group encompassed by $R^{14}$ and $R^{15}$ is preferably an alkyl group, more preferably a $C_{1-4}$ alkyl group, still more preferably a methyl group, an ethyl group, an n-propyl group, or an n-butyl group, and further preferably a methyl group or an ethyl group. The substituted hydrocarbyl group encompassed by $R^{14}$ and $R^{15}$ is preferably an alkoxyalkyl group, an alkylene oxide group, or an alkylene oxide alkyl group. The substituted silyl group encompassed by $R^{14}$ and $R^{15}$ is preferably a trialkylsilyl group or a trialkoxysilyl group, more preferably a trialkylsilyl group, and still more preferably a trimethylsilyl group or a triethylsilyl group.

Preferably, $R^{14}$ and $R^{15}$ are a nitrogenous group in which $R^{14}$ and $R^{15}$ are bonded to each other, or are each independently an alkyl group, an alkoxyalkyl group, an alkylene oxide group, an alkylene oxide alkyl group, or a substituted silyl group, more preferably an alkyl group, an alkylene oxide group, an alkylene oxide alkyl group, or a trialkylsilyl group.

The groups represented by formula (IIa) can be exemplified by acyclic amino groups and cyclic amino groups.

Examples of the acyclic amino groups include dialkylamino groups such as dimethylamino, diethylamino, di(n-propyl)amino, di(isopropyl)amino, di(n-butyl)amino, di(sec-butyl)amino, di(tert-butyl)amino, di(neopentyl) amino, and ethylmethylamino groups; di(alkoxyalkyl)amino groups such as di(methoxymethyl)amino, di(methoxyethyl) amino, di(ethoxymethyl)amino, and di(ethoxyethyl)amino groups; and di(trialkylsilyl)amino groups such as di(trimethylsilyl)amino and di(t-butyldimethylsilyl)amino groups. Other examples include di(alkylene oxide)amino groups such as di(epoxy)amino and di(tetrahydrofuranyl)amino groups; and di(alkylene oxide alkyl)amino groups such as di(glycidyl)amino and di(tetrahydrofurfuryl)amino groups. Additional examples include ethylideneamino, 1-methylpropylideneamino, 1,3-dimethylbutylideneamino, 1-methylethylideneamino, and 4-N,N-dimethylaminobenzylideneamino groups.

As used herein, the term "di(alkylene oxide)amino group" denotes an amino group in which two hydrogen atoms bonded to the nitrogen atom are substituted by two alkylene oxide groups. The term "di(alkylene oxide alkyl)amino group" denotes an amino group in which two hydrogen atoms bonded to the nitrogen atom are substituted by two alkylene oxide alkyl groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino groups can also be exemplified by 1-imidazolyl, 4,5-dihydro-1-imidazolyl, 1-imidazolidinyl, 1-piperazinyl, and morpholino groups.

In view of fuel economy, wet-grip performance, abrasion resistance, and long-term stability and easy availability of the compound, the group represented by formula (IIa) is preferably an acyclic amino group, and more preferably a dialkylamino group, a di(alkylene oxide)amino group, a di(alkylene oxide alkyl)amino group, or a di(trialkylsilyl) amino group.

The compounds represented by formula (II) can be exemplified by compounds in which formula (IIa) is an acyclic amino group such as a dialkylamino group, a di(alkoxyalkyl)amino group, a di(alkylene oxide)amino group, a di(alkylene oxide alkyl)amino group, or a trialkylsilyl group.

The compounds in which formula (IIa) is a dialkylamino group can be exemplified by the following:
[3-(dialkylamino)propyl]trialkoxysilanes such as
[3-(dimethylamino)propyl]trimethoxysilane,
[3-(diethylamino)propyl]trimethoxysilane,
[3-(ethylmethylamino)propyl]trimethoxysilane,
[3-(dimethylamino)propyl]triethoxysilane,
[3-(diethylamino)propyl]triethoxysilane, and
[3-(ethylmethylamino)propyl]triethoxysilane;
[3-(dialkylamino)propyl]alkyldialkoxysilanes such as
[3-(dimethylamino)propyl]methyldimethoxysilane,
[3-(diethylamino)propyl]methyldimethoxysilane,
[3-(ethylmethylamino)propyl]methyldimethoxysilane,
[3-(dimethylamino)propyl]ethyldimethoxysilane,
[3-(diethylamino)propyl]ethyldimethoxysilane,
[3-(ethylmethylamino)propyl]ethyldimethoxysilane,
[3-(dimethylamino)propyl]methyldiethoxysilane,
[3-(diethylamino)propyl]methyldiethoxysilane,
[3-(ethylmethylamino)propyl]methyldiethoxysilane,
[3-(dimethylamino)propyl]ethyldiethoxysilane,
[3-(diethylamino)propyl]ethyldiethoxysilane, and
[3-(ethylmethylamino)propyl]ethyldiethoxysilane; and
[3-(dialkylamino)propyl]dialkylalkoxysilanes such as
[3-(dimethylamino)propyl]dimethylmethoxysilane,
[3-(diethylamino)propyl]dimethylmethoxysilane,
[3-(dimethylamino)propyl]diethylmethoxysilane,
[3-(diethylamino)propyl]diethylmethoxysilane,
[3-(dimethylamino)propyl]dimethylethoxysilane,
[3-(diethylamino)propyl]dimethylethoxysilane,
[3-(dimethylamino)propyl]diethylethoxysilane, and
[3-(diethylamino)propyl]diethylethoxysilane.

The compounds in which formula (IIa) is a di(alkoxyalkyl)amino group can be exemplified by the following:
{3-[di(alkoxyalkyl)amino]propyl}trialkoxysilanes such as
{3-[di(methoxymethyl)amino]propyl}trimethoxysilane,
{3-[di(ethoxymethyl)amino]propyl}trimethoxysilane,
{3-[di(methoxyethyl)amino]propyl}trimethoxysilane,
{3-[di(ethoxyethyl)amino]propyl}trimethoxysilane,
{3-[di(methoxymethyl)amino]propyl}triethoxysilane,
{3-[di(ethoxymethyl)amino]propyl}triethoxysilane,
{3-[di(methoxyethyl)amino]propyl}triethoxysilane, and
{3-[di(ethoxyethyl)amino]propyl}triethoxysilane;
{3-[di(alkoxyalkyl)amino]propyl}alkyldialkoxysilanes such as
{3-[di(methoxymethyl)amino]
  propyl}methyldimethoxysilane,
{3-[di(ethoxymethyl)amino]
  propyl}methyldimethoxysilane,
{3-[di(methoxyethyl)amino]
  propyl}methyldimethoxysilane,
{3-[di(ethoxyethyl)amino]propyl}methyldimethoxysilane,
{3-[di(methoxymethylamino]propyl}ethyldimethoxysilane,
{3-[di(ethoxymethyl)amino]propyl}ethyldimethoxysilane,
{3-[di(methoxyethyl)amino]propyl}ethyldimethoxysilane,
{3-[di(ethoxyethyl)amino]propyl}ethyldimethoxysilane,
{3-[di(methoxymethyl)amino]
  propyl}methyldiethoxysilane,
{3-[di(ethoxymethyl)amino]propyl}methyldiethoxysilane,
{3-[di(methoxyethyl)amino]propyl}methyldiethoxysilane,
{3-[di(ethoxyethyl)amino]propyl}methyldiethoxysilane,
{3-[di(methoxymethyl)amino]propyl}ethyldiethoxysilane,
{3-[di(ethoxymethyl)amino]propyl}ethyldiethoxysilane,
{3-[di(methoxyethyl)amino]propyl}ethyldiethoxysilane,
  and
{3-[di(ethoxyethyl)amino]propyl}ethyldiethoxysilane; and {3-[di(alkoxyalkyl)amino]propyl}dialkylalkoxysilanes such as
{3-[di(methoxymethyl)amino]propyl}dimethylmethoxysilane,
{3-[di(ethoxymethyl)amino]propyl}dimethylmethoxysilane,
{3-[di(methoxyethyl)amino]propyl}dimethylmethoxysilane,
{3-[di(ethoxyethyl)amino]propyl}dimethylmethoxysilane,
{3-[di(methoxymethyl)amino]propyl}diethylmethoxysilane,
{3-[di(ethoxymethyl)amino]propyl}diethylmethoxysilane,
{3-[di(methoxyethyl)amino]propyl}diethylmethoxysilane,
{3-[di(ethoxyethyl)amino]propyl}diethylmethoxysilane,
{3-[di(methoxymethyl)amino]propyl}dimethylethoxysilane,
{3-[di(ethoxymethyl)amino]propyl}dimethylethoxysilane,
{3-[di(methoxyethyl)amino]propyl}dimethylethoxysilane,
{3-[di(ethoxyethyl)amino]propyl}dimethylethoxysilane,
{3-[di(methoxymethyl)amino]propyl}diethylethoxysilane,
{3-[di(ethoxymethyl)amino]propyl}diethylethoxysilane,
{3-[di(methoxyethyl)amino]propyl}diethylethoxysilane, and
{3-[di(ethoxyethyl)amino]propyl}diethylethoxysilane.

The compounds in which formula (IIa) is a di(alkylene oxide)amino group can be exemplified by compounds in which formula (IIa) is a di(epoxy)amino group, such as
{3-[di(epoxy)amino]propyl}trimethoxysilane,
{3-[di(epoxy)amino]propyl}triethoxysilane,
{3-[di(epoxy)amino]propyl}methyldimethoxysilane,
{3-[di(epoxy)amino]propyl}ethyldimethoxysilane,
{3-[di(epoxy)amino]propyl}methyldiethoxysilane,
{3-[di(epoxy)amino]propyl}ethyldiethoxysilane,
{3-[di(epoxy)amino]propyl}dimethylmethoxysilane,
{3-[di(epoxy)amino]propyl}diethylmethoxysilane,
{3-[di(epoxy)amino]propyl}dimethylethoxysilane, and
{3-[di(epoxy)amino]propyl}diethylethoxysilane; and
compounds in which formula (IIa) is a di(tetrahydrofuranyl)amino group, such as
{3-[di(tetrahydrofuranyl)amino]propyl}trimethoxysilane,
{3-[di(tetrahydrofuranyl)amino]propyl}triethoxysilane,
{3-[di(tetrahydrofuranyl)amino]propyl}-methyldimethoxysilane,
{3-[di(tetrahydrofuranyl)amino]propyl}-ethyldimethoxysilane,
{3-[di(tetrahydrofuranyl)amino]propyl}-methyldiethoxysilane,
{3-[di(tetrahydrofuranyl)amino]propyl}-ethyldiethoxysilane,
{3-[di(tetrahydrofuranyl)amino]propyl}-dimethylmethoxysilane,
{3-[di(tetrahydrofuranyl)amino]propyl}-diethylmethoxysilane,
{3-[di(tetrahydrofuranyl)amino]propyl}-dimethylethoxysilane, and
{3-[di(tetrahydrofuranyl)amino]propyl}-diethylethoxysilane.

The compounds in which formula (IIa) is a di(alkylene oxide alkyl)amino group can be exemplified by compounds in which formula (IIa) is a di(glycidyl)amino group, such as
{3-[di(glycidyl)amino]propyl}trimethoxysilane,
{3-[di(glycidyl)amino]propyl}triethoxysilane,
{3-[di(glycidyl)amino]propyl}methyldimethoxysilane,
{3-[di(glycidyl)amino]propyl}ethyldimethoxysilane,
{3-[di(glycidyl)amino]propyl}methyldiethoxysilane,
{3-[di(glycidyl)amino]propyl}ethyldiethoxysilane,
{3-[di(glycidyl)amino]propyl}dimethylmethoxysilane,
{3-[di(glycidyl)amino]propyl}diethylmethoxysilane,
{3-[di(glycidyl)amino]propyl}dimethylethoxysilane, and
{3-[di(glycidyl)amino]propyl}diethylethoxysilane; and
compounds in which formula (IIa) is a di(tetrahydrofurfuryl)amino group, such as
(3-[di(tetrahydrofurfuryl)amino]propyl)trimethoxysilane,
{3-[di(tetrahydrofurfuryl)amino]propyl}triethoxysilane,
{3-[di(tetrahydrofurfuryl)amino]propyl}-methyldimethoxysilane,
{3-[di(tetrahydrofurfuryl)amino]propyl}-ethyldimethoxysilane,
{3-[di(tetrahydrofurfuryl)amino]propyl}-methyldiethoxysilane,
{3-[di(tetrahydrofurfuryl)amino]propyl}-ethyldiethoxysilane,
{3-[di(tetrahydrofurfuryl)amino]propyl}-dimethylmethoxysilane,
{3-[di(tetrahydrofurfuryl)amino]propyl}-diethylmethoxysilane,
{3-[di(tetrahydrofurfuryl)amino]propyl}-dimethylethoxysilane, and
{3-[di(tetrahydrofurfuryl)amino]propyl}-diethylethoxysilane.

The compounds in which formula (IIIa) is a trialkylsilyl group can be exemplified by the following:
{3-[di(trialkylsilyl)amino]propyl}trialkoxysilanes such as
{3-[di(trimethylsilyl)amino]propyl}trimethoxysilane,
{3-[di(t-butyldimethylsilyl)amino]propyl}-trimethoxysilane,
{3-[di(trimethylsilyl)amino]propyl}triethoxysilane, and
{3-[di(t-butyldimethylsilyl)amino]propyl}-triethoxysilane;
{3-[di(trialkylsilyl)amino]propyl}alkyldialkoxysilanes such as
{3-[di(trimethylsilyl)amino]propyl}methyldimethoxysilane,
{3-[di(t-butyldimethylsilyl)amino]propyl}-methyldimethoxysilane,
{3-[di(trimethylsilyl)amino]propyl}methyldiethoxysilane, and
{3-[di(t-butyldimethylsilyl)amino]propyl}-methyldiethoxysilane; and
{3-[di(trialkylsilyl)amino]propyl}dialkylalkoxysilanes such as
{3-[di(trimethylsilyl)amino]propyl}dimethylmethoxysilane,
{3-[di(t-butyldimethylsilyl)amino]propyl}-dimethylmethoxysilane,
{3-[di(trimethylsilyl)amino]propyl}dimethylethoxysilane, and
{3-[di(t-butyldimethylsilyl)amino]propyl}-dimethylethoxysilane.

Preferred among the preceding are [3-(dialkylamino)propyl]trialkoxysilanes, and more preferred are [3-(dimethylamino)propyl]trimethoxysilane,
[3-(diethylamino)propyl]trimethoxysilane,
[3-(dimethylamino)propyl]triethoxysilane, and
[3-(diethylamino)propyl]triethoxysilane.

The compounds represented by formula (II) can also be exemplified by compounds in which formula (IIa) is a cyclic amino group such as a 1-piperidino group, a 1-hexamethyleneimino group, a 1-imidazolyl group, a 4,5-dihydro-1-imidazolyl group, a 1-piperazinyl group, or a morpholino group.

The compounds in which formula (IIa) is a 1-piperidino group can be exemplified by
3-(1-piperidino)propyltrimethoxysilane,
3-(1-piperidino)propyltriethoxysilane, 3-(1-piperidino)propylmethyldimethoxysilane,
3-(1-piperidino)propylethyldimethoxysilane,
3-(1-piperidino)propylmethyldiethoxysilane, and
3-(1-piperidino)propylethyldiethoxysilane.

The compounds in which formula (IIa) is a 1-hexamethyleneimino group can be exemplified by
3-(1-hexamethyleneimino)propyltrimethoxysilane,
3-(1-hexamethyleneimino)propyltriethoxysilane,
3-(1-hexamethyleneimino)propylmethyldimethoxysilane,
3-(1-hexamethyleneimino)propylethyldimethoxysilane,
3-(1-hexamethyleneimino)propylmethyldiethoxysilane, and
3-(1-hexamethyleneimino)propylethyldiethoxysilane.

The compounds in which formula (IIa) is a 1-imidazolyl group can be exemplified by
N-(3-trimethoxysilylpropyl)imidazole and
N-(3-triethoxysilylpropyl)imidazole.

The compounds in which formula (IIa) is a 4,5-dihydro-1-imidazolyl group can be exemplified by
N-(3-trimethoxysilylpropyl)-4,5-dihydroimidazole and
N-(3-triethoxysilylpropyl)-4,5-dihydroimidazole.

The compounds in which formula (IIa) is a 1-piperazinyl group can be exemplified by
3-(1-piperazinyl)propyltrimethoxysilane,
3-(1-piperazinyl)propyltriethoxysilane,
3-(1-piperazinyl)propylmethyldimethoxysilane,
3-(1-piperazinyl)propylethyldimethoxysilane,
3-(1-piperazinyl)propylmethyldiethoxysilane, and
3-(1-piperazinyl)propylethyldiethoxysilane.

The compounds in which formula (IIa) is a morpholino group can be exemplified by
3-morpholinopropyltrimethoxysilane,
3-morpholinopropyltriethoxysilane,
3-morpholinopropylmethyldimethoxysilane,
3-morpholinopropylethyldimethoxysilane,
3-morpholinopropylmethyldiethoxysilane, and
3-morpholinopropylethyldiethoxysilane.

Among the preceding, compounds in which formula (IIa) is a 1-imidazolyl group and compounds in which formula (IIa) is a 4,5-dihydro-1-imidazolyl group are preferred, and
N-(3-trimethoxysilylpropyl)imidazole,
N-(3-triethoxysilylpropyl)imidazole,
N-(3-trimethoxysilylpropyl)-4,5-dihydroimidazole, and
N-(3-triethoxysilylpropyl)-4,5-dihydroimidazole are more preferred.

The following explains the compound (modifying agent 2) containing a group represented by formula (III) below.

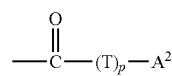
(III)

In the formula, p represents an integer of 0 or 1; T represents a $C_{1-20}$ hydrocarbylene group or a $C_{1-20}$ substituted hydrocarbylene group; and $A^2$ represents a nitrogen atom-bearing functional group.

Here, p represents an integer of 0 or 1. T represents a $C_{1-20}$ hydrocarbylene group or a $C_{1-20}$ substituted hydrocarbylene group. $A^2$ represents a nitrogen atom-bearing functional group and examples thereof include amino, isocyano, cyano, pyridyl, piperidyl, pyrazinyl, and morpholino groups.

The compounds containing a group represented by formula (III) can be exemplified by compounds containing a group represented by formula (III) in which p is 0 and $A^2$ is an amino group, namely, the following formula (IIIa).

(IIIa)

Examples of the compounds containing a group represented by formula (IIIa) include carboxylic acid amide compounds such as formamide, acetamide, and propionamide. Other examples include cyclic compounds such as imidazolidinone and derivatives thereof and lactams.

The compounds containing a group represented by formula (IIIa) can be exemplified by carboxylic acid amide compounds represented by the following formula (IIIa-1):

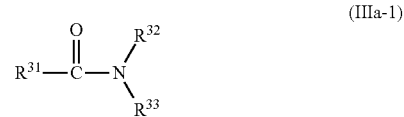
(IIIa-1)

wherein $R^{31}$ represents a hydrogen atom, a $C_{1-10}$-hydrocarbyl group, a $C_{1-10}$-substituted hydrocarbyl group, or a heterocyclic group containing a nitrogen atom and/or an oxygen atom as a heteroatom; and $R^{32}$ and $R^{33}$ each independently represent a $C_{1-10}$ group optionally containing at least one atom selected from the group consisting of a nitrogen atom, an oxygen atom, and a silicon atom, $R^{32}$ and $R^{33}$ may be bonded to each other to form a cyclic structure together with the nitrogen atom, and $R^{32}$ and $R^{33}$ may form a single group bonded to the nitrogen via a double bond.

The hydrocarbyl groups encompassed by $R^{31}$ can be exemplified by alkyl groups such as methyl, ethyl, n-propyl, isopropyl, n-butyl, sec-butyl, and t-butyl groups; aryl groups such as phenyl, methylphenyl, ethylphenyl, and naphthyl groups; and aralkyl groups such as a benzyl group.

The substituted hydrocarbyl groups encompassed by $R^{31}$ can be exemplified by substituted hydrocarbyl groups containing as a substituent at least one group selected from the group consisting of nitrogen atom-bearing groups and oxygen atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups.

The heterocyclic group containing a nitrogen atom and/or an oxygen atom as a heteroatom, encompassed by $R^{31}$, refers to a residue of a heterocyclic compound chat contains a nitrogen atom and/or an oxygen atom in the ring. Such groups can be exemplified by a 2-pyridyl group, a 3-pyridyl group, a 4-pyridyl group, and a 2-furyl group.

$R^{31}$ is preferably a $C_{1-10}$ hydrocarbyl group or a $C_{1-10}$ substituted hydrocarbyl group, more preferably a $C_{1-4}$ alkyl group, and particularly preferably a methyl group, an ethyl group, an n-propyl group, or an n-butyl group.

Examples of $R^{32}$ and $R^{33}$ in formula (IIIa-1) include $C_{1-10}$ hydrocarbyl groups and $C_{1-10}$ substituted hydrocarbyl groups. The hydrocarbyl groups encompassed by $R^{32}$ and $R^{33}$ can be exemplified by alkyl groups such as methyl, ethyl, n-propyl, isopropyl, n-butyl, sec-butyl, and t-butyl groups; aryl groups such as phenyl, methylphenyl, ethylphenyl, and naphthyl groups; and aralkyl groups such as a benzyl group.

The substituted hydrocarbyl groups encompassed by $R^{32}$ and $R^{33}$ can be exemplified by substituted hydrocarbyl groups containing as a substituent at least one group selected from the group consisting of nitrogen atom-bearing groups and oxygen atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups.

The groups in which $R^{32}$ and $R^{33}$ are bonded to each other can be exemplified by $C_{2-20}$ divalent groups optionally containing at least one atom selected from the group consisting of a nitrogen atom, an oxygen atom, and a silicon atom. Specific examples thereof include alkylene groups such as trimethylene, tetramethylene, pentamethylene, and hexamethylene groups; oxydialkylene groups such as oxydiethylene and oxydipropylene groups; and nitrogenous groups such as a group represented by —$CH_2CH_2$—NH—$CH_2$— and a group represented by —$CH_2CH_2$—N=CH—.

Examples of the single group bonded to the nitrogen via a double bond, formed by $R^{32}$ and $R^{33}$, include $C_{2-12}$ divalent groups optionally containing at least one atom selected from the group consisting of a nitrogen atom and an oxygen atom. Specific examples thereof include an ethylidene group, a 1-methylpropylidene group, a 1,3-dimethylbutylidene group, a 1-methylethylidene group, and a 4-N,N-dimethylaminobenzylidene group.

$R^{32}$ and $R^{33}$ are each independently preferably a hydrocarbyl group, more preferably an alkyl group, still more preferably a $C_{1-4}$ alkyl group, and particularly preferably a methyl group, an ethyl group, an n-propyl group, or an n-butyl group.

The carboxylic acid amide compounds represented by formula (IIIa-1) can be exemplified by formamide compounds such as formamide, N,N-dimethylformamide, and N,N-diethylformamide; acetamide compounds such as acetamide, N,N-dimethylacetamide, N,N-diethylacetamide, aminoacetamide, N,N-dimethyl-N',N'-dimethylaminoacetamide, N,N-dimethylaminoacetamide, N-ethylaminoacetamide, N,N-dimethyl-N'-ethylaminoacetamide, N,N-diethylaminoacetamide, and N-phenyldiacetamide;

propionamide compounds such as propionamide and N,N-dimethylpropionamide;

pyridylamide compounds such as 4-pyridylamide and N,N-dimethyl-4-pyridylamide;

benzamide compounds such as benzamide, N,N-dimethylbenzamide, N',N'-(p-dimethylamino)benzamide, N',N'-(p-diethylamino)benzamide, N,N-dimethyl-N',N'-(p-dimethylamino)benzamide, and N,N-dimethyl-N',N'-(p-diethylamino)benzamide;

acrylamide compounds such as N,N-dimethylacrylamide and N,N-diethylacrylamide;

methacrylamide compounds such as N,N-dimethylmethacrylamide and N,N-diethylmethacrylamide;

nicotinamide compounds such as N,N-dimethylnicotinamide and N,N-diethylnicotinamide;

phthalamide compounds such as N,N,N',N'-tetramethylphthalamide and N,N,N',N'-tetraethylphthalamide; and phthalimide compounds such as N-methylphthalimide and N-ethylphthalimide.

The cyclic compounds containing a group represented by formula (IIIa) can be exemplified by compounds represented by the following formula (IIIa-2) and compounds represented by the following formula (IIIa-3).

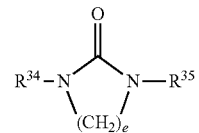

(IIIa-2)

In the formula, e represents an integer of 0 to 10, and $R^{34}$ and $R^{35}$ each independently represent a $C_{1-20}$ hydrocarbyl group or a $C_{1-20}$ substituted hydrocarbyl group.

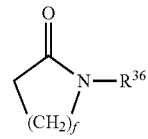

(IIIa-3)

In the formula, f represents an integer of 0 to 10, and $R^{36}$ represents a $C_{1-20}$ hydrocarbyl group or a $C_{1-20}$ substituted hydrocarbyl group.

$R^{34}$, $R^{35}$, and $R^{36}$ in formulas (IIIa-2) and (IIIa-3) each independently represent a $C_{1-20}$ hydrocarbyl group or a $C_{1-20}$ substituted hydrocarbyl group. The hydrocarbyl groups encompassed by $R^{34}$, $R^{35}$, and $R^{36}$ can be exemplified by alkyl groups such as methyl, ethyl, n-propyl, isopropyl, n-butyl, sec-butyl, and t-butyl groups; aryl groups such as phenyl, methylphenyl, ethylphenyl, and naphthyl groups; and aralkyl groups such as a benzyl group.

The substituted hydrocarbyl groups encompassed by $R^{34}$, $R^{35}$, and $R^{36}$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups; and alkoxyaryl groups such as methoxyphenyl and ethoxyphenyl groups. The groups containing a silicon atom-bearing group as a substituent can be exemplified by trimethylsilylmethyl, t-butyldimethylsilyloxymethyl, and trimethoxysilylpropyl groups.

$R^{34}$ and $R^{35}$ in formula (IIIa-2) are each independently preferably a hydrocarbyl group, more preferably an alkyl group, and still more preferably a methyl group.

$R^{36}$ in formula (IIIa-3) is preferably a hydrocarbyl group, more preferably an alkyl group or an aryl group, and still more preferably a methyl group or a phenyl group.

In formulas (IIIa-2) and (IIIa-3), e and f each represent an integer of 0 to 10. Here, e and f are each independently preferably not less than 2 in view of enhancing the fuel economy, wet-grip performance, and abrasion resistance in a balanced manner, whereas e and f are each independently preferably not more than 7 in view of enhancing the economic efficiency of the production.

The compounds represented by formula (IIIa-2) can be exemplified by 1,3-hydrocarbyl-substituted 2-imidazolidinones such as 1,3-dimethyl-2-imidazolidinone, 1,3-diethyl-2-imidazolidinone, 1,3-di(n-propyl)-2-imidazolidinone, 1,3-di(t-butyl)-2-imidazolidinone, and 1,3-diphenyl-2-imidazolidinone. The compound represented by formula (IIIa-2) is preferably a 1,3-substituted 2-imidazolidinone, more preferably a 1,3-hydrocarbyl-substituted 2-imidazolidinone, and still more preferably a 1,3-dialkyl-2-imidazolidinone. The 1,3-dialkyl-2-imidazolidinone is preferably 1,3-dimethyl-2-imidazolidinone, 1,3-diethyl-2-imidazolidinone, or 1,3-di(n-propyl)-2-imidazolidinone, and more preferably 1,3-dimethyl-2-imidazolidinone.

The compounds represented by formula (IIIa-3) can be exemplified by β-propiolactam compounds such as N-methyl-β-propiolactam, N-(t-butyl)-β-propiolactam, and N-phenyl-β-propiolactam;

2-pyrrolidone compounds such as 1-methyl-2-pyrrolidone, 1-(t-butyl)-2-pyrrolidone, 1-phenyl-2-pyrrolidone, 1-(p-methylphenyl)-2-pyrrolidone, 1-(p-methoxyphenyl)-2-pyrrolidone, 1-benzyl-2-pyrrolidone, 1-naphthyl-2-pyrrolidone, 1-phenyl-5-methyl-2-pyrrolidone, 1-(t-butyl)-5-methyl-2-pyrrolidone, and 1-(t-butyl)-1,3-dimethyl-2-pyrrolidone;

2-piperidone compounds such as 1-(t-butyl)-2-piperidone, 1-phenyl-2-piperidone, 1-(p-methylphenyl)-2-piperidone, 1-(p-methoxyphenyl)-2-piperidone, and 1-naphthyl-2-piperidone;

ε-caprolactam compounds such as N-methyl-ε-caprolactam, N-ethyl-ε-caprolactam, N-(n-propyl)-ε-caprolactam, N-phenyl-ε-caprolactam, N-(p-methoxyphenyl)-6-caprolactam, and N-benzyl-ε-caprolactam; and ω-laurylolactam compounds such as N-phenyl-ω-laurylolactam.

The compound represented by formula (IIIa-3) is preferably a 2-pyrrolidone compound or an ε-caprolactam compound, more preferably a 1-hydrocarbyl-substituted 2-pyrrolidone or an N-hydrocarbyl-substituted ε-caprolactam, still more preferably a 1-alkyl-substituted 2-pyrrolidone, a 1-aryl-substituted 2-pyrrolidone, an N-alkyl-substituted ε-caprolactam, or an N-aryl-substituted ε-caprolactam, and particularly preferably 1-phenyl-2-pyrrolidone or N-methyl-ε-caprolactam.

The compounds containing a group represented by formula (III) can also be exemplified by compounds containing a group represented by formula (III) in which p is 1 and $A^2$ is an amino group, namely, the following formula (IIIb).

(IIIb)

In the formula, T represents a $C_{1-20}$ hydrocarbylene group or a $C_{1-20}$ substituted hydrocarbylene group.

The compounds containing a group represented by formula (IIIb) can be exemplified by benzaldehyde compounds, acetophenone compounds, and benzophenone compounds.

The compounds containing a group represented by formula (IIIb) can also be exemplified by compounds represented by the following formula (IIIb-1):

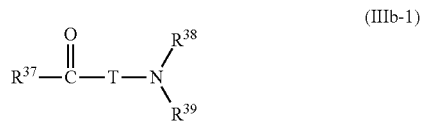

(IIIb-1)

wherein $R^{37}$ represents a hydrogen atom, a $C_{1-10}$ hydrocarbyl group, a $C_{1-10}$ substituted hydrocarbyl group, or a heterocyclic group containing a nitrogen atom and/or an oxygen atom as a heteroatom; $R^{38}$ and $R^{39}$ each independently represent a $C_{1-10}$ group optionally containing at least one atom selected from the group consisting of a nitrogen atom, an oxygen atom, and a silicon atom, $R^{38}$ and $R^{39}$ may be bonded to each other to form a cyclic structure together with the nitrogen atom, and $R^{38}$ and $R^{39}$ may form a single group bonded to the nitrogen via a double bond; and T represents a $C_{1-20}$ hydrocarbylene group or a $C_{1-20}$ substituted hydrocarbylene group.

The hydrocarbyl groups encompassed by $R^{37}$ can be exemplified by alkyl groups such as methyl, ethyl, n-propyl, isopropyl, n-butyl, sec-butyl, and t-butyl groups; aryl groups such as phenyl, methylphenyl, ethylphenyl, and naphthyl groups; and aralkyl groups such as a benzyl group.

The substituted hydrocarbyl groups encompassed by $R^{37}$ can be exemplified by substituted hydrocarbyl groups containing as a substituent at least one group selected from the group consisting of nitrogen atom-bearing groups and oxygen atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups.

The heterocyclic group containing a nitrogen atom and/or an oxygen atom as a heteroatom, encompassed by $R^{37}$, refers to a residue of a heterocyclic compound that contains a nitrogen atom and/or an oxygen atom in the ring, and such groups can be exemplified by a 2-pyridyl group, a 3-pyridyl group, a 4-pyridyl group, and a 2-furyl group.

$R^{37}$ is preferably a hydrogen atom, a $C_{1-10}$ hydrocarbyl group, or a $C_{1-10}$ substituted hydrocarbyl group. The $C_{1-10}$ hydrocarbyl group is preferably a $C_{1-4}$ alkyl group or a phenyl group, and more preferably a methyl group, an ethyl group, an n-propyl group, an n-butyl group, or a phenyl group. The $C_{1-10}$-substituted hydrocarbyl group is preferably an aryl group containing a nitrogen atom-bearing group as a substituent, and more preferably a dialkylaminophenyl group or a 4-morpholinophenyl group.

Examples of $R^{38}$ and $R^{39}$ in formula (IIIb-1) include $C_{1-10}$ hydrocarbyl groups and $C_{1-10}$ substituted hydrocarbyl groups.

The hydrocarbyl groups encompassed by $R^{38}$ and $R^{39}$ can be exemplified by alkyl groups such as methyl, ethyl, n-propyl, isopropyl, n-butyl, sec-butyl, and t-butyl groups; aryl groups such as phenyl, methylphenyl, ethylphenyl, and naphthyl groups; and aralkyl groups such as a benzyl group.

The substituted hydrocarbyl groups encompassed by $R^{38}$ and $R^{39}$ can be exemplified by substituted hydrocarbyl groups containing as a substituent at least one group selected from the group consisting of nitrogen atom-bearing groups and oxygen atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups.

The groups in which $R^{38}$ and $R^{39}$ are bonded to each other can be exemplified by $C_{2-20}$ divalent groups optionally containing at least one atom selected from the group consisting of a nitrogen atom, an oxygen atom, and a silicon atom. Specific examples thereof include alkylene groups such as trimethylene, tetramethylene, pentamethylene, and hexamethylene groups; oxydialkylene groups such as oxydiethylene and oxydipropylene groups; and nitrogenous groups such as a group represented by —CH$_2$CH$_2$—NH—CH$_2$— and a group represented by —CH$_2$CH$_2$—N=CH—.

Examples of the single group bonded to the nitrogen via a double bond, formed by R$^{38}$ and R$^{39}$, include C$_{2-12}$ divalent groups optionally containing at least one atom selected from the group consisting of a nitrogen atom and an oxygen atom. Specific examples thereof include an ethylidene group, a 1-methylpropylidene group, a 1,3-dimethylbutylidene group, a 1-methylethylidene group, and a 4-N,N-dimethylaminobenzylidene group.

R$^{38}$ and R$^{39}$ are each independently preferably a hydrocarbyl group, more preferably an alkyl group, still more preferably a C$_{1-4}$ alkyl group, and particularly preferably a methyl group, an ethyl group, an n-propyl group, or an n-butyl group.

The hydrocarbylene groups encompassed by T can be exemplified by alkylene groups such as methylene, ethylene, trimethylene, tetramethylene, pentamethylene, and hexamethylene groups; and arylene groups such as phenylene, methylphenylene, ethylphenylene, and naphthylene groups.

The substituted hydrocarbylene groups encompassed by T can be exemplified by substituted hydrocarbylene groups containing as a substituent at least one group selected from the group consisting of nitrogen atom-bearing groups and oxygen atom-bearing groups. The groups containing a nitrogen atom-bearing group as a substituent can be exemplified by dialkylaminoalkylene groups such as dimethylaminoethylene and diethylaminoethylene groups; and dialkylaminoarylene groups such as dimethylaminophenylene and diethylaminophenylene groups. The groups containing an oxygen atom-bearing group as a substituent can be exemplified by alkoxyalkylene groups such as methoxymethylene, methoxyethylene, ethoxymethylene, and ethoxyethylene groups.

T is preferably a hydrocarbylene group, more preferably an arylene group, and still more preferably a phenylene group.

The compounds represented by formula (IIIb-1) can be exemplified by dialkylamino-substituted benzaldehyde compounds such as 4-dimethylaminobenzaldehyde, 4-diethylaminobenzaldehyde, and 3,5-bis(dihexylamino)benzaldehyde; dialkylamino-substituted acetophenone compounds such as 4-dimethylaminoacetophenone and 4-diethylaminoacetophenone; heterocyclic group-substituted acetophenone compounds such as 4-morpholinoacetophenone, 4'-imidazol-1-yl-acetophenone, and 4-pyrazolylacetophenone; dialkylamino-substituted benzophenone compounds such as 4,4'-bis(dimethylamino)benzophenone, 4,4'-bis(diethylamino)benzophenone, 4-dimethylaminobenzophenone, 4-diethylaminobenzophenone, 3-dimethylaminobenzophenone, and 3-diethylaminobenzophenone; and heterocyclic group-substituted benzophenone compounds such as 4-morpholinobenzophenone, 4'-(imidazol-1-yl)benzophenone, and 4-pyrazolylbenzophenone.

The compound represented by formula (IIIb-1) is preferably a substituted acetophenone compound or a substituted benzophenone compound, and examples thereof include compounds represented by the following formula (IIIb-1-1) and compounds represented by the following formula (IIIb-1-2):

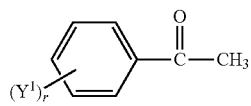
(IIIb-1-1)

wherein r represents an integer of 1 or 2; and Y$^1$ represents a nitrogen atom-bearing functional group that is a substituent on the benzene ring, and when a plurality of Y$^1$'s are present, the plurality of Y$^1$'s may be the same as or different from one another;

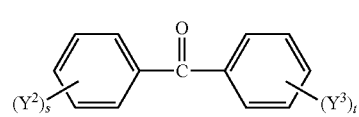
(IIIb-1-2)

wherein s represents an integer of 1 or 2; t represents an integer of 0 to 2; and Y$^2$ and Y$^3$ each represent a nitrogen atom-bearing functional group that is a substituent on the benzene ring, and when a plurality of Y$^2$'s are present, the plurality of Y$^2$'s may be the same as or different from one another, and when a plurality of Y$^3$'s are present, the plurality of Y$^3$'s may be the same as or different from one another.

Y$^1$, Y$^2$, and Y$^3$ in formulas (IIIb-1-1) and (IIIb-1-2) represent nitrogen atom-bearing functional groups and examples thereof include amino, isocyano, cyano, pyridyl, piperidyl, pyrazinyl, pyrimidinyl, pyrrolyl, imidazolyl, pyrazolyl, and morpholino groups. Dialkylamino, imidazolyl, and morpholino groups are preferred. The alkyl of the dialkylamino group is preferably a C$_{1-10}$ alkyl group.

The compound represented by formula (IIIb-1) is more preferably a heterocyclic group-substituted acetophenone compound, a dialkylamino-substituted benzophenone compound, or a heterocyclic group-substituted benzophenone compound and is particularly preferably 4'-imidazol-1-yl-acetophenone, 4-morpholinoacetophenone, 4-dimethylaminobenzophenone, 4-diethylaminobenzophenone, 4,4'-bis(dimethylamino)benzophenone, 4,4'-bis(diethylamino)benzophenone, or 4-morpholinobenzophenone.

The following explains the compound (modifying agent 3) represented by formula (IV) below.

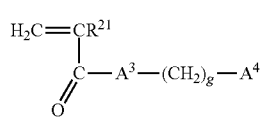
(IV)

In the formula, g represents an integer of 1 to 10; R$^{21}$ represents a hydrogen atom, a C$_{1-6}$ hydrocarbyl group, or a C$_{1-6}$ substituted hydrocarbyl group; A$^3$ represents an oxygen atom or the following group: —NR$^{22}$— where R$^{22}$ represents a hydrogen atom or a C$_{1-10}$ hydrocarbyl group; and A$^4$ represents a functional group bearing a nitrogen atom and/or an oxygen atom.

Here, g represents an integer of 1 to 10. In view of enhancing the fuel economy, wet-grip performance, and abrasion resistance in a balanced manner, g is preferably not less than 2. In view of enhancing the economic efficiency of the production, g is preferably not more than 4. Particularly preferably, g is 3.

R$^{21}$ in formula (IV) represents a hydrogen atom, a C$_{1-6}$ hydrocarbyl group, or a C$_{1-6}$ substituted hydrocarbyl group.

The hydrocarbyl groups encompassed by R$^{21}$ can be exemplified by alkyl groups such as methyl, ethyl, n-propyl, isopropyl, n-butyl, sec-butyl, and t-butyl groups.

The substituted hydrocarbyl groups encompassed by $R^{21}$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups. The groups containing a silicon atom-bearing group as a substituent can be exemplified by trialkylsilylalkyl groups such as a trimethylsilylmethyl group; trialkylsilyloxyalkyl groups such as a t-butyldimethylsilyloxymethyl group; and trialkoxysilylalkyl groups such as a trimethoxysilylpropyl group.

The hydrocarbyl group encompassed by $R^{21}$ is preferably an alkyl group, more preferably a $C_{1-4}$ alkyl group, still more preferably a methyl group or an ethyl group, and further preferably a methyl group. The substituted hydrocarbyl group encompassed by $R^{21}$ is preferably an alkoxyalkyl group, more preferably a $C_{1-4}$ alkoxyalkyl group, still more preferably a methoxymethyl or an ethoxyethyl group, and further preferably a methoxymethyl group.

In view of economic efficiency and in view of enhancing the fuel economy, wet-grip performance, and abrasion resistance in a balanced manner, $R^{21}$ is preferably a hydrogen atom, an alkyl group, or an alkoxyalkyl group, more preferably a hydrogen atom, a $C_{1-4}$ alkyl group, or a $C_{1-4}$ alkoxyalkyl group, still more preferably a hydrogen atom, a methyl group, or a methoxymethyl group, and further preferably a hydrogen atom or a methyl group.

$A^3$ in formula (IV) represents an oxygen atom or the following group: —$NR^{22}$— where $R^{22}$ represents a hydrogen atom or a $C_{1-10}$ hydrocarbyl group.

The hydrocarbyl groups encompassed by $R^{22}$ can be exemplified by alkyl groups such as methyl, ethyl, n-propyl, isopropyl, n-butyl, sec-butyl, and t-butyl groups; aryl groups such as phenyl, methylphenyl, ethylphenyl, and naphthyl groups; and aralkyl groups such as a benzyl group.

The hydrocarbyl group encompassed by $R^{22}$ is preferably an alkyl group, more preferably a $C_{1-4}$ alkyl group, and still more preferably a methyl group or an ethyl group.

$R^{22}$ is preferably a hydrogen atom or an alkyl group, more preferably a hydrogen atom or a $C_{1-4}$ alkyl group, still more preferably a hydrogen atom, a methyl group or an ethyl group, and further preferably a hydrogen atom or a methyl group.

$A^4$ in formula (IV) represents a functional group bearing a nitrogen atom and/or an oxygen atom. Examples of the nitrogen atom-bearing functional group include amino, isocyano, cyano, pyridyl, piperidyl, piperazinyl, and morpholino groups.

Examples of the oxygen atom-bearing functional group include alkoxy groups such as methoxy, ethoxy, n-propoxy, isopropoxy, n-butoxy, sec-butoxy, and t-butoxy groups; alkoxyalkyl groups such as methoxymethyl, methoxyethyl, ethoxymethyl, and ethoxyethyl groups; alkoxyaryl groups such as methoxyphenyl and ethoxyphenyl groups; and alkylene oxide groups such as epoxy and tetrahydrofuranyl groups. Other examples include trialkylsilyloxy groups such as trimethylsilyloxy, triethylsilyloxy, and t-butyldimethylsilyloxy groups. Additional examples include a hydroxyl group.

$A^4$ is preferably a hydroxyl group or a group represented by formula (IVa) below, and more preferably a group represented by the following formula (IVa):

wherein $R^{23}$ and $R^{24}$ each independently represent a $C_{1-6}$ group optionally containing at least one atom selected from the group consisting of a nitrogen atom, an oxygen atom, and a silicon atom, $R^{23}$ and $R^{24}$ may be bonded to each other to form a cyclic structure together with the nitrogen atom, and $R^{23}$ and $R^{24}$ may form a single group bonded to the nitrogen via a double bond.

Examples of $R^{23}$ and $R^{24}$ in formula (IVa) include $C_{1-6}$ hydrocarbyl groups, $C_{1-6}$ substituted hydrocarbyl groups, and substituted silyl groups.

The hydrocarbyl groups encompassed by $R^{23}$ and $R^{24}$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The substituted hydrocarbyl groups encompassed by $R^{23}$ and $R^{24}$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups; alkylene oxide groups such as epoxy and tetrahydrofuranyl groups; and alkylene oxide alkyl groups such as glycidyl and tetrahydrofurfuryl groups. The groups containing a silicon atom-bearing group as a substituent can be exemplified by trialkylsilylalkyl groups such as a trimethylsilylmethyl group.

As used herein, the term "alkylene oxide group" denotes a monovalent group obtained by removing a hydrogen atom from the ring of a cyclic ether compound. The term "alkylene oxide alkyl group" denotes a group obtained by substituting at least one hydrogen atom of an alkyl group by an alkylene oxide group.

The substituted silyl groups encompassed by $R^{23}$ and $R^{24}$ can be exemplified by trialkylsilyl groups such as trimethylsilyl, triethylsilyl, and t-butyldimethylsilyl groups; and trialkoxysilyl groups such as a trimethoxysilyl group.

The groups in which $R^{23}$ and $R^{24}$ are bonded to each other can be exemplified by $C_{2-12}$ divalent groups optionally containing at least one atom selected from the group consisting of a nitrogen atom, an oxygen atom, and a silicon atom. Specific examples thereof include alkylene groups such as trimethylene, tetramethylene, pentamethylene, and hexamethylene groups; oxydialkylene groups such as oxydiethylene and oxydipropylene groups; and nitrogenous groups such as a group represented by —$CH_2CH_2$—NH—$CH_2$— and a group represented by —$CH_2CH_2$—N=CH—.

The group in which $R^{23}$ and $R^{24}$ are bonded to each other is preferably a nitrogenous group, and more preferably a group represented by —$CH_2CH_2$—NH—$CH_2$— or a group represented by —$CH_2CH_2$—N=CH—.

Examples of the single group bonded to the nitrogen via a double bond, formed by $R^{23}$ and $R^{24}$, include $C_{2-12}$ divalent groups optionally containing at least one atom selected from the group consisting of a nitrogen atom, an oxygen atom, and a silicon atom. Specific examples thereof include an ethylidene group, a 1-methylpropylidene group, a 1,3-dimethylbutylidene group, a 1-methylethylidene group, and a 4-N,N-dimethylaminobenzylidene group.

The hydrocarbyl group encompassed by $R^{23}$ and $R^{24}$ is preferably an alkyl group, more preferably a $C_{1-4}$ alkyl group, still more preferably a methyl group, an ethyl group, an n-propyl group, or an n-butyl group, and further preferably a methyl group or an ethyl group. The substituted hydrocarbyl group encompassed by $R^{23}$ and $R^{24}$ is preferably an alkoxyalkyl group, an alkylene oxide group, or an alkylene oxide alkyl group. The substituted silyl group encompassed by $R^{23}$ and $R^{24}$ is preferably a trialkylsilyl group or a trialkoxysilyl group, more preferably a trialkylsilyl group, and still more preferably a trimethylsilyl group or a triethylsilyl group.

Preferably, $R^{23}$ and $R^{24}$ are a nitrogenous group in which $R^{23}$ and $R^{24}$ are bonded to each other, or are each independently an alkyl group, an alkoxyalkyl group, an alkylene oxide group, an alkylene oxide alkyl group, or a substituted silyl group, more preferably an alkyl group, an alkylene oxide group, an alkylene oxide alkyl group, or a trialkylsilyl group.

The groups represented by formula (IVa) can be exemplified by acyclic amino groups and cyclic amino groups.

Examples of the acyclic amino groups include dialkylamino groups such as dimethylamino, diethylamino, di(n-propyl)amino, di(isopropyl)amino, di(n-butyl)amino, di(sec-butyl)amino, di(tert-butyl)amino, di(neopentyl) amino, and ethylmethylamino groups; di(alkoxyalkyl)amino groups such as di(methoxymethyl)amino, di(methoxyethyl) amino, di(ethoxymethyl)amino, and di(ethoxyethyl)amino groups; and di(trialkylsilyl)amino groups such as di(trimethylsilyl)amino and di(t-butyldimethylsilyl)amino groups. Other examples include di(alkylene oxide)amino groups such as di(epoxy)amino and di(tetrahydrofuranyl)amino groups; and di(alkylene oxide alkyl)amino groups such as di(glycidyl)amino and di(tetrahydrofurfuryl)amino groups. Additional examples include ethylideneamino, 1-methylpropylideneamino, 1,3-dimethylbutylideneamino, 1-methylethylideneamino, and 4-N,N-dimethylaminobenzylideneamino groups.

As used herein, the term "di(alkylene oxide)amino group" denotes an amino group in which two hydrogen atoms bonded to the nitrogen atom are substituted by two alkylene oxide groups. The term "di(alkylene oxide alkyl)amino group" denotes an amino group in which two hydrogen atoms bonded to the nitrogen atom are substituted by two alkylene oxide alkyl groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino groups can also be exemplified by 1-imidazolyl, 4,5-dihydro-1-imidazolyl, 1-imidazolidinyl, 1-piperazinyl, and morpholino groups.

In view of fuel economy, wet-grip performance, abrasion resistance, and long-term stability and easy availability of the compound, the group represented by formula (IVa) is preferably an acyclic amino group, and is more preferably a dialkylamino group, a di(alkylene oxide)amino group, a di(alkylene oxide alkyl)amino group, or a di(trialkylsilyl) amino group.

The compounds represented by formula (IV) can be exemplified by compounds in which $A^3$ is a secondary amino group, such as acrylamide compounds and methacrylamide compounds.

The acrylamide compounds in which $A^4$ is a nitrogen atom-bearing group can be exemplified by
N-(2-dimethylaminoethyl)acrylamide,
N-(2-diethylaminoethyl)acrylamide,
N-(3-dimethylaminopropyl)acrylamide,
N-(3-diethylaminopropyl)acrylamide,
N-(4-dimethylaminobutyl)acrylamide,
N-(4-diethylaminobutyl)acrylamide,
N-(3-morpholinopropyl)acrylamide, and
N-(3-cyanopropyl)acrylamide.

The methacrylamide compounds in which $A^4$ is a nitrogen atom-bearing group can be exemplified by
N-(2-dimethylaminoethyl)methacrylamide,
N-(2-diethylaminoethyl)methacrylamide,
N-(3-dimethylaminopropyl)methacrylamide,
N-(3-diethylaminopropyl)methacrylamide,
N-(4-dimethylaminobutyl)methacrylamide,
N-(4-diethylaminobutyl)methacrylamide,
N-(3-morpholinopropyl)methacrylamide, and
N-(3-cyanopropyl)methacrylamide.

The acrylamide compounds in which $A^4$ is an oxygen atom-bearing group can be exemplified by
N-(3-methoxypropyl)acrylamide,
N-(3-ethoxypropyl)acrylamide,
N-(propoxymethyl)acrylamide,
N-(butoxymethyl)acrylamide,
N-glycidylacrylamide, and
N-tetrahydrofurfurylacrylamide.

The methacrylamide compounds in which $A^4$ is an oxygen atom-bearing group can be exemplified by
N-(3-methoxypropyl)methacrylamide,
N-(3-ethoxypropyl)methacrylamide,
N-(propoxymethyl)methacrylamide,
N-(butoxymethyl)methacrylamide,
N-glycidylmethacrylamide, and
N-tetrahydrofurfurylmethacrylamide.

The acrylamide compounds in which $A^4$ is a group bearing both nitrogen and oxygen atoms can be exemplified by N-(3-di(glycidyl)aminopropyl)acrylamide, and N-(3-di(tetrahydrofurfuryl)aminopropyl)acrylamide.

The methacrylamide compounds in which $A^4$ is a group bearing both nitrogen and oxygen atoms can be exemplified by N-(3-di(glycidyl)aminopropyl)methacrylamide, and N-(3-di(tetrahydrofurfuryl)aminopropyl)methacrylamide.

The compounds represented by formula (IV) can also be exemplified by compounds in which $A^3$ is an oxygen atom, such as acrylate compounds and methacrylate compounds.

The acrylate compounds in which $A^4$ is a nitrogen atom-bearing group can be exemplified by 2-dimethylaminoethyl acrylate,
2-diethylaminoethyl acrylate,
3-dimethylaminopropyl acrylate,
3-diethylaminopropyl acrylate,
4-dimethylaminobutyl acrylate, and
4-diethylaminobutyl acrylate.

The methacrylate compounds in which $A^4$ is a nitrogen atom-bearing group can be exemplified by
2-dimethylaminoethyl methacrylate,
2-diethylaminoethyl methacrylate,
3-dimethylaminopropyl methacrylate,
3-diethylaminopropyl methacrylate,
4-dimethylaminobutyl methacrylate, and
4-diethylaminobutyl methacrylate.

The acrylate compounds in which $A^4$ is an oxygen atom-bearing group can be exemplified by
2-ethoxyethyl acrylate,
2-propoxyethyl acrylate,
2-butoxyethyl acrylate,
3-methoxypropyl acrylate,
3-ethoxypropyl acrylate,
glycidyl acrylate, and
tetrahydrofurfuryl acrylate.

The methacrylate compounds in which $A^4$ is an oxygen atom-bearing group can be exemplified by
2-ethoxyethyl methacrylate,
2-propoxyethyl methacrylate,
2-butoxyethyl methacrylate,
3-methoxypropyl methacrylate,
3-ethoxypropyl methacrylate,
glycidyl methacrylate, and
tetrahydrofurfuryl methacrylate.

The acrylate compounds in which $A^4$ is a group bearing both nitrogen and oxygen atoms can be exemplified by
3-di(glycidyl)aminopropyl acrylate, and
3-di(tetrahydrofurfuryl)aminopropyl acrylate.

The methacrylate compounds in which $A^4$ is a group bearing both nitrogen and oxygen atoms can be exemplified by 3-di(glycidyl)aminopropyl methacrylate, and
3-di(tetrahydrofurfuryl)aminopropyl methacrylate.

In view of enhancing the fuel economy, wet-grip performance, and abrasion resistance in a balanced manner, the compound represented by formula (IV) is preferably a compound in which $A^4$ is a group represented by formula (IVa), more preferably a compound in which $A^3$ is an amino group and $A^4$ is a group represented by formula (IVa), and still more preferably a compound in which $A^3$ is a secondary amino group (—NH—) and $A^4$ is a group represented by formula (IVa).

The compound in which $A^3$ is a secondary amino group and $A^4$ is a group represented by formula (IVa) is preferably an N-(3-dialkylaminopropyl)acrylamide or an N-(3-dialkylaminopropyl)methacrylamide, and more preferably
N-(3-dimethylaminopropyl)acrylamide,
N-(3-diethylaminopropyl)acrylamide,
N-(3-dimethylaminopropyl)methacrylamide, or
N-(3-diethylaminopropyl)methacrylamide.

The following explains the silicon compound (modifying agent 4) containing a group represented by formula (V) below and/or a group represented by formula (VI) below.

(V)

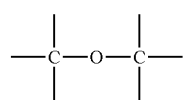

(VI)

Examples of groups containing the group represented by formula (V) include an amide group, a carboxylic acid ester group, a methacryloyl group, and an acryloyl group. Examples of groups containing the group represented by formula (VI) include oxydialkylene groups such as oxydimethylene and oxydiethylene groups; and alkylene oxide groups such as epoxy and tetrahydrofuranyl groups.

As used herein, the term "alkylene oxide group" denotes a monovalent group obtained by removing a hydrogen atom from the ring of a cyclic ether compound.

The silicon compound preferably contains a group represented by the following formula (VIII):

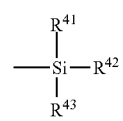

(VIII)

wherein $R^{41}$, $R^{12}$, and $R^{43}$ each independently represent a $C_{1-4}$ hydrocarbyl group or a $C_{1-4}$ hydrocarbyloxy group, and at least one of $R^{41}$, $R^{42}$, and $R^{43}$ is a hydrocarbyloxy group.

The hydrocarbyl groups encompassed by $R^{41}$, $R^{42}$, and $R^{43}$ in formula (VIII) can be exemplified by alkyl groups such as methyl, ethyl, n-propyl, isopropyl, n-butyl, sec-butyl, and tert-butyl groups. The hydrocarbyloxy groups encompassed by $R^{41}$, $R^{42}$, and $R^{43}$ can be exemplified by alkoxy groups such as methoxy, ethoxy, n-propoxy, isopropoxy, n-butoxy, sec-butoxy, and t-butoxy groups.

The hydrocarbyl group encompassed by $R^{41}$, $R^{42}$, and $R^{43}$ is preferably an alkyl group, more preferably a $C_{1-3}$ alkyl group, and still more preferably a methyl group or an ethyl group. The hydrocarbyloxy group encompassed by $R^{41}$, $R^{42}$, and $R^{43}$ is preferably an alkoxy group, more preferably a $C_{1-3}$ alkoxy group, and still more preferably a methoxy group or an ethoxy group.

In view of enhancing the fuel economy, wet-grip performance, and abrasion resistance in a balanced manner, preferably at least two of $R^{41}$, $R^{42}$, and $R^{43}$ are hydrocarbyloxy groups, and more preferably the three of $R^{41}$, $R^{42}$, and $R^{43}$ are hydrocarbyloxy groups.

The silicon compounds containing a group represented by formula (V) and a group represented by formula (VIII) can be exemplified by silicon compounds containing a group represented by the following formula (Va):

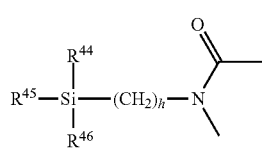

(Va)

wherein h represents an integer of 1 to 10; and $R^{44}$, $R^{45}$, and $R^{46}$ each independently represent a $C_{1-4}$ hydrocarbyl group or a $C_{1-4}$ hydrocarbyloxy group, and at least one of $R^{44}$, $R^{45}$, and $R^{46}$ is a hydrocarbyloxy group.

Here, h represents an integer of 1 to 10, and is preferably not less than 2 in view of enhancing the fuel economy, wet-grip performance, and abrasion resistance in a balanced manner, whereas h is preferably not more than 4 in view of enhancing the economic efficiency of the production. Particularly preferably, h is 3.

Exemplary groups and preferred groups for $R^{44}$, $R^{45}$, and $R^{46}$ are the same as the exemplary groups and preferred groups mentioned above for $R^{41}$, $R^{42}$, and $R^{43}$ in formula (VIII).

The silicon compounds containing a group represented by formula (Va) can be exemplified by compounds represented by the following formula (Va-1) and compounds represented by the following formula (Va-2):

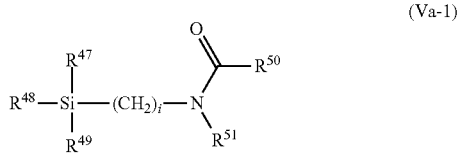

(Va-1)

wherein i represents an integer of 1 to 10; $R^{47}$, $R^{41}$, and $R^{49}$ each independently represent a $C_{1-4}$ hydrocarbyl group or a $C_{1-4}$ hydrocarbyloxy group, and at least one of $R^{47}$, $R^{40}$, and $R^{49}$ is a hydrocarbyloxy group; and $R^{50}$ and $R^{51}$ each independently represent a $C_{1-10}$ hydrocarbyl group, a $C_{1-10}$ substituted hydrocarbyl group, a $C_{1-10}$ hydrocarbyloxy group, or a $C_{1-10}$ substituted hydrocarbyloxy group, and $R^{50}$ and $R^{51}$ may be bonded to each other;

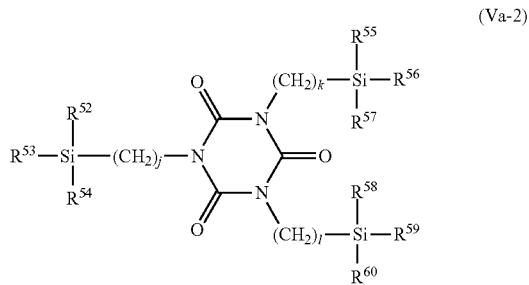

(Va-2)

wherein j, k, and l each independently represent an integer of 1 to 10; and $R^{52}$ to $R^{60}$ each independently represent a $C_{1-4}$ hydrocarbyl group or a $C_{1-4}$ hydrocarbyloxy group, at least one of $R^{52}$, $R^{53}$, and $R^{54}$ is a hydrocarbyloxy group, at least one of $R^{55}$, $R^{56}$, and $R^{57}$ is a hydrocarbyloxy group, and at least one of $R^{58}$, $R^{59}$, and $R^{60}$ is a hydrocarbyloxy group.

In formula (Va-1), i represents an integer of 1 to 10. Here, i is preferably not less than 2 in view of enhancing the fuel economy, wet-grip performance, and abrasion resistance in a balanced manner, whereas i is preferably not more than 4 in view of enhancing the economic efficiency of the production. Particularly preferably, i is 3.

The hydrocarbyl groups encompassed by $R^{47}$, $R^{48}$, and $R^{49}$ in formula (Va-1) can be exemplified by alkyl groups such as methyl, ethyl, n-propyl, isopropyl, n-butyl, sec-butyl, and tert-butyl groups. The hydrocarbyloxy groups encompassed by $R^{47}$, $R^{48}$, and $R^{49}$ can be exemplified by alkoxy groups such as methoxy, ethoxy, n-propoxy, isopropoxy, n-butoxy, sec-butoxy, and t-butoxy groups.

The hydrocarbyl group encompassed by $R^{47}$, $R^{48}$, and $R^{49}$ is preferably an alkyl group, more preferably a $C_{1-3}$ alkyl group, and still more preferably a methyl group or an ethyl group. The hydrocarbyloxy group encompassed by $R^{47}$, $R^{48}$, and $R^{49}$ is preferably an alkoxy group, more preferably a $C_{1-10}$ alkoxy group, and still more preferably a methoxy group or an ethoxy group.

With regard to $R^{47}$, $R^{48}$, and $R^{49}$, in view of enhancing the fuel economy, wet-grip performance, and abrasion resistance in a balanced manner, preferably at least two of $R^{47}$, $R^{48}$, and $R^{49}$ are hydrocarbyloxy groups, and more preferably the three of $R^{47}$, $R^{48}$, and $R^{49}$ are hydrocarbyloxy groups.

The hydrocarbyl groups encompassed by $R^{50}$ and $R^{51}$ can be exemplified by alkyl groups such as methyl, ethyl, n-propyl, isopropyl, n-butyl, sec-butyl, and tert-butyl groups.

The substituted hydrocarbyl groups encompassed by $R^{50}$ and $R^{51}$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups. The groups containing a silicon atom-bearing group as a substituent can be exemplified by trialkylsilylalkyl groups such as trimethylsilylmethyl and triethylsilylmethyl groups.

The hydrocarbyloxy groups encompassed by $R^{50}$ and $R^{51}$ can be exemplified by alkoxy groups such as methoxy, ethoxy, n-propoxy, isopropoxy, n-butoxy, sec-butoxy, and t-butoxy groups. The substituted hydrocarbyloxy groups encompassed by $R^{50}$ and $R^{51}$ can be exemplified by alkoxyalkoxy groups such as methoxymethoxy, methoxyethoxy, ethoxymethoxy, and ethoxyethoxy groups.

The groups in which $R^{50}$ and $R^{51}$ are bonded to each other can be exemplified by $C_{2-12}$ divalent groups optionally containing at least one atom selected from the group consisting of a nitrogen atom, an oxygen atom, and a silicon atom. Specific examples thereof include alkylene groups such as trimethylene, tetramethylene, pentamethylene, and hexamethylene groups; oxydialkylene groups such as oxydiethylene and oxydipropylene groups; and nitrogenous groups such as a group represented by —$CH_2CH_2$—NH—$CH_2$— and a group represented by —$CH_2CH_2$—N═CH—.

$R^{50}$ is preferably an alkyl group, more preferably a $C_{1-4}$ alkyl group, and still more preferably a methyl group or an ethyl group.

$R^{51}$ is preferably an alkyl group, more preferably a $C_{1-4}$ alkyl group, and still more preferably a methyl group or an ethyl group.

In formula (Va-2), j, k, and l each independently represent an integer of 1 to 10, and are each independently preferably not less than 2 in view of enhancing the fuel economy, wet-grip performance, and abrasion resistance in a balanced manner, whereas j, k, and l are each independently preferably not more than 4 in view of enhancing the economic efficiency of the production. Particularly preferably, j, k, and l are each independently 3.

The hydrocarbyl groups encompassed by $R^{52}$ to $R^{60}$ in formula (Va-2) can be exemplified by alkyl groups such as methyl, ethyl, n-propyl, isopropyl, n-butyl, sec-butyl, and tert-butyl groups. The hydrocarbyloxy groups encompassed by $R^{52}$ to $R^{60}$ can be exemplified by alkoxy groups such as methoxy, ethoxy, n-propoxy, isopropoxy, n-butoxy, sec-butoxy, and t-butoxy groups.

The hydrocarbyl group encompassed by $R^{52}$ to $R^{60}$ is preferably an alkyl group, more preferably a $C_{1-3}$ alkyl group, and still more preferably a methyl group or an ethyl group. The hydrocarbyloxy group encompassed by $R^{52}$ to $R^{60}$ is preferably an alkoxy group, more preferably a $C_{1-3}$ alkoxy group, and still more preferably a methoxy group or an ethoxy group.

With regard to $R^{52}$, $R^{53}$, and $R^{54}$, in view of enhancing the fuel economy, wet-grip performance, and abrasion resistance in a balanced manner, preferably at least two of $R^{52}$, $R^{53}$, and $R^{54}$ are hydrocarbyloxy groups, and more preferably the three of $R^{52}$, $R^{53}$, and $R^{54}$ are hydrocarbyloxy groups. With regard to $R^{55}$, $R^{56}$, and $R^{57}$, in view of enhancing the fuel economy, wet-grip performance, and abrasion resistance in a balanced manner, preferably at least two of $R^{55}$, $R^{56}$, and $R^{57}$ are hydrocarbyloxy groups, and more preferably the three of $R^{55}$, $R^{56}$, and $R^{57}$ are hydrocarbyloxy groups. With regard to $R^{58}$, $R^{59}$, and $R^{60}$, in view of enhancing the fuel economy, wet-grip performance, and abrasion resistance in a balanced manner, preferably at least two of $R^{58}$, $R^{59}$, and $R^{60}$ are hydrocarbyloxy groups, and more preferably the three of $R^{58}$, $R^{59}$, and $R^{60}$ are hydrocarbyloxy groups.

The compounds represented by formula (Va-1) can be exemplified by N-alkyl-N-trialkoxysilylalkyl-substituted carboxylic acid amides such as
N-alkyl-N-trialkoxysilylalkyl-acetamides, e.g.,
N-methyl-N-(trimethoxysilylmethyl)acetamide,
N-methyl-N-(triethoxysilylmethyl)acetamide,
N-methyl-N-(2-trimethoxysilylethyl)acetamide,
N-methyl-N-(2-triethoxysilylethyl)acetamide,
N-methyl-N-(3-trimethoxysilylpropyl)acetamide, and
N-methyl-N-(3-triethoxysilylpropyl)acetamide; and
N-alkyl-N-trialkoxysilylalkyl-propionamides, e.g.,
N-methyl-N-(trimethoxysilylmethyl)propionamide,
N-methyl-N-(triethoxysilylmethyl)propionamide,
N-methyl-N-(2-trimethoxysilylethyl)propionamide,
N-methyl-N-(2-triethoxysilylethyl)propionamide,
N-methyl-N-(3-trimethoxysilylpropyl)propionamide, and
N-methyl-N-(3-triethoxysilylpropyl)propionamide.

The compound represented by formula (Va-1) is preferably an N-alkyl-N-trialkoxysilylalkyl-substituted carboxylic acid amide, more preferably an N-alkyl-N-trialkoxysilylalkyl-propionamide, and still more preferably N-methyl-N-(3-trimethoxysilylpropyl)-propionamide or N-methyl-N-(3-triethoxysilylpropyl)-propionamide.

The compounds represented by formula (Va-2) can be exemplified by 1,3,5-tris(trialkoxysilylalkyl)-isocyanurates such as
1,3,5-tris(trimethoxysilylmethyl)isocyanurate,
1,3,5-tris(triethoxysilylmethyl)isocyanurate,
1,3,5-tris(trimethoxysilylethyl)isocyanurate,
1,3,5-tris(triethoxysilylethyl)isocyanurate,
1,3,5-tris(3-trimethoxysilylpropyl)isocyanurate, and
1,3,5-tris(3-triethoxysilylpropyl)isocyanurate.

The compound represented by formula (Va-2) is preferably 1,3,5-tris(3-trimethoxysilylpropyl)isocyanurate, or 1,3,5-tris(3-triethoxysilylpropyl)isocyanurate.

The silicon compounds containing a group represented by formula (VI) and a group represented by formula (VIII) can be exemplified by silicon compounds represented by the following formula (VIa):

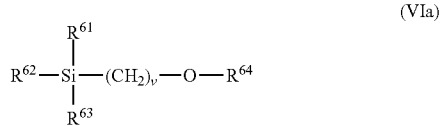

(VIa)

wherein v represents an integer of 1 to 10; $R^{61}$, $R^{62}$, and $R^{63}$ each independently represent a $C_{1-4}$ hydrocarbyl group or a $C_{1-4}$ hydrocarbyloxy group, and at least one of $R^{61}$, $R^{62}$, and $R^{63}$ is a hydrocarbyloxy group; and $R^{64}$ represents a $C_{1-10}$ hydrocarbyl group or a $C_{1-10}$ substituted hydrocarbyl group.

In formula (VIa), v represents an integer of 1 to 10. Preferably, v is not less than 2 in view of enhancing the fuel economy, wet-grip performance, and abrasion resistance in a balanced manner. Preferably, v is not more than 4 in view of enhancing the economic efficiency of the production. Particularly preferably, v is 3.

The hydrocarbyl groups encompassed by $R^{61}$, $R^{62}$, and $R^{63}$ in formula (VIa) can be exemplified by alkyl groups such as methyl, ethyl, n-propyl, isopropyl, n-butyl, sec-butyl, and tert-butyl groups. The hydrocarbyloxy groups encompassed by $R^{61}$, $R^{62}$, and $R^{63}$ can be exemplified by alkoxy groups such as methoxy, ethoxy, n-propoxy, iso-propoxy, n-butoxy, sec-butoxy, and t-butoxy groups.

The hydrocarbyl group encompassed by $R^{61}$, $R^{62}$, and $R^{63}$ is preferably an alkyl group, more preferably a $C_{1-3}$ alkyl group, and still more preferably a methyl group or an ethyl group. The hydrocarbyloxy group encompassed by $R^{61}$, $R^{62}$, and $R^{63}$ is preferably an alkoxy group, more preferably a $C_{1-3}$ alkoxy group, and still more preferably a methoxy group or an ethoxy group.

With regard to $R^{61}$, $R^{62}$, and $R^{63}$, in view of enhancing the fuel economy, wet-grip performance, and abrasion resistance in a balanced manner, preferably at least two of $R^{61}$, $R^{62}$, and $R^{63}$ are hydrocarbyloxy groups, and more preferably the three of $R^{61}$, $R^{62}$, and $R^{63}$ are hydrocarbyloxy groups.

The hydrocarbyl groups encompassed by $R^{64}$ can be exemplified by alkyl groups such as methyl, ethyl, n-propyl, isopropyl, n-butyl, sec-butyl, and tert-butyl groups.

The substituted hydrocarbyl groups encompassed by $R^{64}$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups; and alkylene oxide alkyl groups such as glycidyl and tetrahydrofurfuryl groups. The groups containing a silicon atom-bearing group as a substituent can be exemplified by trialkylsilylalkyl groups such as a trimethylsilylmethyl group.

As used herein, the term "alkylene oxide alkyl group" denotes a group obtained by substituting at least one hydrogen atom of an alkyl group by an alkylene oxide group.

$R^{64}$ is preferably an alkylene oxide alkyl group, and more preferably a glycidyl group or a tetrahydrofurfuryl group.

The compounds represented by formula (VIa) in which $R^{64}$ is an alkyl group can be exemplified by
3-(alkoxy)propyltrialkoxysilanes such as
3-(methoxy)propyltrimethoxysilane,
3-(ethoxy)propyltrimethoxysilane,
3-(n-propoxy)propyltrimethoxysilane,
3-(isopropoxy)propyltrimethoxysilane,
3-(n-butoxy)propyltrimethoxysilane,
3-(sec-butoxy)propyltrimethoxysilane, and
3-(t-butoxy)propyltrimethoxysilane.

The compounds represented by formula (VIa) in which $R^{64}$ is an alkylene oxide alkyl group can be exemplified by glycidoxyalkyltrialkoxysilanes such as 2-glycidoxyethyltrimethoxysilane,
3-glycidoxypropyltrimethoxysilane,
2-glycidoxyethyltriethoxysilane, and
3-glycidoxypropyltriethoxysilane; and
tetrahydrofurfuryloxyalkyltrialkoxysilanes such as
2-tetrahydrofurfuryloxyethyltrimethoxysilane,
3-tetrahydrofurfuryloxypropyltrimethoxysilane,
2-tetrahydrofurfuryloxyethyltriethoxysilane, and 3-tetrahydrofurfuryloxypropyltriethoxysilane.

The compounds represented by formula (VIa) in which $R^{64}$ is an alkoxyalkyl group can be exemplified by 3-(alkoxyalkoxy)propyltrialkoxysilanes such as
3-(methoxymethoxy)propyltrimethoxysilane,
3-(methoxyethoxy)propyltrimethoxysilane,
3-(ethoxymethoxy)propyltrimethoxysilane,
3-(ethoxyethoxy)propyltrimethoxysilane,
3-(methoxymethoxy)propyltriethoxysilane,
3-(methoxyethoxy)propyltriethoxysilane,
3-(ethoxymethoxy)propyltriethoxysilane, and
3-(ethoxyethoxy)propyltriethoxysilane.

The compound represented by formula (VIa) is preferably a compound in which $R^{64}$ is an alkylene oxide alkyl group, and more preferably
3-glycidoxypropyltrimethoxysilane,
3-glycidoxypropyltriethoxysilane,
3-tetrahydrofurfuryloxypropyltrimethoxysilane, or
3-tetrahydrofurfuryloxypropyltriethoxysilane.

The silicon compounds containing a group represented by formula (V), a group represented by formula (VI), and a group represented by formula (VIII) can be exemplified by acryloxyalkyltrialkoxysilanes, and methacryloxyalkyltrialkoxysilanes.

The acryloxyalkyltrialkoxysilanes can be exemplified by 3-acryloxypropyltrialkoxysilanes such as
3-acryloxypropyltrimethoxysilane and
3-acryloxypropyltriethoxysilane.

The methacryloxyalkyltrialkoxysilanes can be exemplified by 3-methacryloxypropyltrialkoxysilanes such as
3-methacryloxypropyltrimethoxysilane, and
3-methacryloxypropyltriethoxysilane.

The silicon compounds containing a group represented by formula (V), a group represented by formula (VI), and a group represented by formula (VIII) can be further exemplified by trialkoxysilylalkylsuccinic anhydrides and trialkoxysilylalkylmaleic anhydrides.

The trialkoxysilylalkylsuccinic anhydrides can be exemplified by 3-trialkoxysilylpropylsuccinic anhydrides such as 3-trimethoxysilylpropylsuccinic anhydride and 3-triethoxysilylpropylsuccinic anhydride.

The trialkoxysilylalkylmaleic anhydrides can be exemplified by 3-trialkoxysilylpropylmaleic anhydrides such as 3-trimethoxysilylpropylmaleic anhydride and 3-triethoxysilylpropylmaleic anhydride.

The following explains the compound (modifying agent 5) containing a group represented by formula (VII) below.

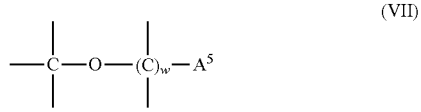

(VII)

In the formula, w represents an integer of 1 to 11, and $A^5$ represents a nitrogen atom-bearing functional group.

Here, w represents an integer of 1 to 11, and is preferably not less than 1 in view of enhancing the fuel economy, wet-grip performance, and abrasion resistance in a balanced manner, whereas w is preferably not more than 4 in view of enhancing the economic efficiency of the production. $A^5$ represents a nitrogen atom-bearing functional group and examples thereof include amino, isocyano, cyano, pyridyl, piperidyl, pyrazinyl, and morpholino groups.

The compounds containing a group represented by formula (VII) can be exemplified by compounds represented by the following formula (VII-1):

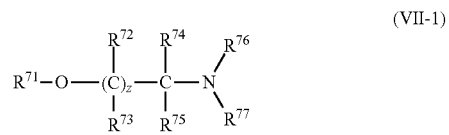

(VII-1)

wherein z represents an integer of 0 to 10; $R^{71}$ represents a $C_{1-5}$ hydrocarbyl group; $R^{72}$, $R^{73}$, $R^{74}$ and $R^{75}$ each independently represent a hydrogen atom, a $C_{1-5}$ hydrocarbyl group, a $C_{1-5}$ substituted hydrocarbyl group, or a $C_{1-5}$ hydrocarbyloxy group, and when a plurality of $R^{72}$'s and a plurality of $R^{73}$'s are present, the plurality of $R^{72}$'s and the plurality of $R^{73}$'s may be the same as or different from one another; and $R^{76}$ and $R^{77}$ each independently represent a $C_{1-6}$ group optionally containing at least one atom selected from the group consisting of a nitrogen atom, an oxygen atom, and a silicon atom, $R^{76}$ and $R^{77}$ may be bonded to each other to form a cyclic structure together with the nitrogen atom, and $R^{76}$ and $R^{77}$ may form a single group bonded to the nitrogen via a double bond.

In formula (VII-1), z represents an integer of 0 to 10. In view of enhancing the economic efficiency, z is preferably not more than 3, and more preferably 0.

$R^{71}$ in formula (VII-1) represents a $C_{1-5}$ hydrocarbyl group. The hydrocarbyl groups encompassed by $R^{71}$ can be exemplified by alkyl groups such as methyl, ethyl, n-propyl, isopropyl, n-butyl, sec-butyl, and t-butyl groups.

The hydrocarbyl group encompassed by $R^{71}$ is preferably an alkyl group, more preferably a $C_{1-4}$ alkyl group, and still more preferably a methyl group or an ethyl group.

$R^{72}$ to $R^{75}$ in formula (VII-1) each independently represent a hydrogen atom, a $C_{1-5}$ hydrocarbyl group, a $C_{1-5}$ substituted hydrocarbyl group, or a $C_{1-5}$ hydrocarbyloxy group, and when a plurality of $R^{72}$'s and a plurality of $R^{73}$'s are present, the plurality of $R^{72}$'s and the plurality of $R^{73}$'s may be the same as or different from one another.

The hydrocarbyl groups encompassed by $R^{72}$ to $R^{75}$ can be exemplified by alkyl groups such as methyl, ethyl, n-propyl, isopropyl, n-butyl, sec-butyl, and t-butyl groups.

The substituted hydrocarbyl groups encompassed by $R^{72}$ to $R^{75}$ can be exemplified by substituted hydrocarbyl groups containing as a substituent at least one group selected from the group consisting of nitrogen atom-bearing groups and oxygen atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups.

The hydrocarbyloxy groups encompassed by $R^{72}$ to $R^{75}$ can be exemplified by alkoxy groups such as methoxy, ethoxy, n-propoxy, isopropoxy, n-butoxy, sec-butoxy, and t-butoxy groups.

The hydrocarbyl group encompassed by $R^{72}$ to $R^{75}$ is preferably an alkyl group, more preferably a $C_{1-4}$ alkyl group, and still more preferably a methyl group or an ethyl group.

The substituted hydrocarbyl group encompassed by $R^{72}$ to $R^{75}$ is preferably an alkoxyalkyl group, more preferably a $C_{1-4}$ alkoxyalkyl group, and still more preferably a methoxymethyl group or an ethoxyethyl group.

The hydrocarbyloxy group encompassed by $R^{72}$ to $R^{75}$ is preferably an alkoxy group, more preferably a $C_{1-3}$ alkoxy group, and still more preferably a methoxy group or an ethoxy group.

In view of economic efficiency and in view of enhancing the fuel economy, wet-grip performance, and abrasion resistance in a balanced manner, preferably one of $R^{74}$ and $R^{75}$ is a hydrogen atom. More preferably, one of $R^{74}$ and $R^{75}$ is a hydrogen atom and the other is an alkyl group or an alkoxy group. Still more preferably, one of $R^{74}$ and $R^{75}$ is a hydrogen atom and the other is an alkoxy group, particularly preferably a methoxy group or an ethoxy group.

$R^{76}$ and $R^{77}$ in formula (VII-1) each independently represent a $C_{1-6}$ group optionally containing at least one atom selected from the group consisting of a nitrogen atom, an oxygen atom, and a silicon atom; $R^{76}$ and $R^{77}$ may be bonded to each other to form a cyclic structure together with the nitrogen atom; and $R^{76}$ and $R^{77}$ may form a single group bonded to the nitrogen via a double bond.

Examples of $R^{76}$ and $R^{77}$ in formula (VII-1) include $C_{1-6}$ hydrocarbyl groups, $C_{1-6}$ substituted hydrocarbyl groups, and substituted silyl groups.

The hydrocarbyl groups encompassed by $R^{76}$ and $R^{77}$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The substituted hydrocarbyl groups encompassed by $R^{76}$ and $R^{77}$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups; alkylene oxide groups such as epoxy and tetrahydrofuranyl groups; and alkylene oxide alkyl groups such as glycidyl and tetrahydrofurfuryl groups. The groups containing a silicon atom-bearing group as a substituent can be exemplified by trialkylsilylalkyl groups such as a trimethylsilylmethyl group.

As used herein, the term "alkylene oxide group" denotes a monovalent group obtained by removing a hydrogen atom from the ring of a cyclic ether compound. The term "alkylene oxide alkyl group" denotes a group obtained by substituting at least one hydrogen atom of an alkyl group by an alkylene oxide group.

The substituted silyl groups encompassed by $R^{76}$ and $R^{77}$ can be exemplified by trialkylsilyl groups such as trimethylsilyl, triethylsilyl, and t-butyldimethylsilyl groups; and trialkoxysilyl groups such as a trimethoxysilyl group.

The groups in which $R^{76}$ and $R^{77}$ are bonded to each other can be exemplified by $C_{2-12}$ divalent groups optionally containing at least one atom selected from the group consisting of a nitrogen atom, an oxygen atom, and a silicon atom. Specific examples thereof include alkylene groups such as trimethylene, tetramethylene, pentamethylene, and hexamethylene groups; oxydialkylene groups such as oxydiethylene and oxydipropylene groups; and nitrogenous groups such as a group represented by —$CH_2CH_2$—NH—$CH_2$— and a group represented by —$CH_2CH_2$—N=CH—.

The group in which $R^{76}$ and $R^{77}$ are bonded to each other is preferably a nitrogenous group, and more preferably a group represented by —$CH_2CH_2$—NH—$CH_2$— or a group represented by —$CH_2CH_2$—N=CH—.

Examples of the single group bonded to the nitrogen via a double bond, formed by $R^{76}$ and $R^{77}$, include $C_{2-12}$ divalent groups optionally containing at least one atom selected from the group consisting of a nitrogen atom, an oxygen atom, and a silicon atom. Specific examples include an ethylidene group, a 1-methylpropylidene group, a 1,3-dimethylbutylidene group, a 1-methylethylidene group, and a 4-N,N-dimethylaminobenzylidene group.

The hydrocarbyl group encompassed by $R^{76}$ and $R^{77}$ is preferably an alkyl group, more preferably a $C_{1-4}$ alkyl group, still more preferably a methyl group, an ethyl group, an n-propyl group, or an n-butyl group, and further preferably a methyl group or an ethyl group. The substituted hydrocarbyl group encompassed by $R^{76}$ and $R^{77}$ is preferably an alkoxyalkyl group, an alkylene oxide group, or an alkylene oxide alkyl group. The substituted silyl group encompassed by $R^{76}$ and $R^{77}$ is preferably a trialkylsilyl group or a trialkoxysilyl group, more preferably a trialkylsilyl group, and still more preferably a trimethylsilyl group or a triethylsilyl group.

Preferably, $R^{76}$ and $R^{77}$ are a nitrogenous group in which $R^{76}$ and $R^{77}$ are bonded to each other, or are each independently an alkyl group, an alkoxyalkyl group, or a substituted silyl group. $R^{76}$ and $R^{77}$ are each independently more preferably a $C_{1-4}$ alkyl group, still more preferably a methyl group, an ethyl group, an n-propyl group, or an n-butyl group, and further preferably a methyl group or an ethyl group.

Examples of the amino group in which $R^{76}$ and $R^{77}$ are bonded to the nitrogen atom include acyclic amino groups and cyclic amino groups.

Examples of the acyclic amino groups include dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino groups; di(alkoxyalkyl)amino groups such as di(methoxymethyl)amino, di(methoxyethyl)amino, di(ethoxymethyl)amino, and di(ethoxyethyl)amino groups; and di(trialkylsilyl)amino groups such as di(trimethylsilyl)amino and di(t-butyldimethylsilyl)amino groups. Other examples include di(alkylene oxide)amino groups such as di(epoxy)amino and di(tetrahydrofuranyl)amino groups; and di(alkylene oxide alkyl)amino groups such as di(glycidyl)amino and di(tetrahydrofurfuryl)amino groups. Additional examples include ethylideneamino, 1-methylpropylideneamino, 1,3-dimethylbutylideneamino, 1-methylethylideneamino, and 4-N,N-dimethylaminobenzylideneamino groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino groups can also be exemplified by 1-imidazolyl, 4,5-dihydro-1-imidazolyl, 1-imidazolidinyl, 1-piperazinyl, and morpholino groups.

In view of fuel economy, wet-grip performance, abrasion resistance, and long-term stability and easy availability of the compound, the amino group in which $R^{76}$ and $R^{7}$ are bonded to the nitrogen atom is preferably an acyclic amino group, more preferably a dialkylamino group, and still more preferably a dimethylamino group or a diethylamino group.

The compounds represented by formula (VII-1) can be exemplified by N,N-dialkyl-substituted carboxylic acid amide dialkyl acetal compounds.

The N,N-dialkyl-substituted carboxylic acid amide dialkyl acetal compounds can be exemplified by N,N-dialkylformamide dialkyl acetals such as N,N-dimethylformamide dimethyl acetal, N,N-diethylformamide dimethyl acetal, N,N-di(n-propyl)formamide dimethyl acetal, N,N-dimethylformamide diethyl acetal, N,N-diethylformamide diethyl acetal, N,N-di(n-propyl)formamide diethyl acetal, N,N-dimethylformamide ethyl methyl acetal, N,N-diethylformamide ethyl methyl acetal, and N,N-di(n-propyl)formamide ethyl methyl acetal; N,N-dialkylacetamide dialkyl acetals such as N,N-dimethylacetamide dimethyl acetal, N,N-diethylacetamide dimethyl acetal, N,N-di(n-propyl)acetamide dimethyl acetal, N,N-dimethylacetamide diethyl acetal, N,N-diethylacetamide diethyl acetal, N,N-di(n-propyl)acetamide diethyl acetal, N,N-dimethylacetamide ethyl methyl acetal, N,N-diethylacetamide ethyl methyl acetal, and N,N-di(n-propyl)acetamide ethyl methyl acetal; and N,N-dialkylpropionamide dialkyl acetals such as N,N-dimethylpropionamide dimethyl acetal, N,N-diethylpropionamide dimethyl acetal, N,N-di(n-propyl)propionamide dimethyl acetal, N,N-dimethylpropionamide diethyl acetal, N,N-diethylpropionamide diethyl acetal, N,N-di(n-propyl)propionamide diethyl acetal, N,N-dimethylpropionamide ethyl methyl acetal, N,N-diethylpropionamide ethyl methyl acetal, and N,N-di(n-propyl)propionamide ethyl methyl acetal.

In view of enhancing the fuel economy, wet-grip performance, and abrasion resistance in a balanced manner, N,N-dialkylformamide dialkyl acetals are preferred among the preceding, and N,N-dimethylformamide dimethyl acetal, N,N-diethylformamide dimethyl acetal, N,N-dimethylformamide diethyl acetal, and N,N-diethylformamide diethyl acetal are more preferred.

In addition to the conjugated diene-based constituent unit (conjugated diene unit), the conjugated diene polymer may also contain a constituent unit based on another monomer. Such other monomers include aromatic vinyls, vinyl nitriles, unsaturated carboxylic acid esters, and the like. The aromatic vinyls can be exemplified by styrene, α-methylstyrene, vinyltoluene, vinylnaphthalene, divinylbenzene, trivinylbenzene, and divinylnaphthalene. The vinyl nitriles can be exemplified by acrylonitrile. The unsaturated carboxylic acid esters can be exemplified by methyl acrylate, ethyl acrylate, methyl methacrylate, and ethyl methacrylate. Aromatic vinyls are preferred among the preceding, and styrene is more preferred.

The conjugated diene polymer preferably contains an aromatic vinyl-based constituent unit (aromatic vinyl unit) in consideration of abrasion resistance. In this case, the aromatic vinyl unit content, based on a total of 100% by mass of the conjugated diene unit and the aromatic vinyl unit, is preferably at least 10% by mass (the conjugated diene unit content is not more than 90% by mass), and more preferably at least 15% by mass (the conjugated diene unit content is not more than 85% by mass). In view of fuel economy, the aromatic vinyl unit content is preferably not more than 50% by mass (the conjugated diene unit content is at least 50% by mass), and more preferably not more than 45% by mass (the conjugated diene unit content is at least 55% by mass).

In view of fuel economy, the conjugated diene polymer preferably has a vinyl bond content of not more than 80 mol %, more preferably not more than 70 mol %, per 100 mol % of the conjugated diene unit. In view of wet-grip performance, the vinyl bond content is preferably at least 10 mol %, more preferably at least 15 mol %, still more preferably at least 20 mol %, and particularly preferably at least 40 mol %. The vinyl bond content can be determined by infrared spectroscopic analysis from the intensity of the absorption in the vicinity of 910 $cm^{-1}$, which is an absorption peak for a vinyl group.

The molecular weight distribution of the conjugated diene polymer, in view of fuel economy, is preferably 1 to 5, and more preferably 1 to 2. The molecular weight distribution can be determined by measuring the number-average molecular weight (Mn) and the weight-average molecular weight (Mw) by gel permeation chromatography (GPC) and dividing Mw by Mn.

The conjugated diene polymer may suitably be produced by a method including the following Step A and Step B.

(Step A): A step of polymerizing monomers including a conjugated diene and a vinyl compound represented by formula (IX) below in the presence of an alkali metal catalyst in a hydrocarbon solvent to obtain a polymer that contains a constituent unit based on the conjugated diene and a constituent unit based on the vinyl compound represented by the formula (IX) and has an alkali metal derived from the catalyst at least one polymer chain terminal:

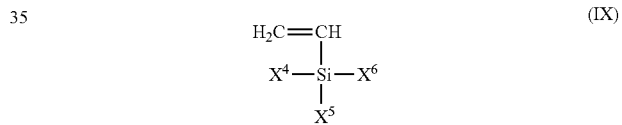

wherein $X^4$, $X^5$, and $X^6$ each independently represent a group represented by formula (IXa) below, a hydrocarbyl group, or a substituted hydrocarbyl group, and at least one of $X^4$, $X^5$, and $X^6$ is a group represented by the following formula (IXa):

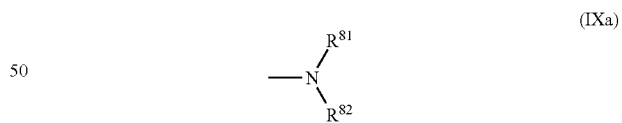

wherein $R^{81}$ and $R^{82}$ each independently represent a $C_{1-6}$ hydrocarbyl group, a $C_{1-6}$ substituted hydrocarbyl group, a silyl group, or a substituted silyl group, and $R^{81}$ and $R^{82}$ may be bonded to each other to form a cyclic structure together with the nitrogen atom.

(Step B): A step of reacting the polymer obtained in Step A with at least one of the modifying agents 1 to 5.

The alkali metal catalysts that can be used in (Step A) can be exemplified by alkali metals, organoalkali metal compounds, alkali metal/polar compound complexes, and alkali metal-containing oligomers. Examples of the alkali metals include lithium, sodium, potassium, rubidium, and cesium. Examples of the organoalkali metal compounds include ethyllithium, n-propyllithium, iso-propyllithium, n-butyllithium, sec-butyllithium, t-octyllithium, n-decyllithium, phenyllithium, 2-naphthyllithium, 2-butylphenyllithium, 4-phenylbutyllithium, cyclohexyllithium, 4-cyclopentyllithium, dimethylaminopropyllithium, diethylaminopropyllithium, t-butyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, and potassium naphthalenide. Examples of the alkali metal/polar compound complex include potassium-tetrahydrofuran complexes and potassium-diethoxyethane complexes. Examples of the alkali metal-containing oligomers include sodium salts of α-methylstyrene tetramer. Organolithium compounds and organosodium compounds are preferred among the preceding, and $C_{2-20}$ organolithium or organosodium compounds are more preferred.

The hydrocarbon solvent used in (Step A) is a solvent that does not deactivate the organoalkali metal compound catalyst, and examples thereof include aliphatic hydrocarbons, aromatic hydrocarbons, and alicyclic hydrocarbons. The aliphatic hydrocarbons can be exemplified by propane, n-butane, iso-butane, n-pentane, iso-pentane, n-hexane, propene, 1-butene, iso-butene, trans-2-butene, cis-2-butene, 1-pentene, 2-pentene, 1-hexene, and 2-hexene. The aromatic hydrocarbons can be exemplified by benzene, toluene, xylene, and ethylbenzene. The alicyclic hydrocarbons can be exemplified by cyclopentane and cyclohexane. These may be used alone or two or more may be used in combination. $C_{2-12}$ hydrocarbons are preferred among the preceding.

In (Step A), monomers including a conjugated diene and a vinyl compound represented by formula (IX) are polymerized to produce a conjugated diene polymer having an alkali metal derived from the above-described alkali metal catalyst at a polymer chain terminal. The conjugated dienes can be exemplified by 1,3-butadiene, isoprene, 1,3-pentadiene, 2,3-dimethyl-1,3-butadiene, and 1,3-hexadiene. These may be used alone or two or more may be used in combination. In view of ease of availability, 1,3-butadiene and isoprene are preferred among the preceding.

$X^4$, $X^5$, and $X^6$ in formula (IX) each independently represent a group represented by formula (IXa), a hydrocarbyl group, or a substituted hydrocarbyl group, and at least one of $X^4$, $X^5$, and $X^6$ is a group represented by formula (IXa).

$R^{81}$ and $R^{82}$ in formula (IXa) each independently represent a $C_{1-6}$ hydrocarbyl group, a $C_{1-6}$ substituted hydrocarbyl group, a silyl group, or a substituted silyl group, and $R^{81}$ and $R^{82}$ may be bonded to each other to form a cyclic structure together with the nitrogen atom.

The $C_{1-6}$ hydrocarbyl groups encompassed by $R^{81}$ and $R^{82}$ can be exemplified by alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and a phenyl group.

The $C_{1-6}$ substituted hydrocarbyl groups encompassed by $R^{81}$ and $R^{82}$ can be exemplified by substituted hydrocarbyl groups containing as a substituent at least one group selected from the group consisting of nitrogen atom-bearing groups, oxygen atom-bearing groups, and silicon atom-bearing groups. The groups containing a nitrogen atom-bearing group as a substituent can be exemplified by dialkylaminoalkyl groups such as dimethylaminoethyl and diethylaminoethyl groups. The groups containing an oxygen atom-bearing group as a substituent can be exemplified by alkoxyalkyl groups such as methoxymethyl, methoxyethyl, ethoxymethyl, and ethoxyethyl groups. The groups containing a silicon atom-bearing group as a substituent can be exemplified by trialkylsilylalkyl groups such as a trimethylsilylmethyl group.

The substituted silyl groups encompassed by $R^{81}$ and $R^{82}$ can be exemplified by trialkylsilyl groups such as trimethylsilyl, triethylsilyl, and t-butyldimethylsilyl groups.

The groups in which $R^{81}$ and $R^{82}$ are bonded to each other can be exemplified by $C_{1-12}$ divalent groups optionally containing at least one atom selected from the group consisting of a nitrogen atom, an oxygen atom, and a silicon atom. Specific examples thereof include alkylene groups such as trimethylene, tetramethylene, pentamethylene, and hexamethylene groups; oxydialkylene groups such as oxydiethylene and oxydipropylene groups; and nitrogenous groups such as a group represented by —$CH_2CH_2$—NH—$CH_2$— and a group represented by —$CH_2CH_2$—N═CH—.

The group in which $R^{81}$ and $R^{82}$ are bonded to each other is preferably a nitrogenous group, and more preferably a group represented by —$CH_2CH_2$—NH—$CH_2$— or a group represented by —$CH_2CH_2$—N═CH—.

The hydrocarbyl group encompassed by $R^{81}$ and $R^{82}$ is preferably an alkyl group, more preferably a $C_{1-4}$ alkyl group, still more preferably a methyl group, an ethyl group, an n-propyl group, or an n-butyl group, and particularly preferably an ethyl group or an n-butyl group. The substituted hydrocarbyl group encompassed by $R^{81}$ and $R^{82}$ is preferably an alkoxyalkyl group, and more preferably a $C_{1-4}$ alkoxyalkyl group. The substituted silyl group encompassed by $R^{81}$ and $R^{82}$ is preferably a trialkylsilyl group, and more preferably a trimethylsilyl group.

Preferably, $R^{81}$ and $R^{82}$ are each independently an alkyl group, an alkoxyalkyl group, or a substituted silyl group, or are a nitrogenous group in which $R^{81}$ and $R^{82}$ are bonded to each other. $R^{81}$ and $R^{82}$ are each independently more preferably an alkyl group, still more preferably a $C_{1-4}$ alkyl group, and further preferably a methyl group, an ethyl group, an n-propyl group, or an n-butyl group.

Examples of the group represented by formula (IXa) include acyclic amino groups and cyclic amino groups.

The acyclic amino groups can be exemplified by dialkylamino groups such as dimethylamino, diethylamino, di(n-propyl)amino, di(isopropyl)amino, di(n-butyl)amino, di(sec-butyl)amino, di(tert-butyl)amino, di(neopentyl)amino, and ethylmethylamino groups; di(alkoxyalkyl)amino groups such as di(methoxymethyl)amino, di(methoxyethyl)amino, di(ethoxymethyl)amino, and di(ethoxyethyl)amino groups; and di(trialkylsilyl)amino groups such as di(trimethylsilyl)amino and di(t-butyldimethylsilyl)amino groups.

The cyclic amino groups can be exemplified by 1-polymethyleneimino groups such as 1-pyrrolidinyl, 1-piperidino, 1-hexamethyleneimino, 1-heptamethyleneimino, 1-octamethyleneimino, 1-decamethyleneimino, and 1-dodecamethyleneimino groups. The cyclic amino group can also be exemplified by 1-imidazolyl, 4,5-dihydro-1-imidazolyl, 1-imidazolidinyl, 1-piperazinyl, and morpholino groups.

In view of economic efficiency and ease of availability, the group represented by formula (IXa) is preferably an acyclic amino group, more preferably a dialkylamino group, still more preferably a dialkylamino group which contains a $C_{1-4}$ alkyl group as a substituent, and further preferably a dimethylamino group, a diethylamino group, a di(n-propyl)amino group, or a di(n-butyl)amino group.

The hydrocarbyl groups encompassed by $X^4$, $X^5$, and $X^6$ in formula (IX) can be exemplified by alkyl groups such as methyl, ethyl, n-propyl, isopropyl, n-butyl, sec-butyl, and tert-butyl groups. The substituted hydrocarbyl groups can also be exemplified by alkoxyalkyl groups such as methoxymethyl, ethoxymethyl, methoxyethyl, and ethoxyethyl groups.

The hydrocarbyl group encompassed by $X^4$, $X^5$, and $X^6$ is preferably an alkyl group, more preferably a $C_{1-4}$ alkyl group, and still more preferably a methyl group or an ethyl group. The substituted hydrocarbyl group encompassed by $X^4$, $X^5$, and $X^6$ is preferably an alkoxyalkyl group, and more preferably a $C_{1-4}$ alkoxyalkyl group.

The hydrocarbyl group or substituted hydrocarbyl group encompassed by $X^4$, $X^5$, and $X^6$ is preferably an alkyl group or an alkoxyalkyl group, more preferably a $C_{1-4}$ alkyl group or a $C_{1-4}$ alkoxyalkyl group, still more preferably a $C_{1-4}$ alkyl group, and further preferably a methyl group or an ethyl group.

At least one of $X^4$, $X^5$, and $X^6$ in formula (IX) is a group represented by formula (IXa). Preferably at least two of $X^4$, $X^5$, and $X^6$ are groups represented by formula (IXa). More preferably two of $X^4$, $X^5$, and $X^6$ are groups represented by formula (IXa).

Examples of the vinyl compound represented by formula (IX) used in (Step A) include compounds in which one of $X^4$, $X^5$, and $X^6$ is an acyclic amino group represented by formula (IXa) and the other two are, independently, a hydrocarbyl group or a substituted hydrocarbyl group, e.g., (dialkylamino)dialkylvinylsilanes, {di(trialkylsilyl)amino}dialkylvinylsilanes, and (dialkylamino)dialkoxyalkylvinylsilanes.

The (dialkylamino)dialkylvinylsilanes can be exemplified by
(dimethylamino)dimethylvinylsilane,
(ethylmethylamino)dimethylvinylsilane,
(diethylamino)dimethylvinylsilane,
(ethyl-n-propylamino)dimethylvinylsilane,
(ethylisopropylamino)dimethylvinylsilane,
(di(n-propyl)amino)dimethylvinylsilane,
(diisopropylamino)dimethylvinylsilane,
(n-butyl-n-propylamino)dimethylvinylsilane,
(di(n-butyl)amino)dimethylvinylsilane,
(dimethylamino)diethylvinylsilane,
(ethylmethylamino)diethylvinylsilane,
(diethylamino)diethylvinylsilane,
(ethyl-n-propylamino)diethylvinylsilane,
(ethylisopropylamino)diethylvinylsilane,
(di(n-propyl)amino)diethylvinylsilane,
(diisopropylamino)diethylvinylsilane,
(n-butyl-n-propylamino) diethylvinylsilane,
(di(n-butyl)amino)diethylvinylsilane,
(dimethylamino)dipropylvinylsilane,
(ethylmethylamino)dipropylvinylsilane,
(diethylamino)dipropylvinylsilane,
(ethyl-n-propylamino)dipropylvinylsilane,
(ethylisopropylamino)dipropylvinylsilane,
(di(n-propyl)amino)dipropylvinylsilane,
(diisopropylamino)dipropylvinylsilane,
(n-butyl-n-propylamino)dipropylvinylsilane,
(di(n-butyl)amino)dipropylvinylsilane,
(dimethylamino)dibutylvinylsilane,
(ethylmethylamino)dibutylvinylsilane,
(diethylamino)dibutylvinylsilane,
(ethyl-n-propylamino)dibutylvinylsilane,
(ethylisopropylamino)dibutylvinylsilane,
(di(n-propyl)amino)dibutylvinylsilane,
(diisopropylamino)dibutylvinylsilane,
(n-butyl-n-propylamino)dibutylvinylsilane, and
(di(n-butyl)amino)dibutylvinylsilane.

The {di(trialkylsilyl)amino}dialkylvinylsilanes can be exemplified by
{di(trimethylsilyl)amino}dimethylvinylsilane,
{di(t-butyldimethylsilyl)amino}dimethylvinylsilane,
{di(trimethylsilyl)amino}diethylvinylsilane, and
{di(t-butyldimethylsilyl)amino}diethylvinylsilane.

The (dialkylamino)dialkoxyalkylvinylsilanes can be exemplified by
(dimethylamino)dimethoxymethylvinylsilane,
(dimethylamino)dimethoxyethylvinylsilane,
(dimethylamino)diethoxymethylvinylsilane,
(dimethylamino)diethoxyethylvinylsilane,
(diethylamino)dimethoxymethylvinylsilane,
(diethylamino)dimethoxyethylvinylsilane,
(diethylamino)diethoxymethylvinylsilane, and
(diethylamino)diethoxyethylvinylsilane.

Examples of compounds in which two of $X^4$, $X^5$, and $X^6$ are acyclic amino groups represented by formula (IXa) and the other one is a hydrocarbyl group or a substituted hydrocarbyl group include bis(dialkylamino)-alkylvinylsilanes, bis{di(trialkylsilyl)amino}-alkylvinylsilanes, and bis(dialkylamino)-alkoxyalkylvinylsilanes.

The bis(dialkylamino)alkylvinylsilanes can be exemplified by
bis(dimethylamino)methylvinylsilane,
bis(ethylmethylamino)methylvinylsilane,
bis(diethylamino)methylvinylsilane,
bis(ethyl-n-propylamino)methylvinylsilane,
bis(ethylisopropylamino)methylvinylsilane,
bis(di(n-propyl)amino)methylvinylsilane,
bis(diisopropylamino)methylvinylsilane,
bis(n-butyl-n-propylamino)methylvinylsilane,
bis(di(n-butyl)amino)methylvinylsilane,
bis(dimethylamino)ethylvinylsilane,
bis(ethylmethylamino)ethylvinylsilane,
bis(diethylamino)ethylvinylsilane,
bis(ethyl-n-propylamino)ethylvinylsilane,
bis(ethylisopropylamino)ethylvirylsilane,
bis(di(n-propyl)amino)ethylvinylsilane,
bis(diisopropylamino)ethylvinylsilane,
bis(n-butyl-n-propylamino)ethylvinylsilane,
bis(di(n-butyl)amino)ethylvinylsilane,
bis(dimethylamino)propylvinylsilane,
bis(ethylmethylamino)propylvinylsilane,
bis(diethylamino)propylvinylsilane,
bis(ethyl-n-propylamino)propylvinylsilane,
bis(ethylisopropylamino)propylvinylsilane,
bis(di(n-propyl)amino)propylvinylsilane,
bis(diisopropylamino)propylvinylsilane,
bis(n-butyl-n-propylamino)propylvinylsilane,
bis(di(n-butyl)amino)propylvinylsilane,
bis(dimethylamino)butylvinylsilane,
bis(ethylmethylamino)butylvinylsilane,
bis(diethylamino)butylvinylsilane,
bis(ethyl-n-propylamino)butylvinylsilane,
bis(ethylisopropylamino)butylvinylsilane,
bis(di(n-propyl)amino)butylvinylsilane,
bis(diisopropylamino)butylvinylsilane,
bis(n-butyl-n-propylamino)butylvinylsilane, and
bis(di(n-butyl)amino)butylvinylsilane.

The bis{di(trialkylsilyl)amino}alkylvinylsilanes can be exemplified by
bis{di(trimethylsilyl)amino}methylvinylsilane,
bis{di(t-butyldimethylsilyl)amino}methylvinylsilane,
bis{di(trimethylsilyl)amino}ethylvinylsilane, and
bis{di(t-butyldimethylsilyl)amino}ethylvinylsilane.

The bis(dialkylamino)alkoxyalkylvinylsilanes can be exemplified by
bis(dimethylamino)methoxymethylvinylsilane,
bis(dimethylamino)methoxyethylvinylsilane,
bis(dimethylamino)ethoxymethylvinylsilane,
bis(dimethylamino)ethoxyethylvinylsilane,
bis(diethylamino)methoxymethylvinylsilane,
bis(diethylamino)methoxyethylvinylsilane,
bis(diethylamino)ethoxymethylvinylsilane, and
bis(diethylamino)ethoxyethylvinylsilane.

Examples of compounds in which the three of $X^4$, $X^5$, and $X^6$ are acyclic amino groups represented by formula (IXa) include tri(dialkylamino)vinylsilanes. Specific examples thereof include:
tri(dimethylamino)vinylsilane,
tri(ethylmethylamino)vinylsilane,
tri(diethylamino)vinylsilane,
tri(ethylpropylamino)vinylsilane,
tri(dipropylamino)vinylsilane, and
tri(butylpropylamino)vinylsilane.

Examples of compounds in which two of $X^4$, $X^5$, and $X^6$ are cyclic amino groups represented by formula (IXa) and the other one is a hydrocarbyl group or a substituted hydrocarbyl group include:
bis(morpholino)methylvinylsilane,
bis(piperidino)methylvinylsilane,
bis(4,5-dihydroimidazolyl)methylvinylsilane, and
bis(hexamethyleneimino)methylvinylsilane.

The vinyl compound represented by formula (IX) in which two of $X^4$, $X^5$, and $X^6$ are groups represented by formula (IXa) is preferably a vinyl compound in which two of $X^4$, $X^5$, and $X^6$ are acyclic amino groups. In view of fuel economy, wet-grip performance, and abrasion resistance, the vinyl compound is more preferably a bis(dialkylamino)alkylvinylsilane, and still more preferably bis(dimethylamino)methylvinylsilane, bis(diethylamino)methylvinylsilane, bis(di(n-propyl)amino)methylvinylsilane, or bis(di(n-butyl)amino)methylvinylsilane. Among the preceding, bis(diethylamino)methylvinylsilane and bis(di(n-butyl)amino)methylvinylsilane are preferred in terms of easy availability of the compound.

In (Step A), polymerization may be carried out by using the conjugated diene and the vinyl compound represented by formula (IX) in combination with another monomer. Such other monomers include aromatic vinyls, vinyl nitriles, unsaturated carboxylic acid esters, and the like. The aromatic vinyls can be exemplified by styrene, α-methylstyrene, vinyltoluene, vinylnaphthalene, divinylbenzene, trivinylbenzene, and divinylnaphthalene. The vinyl nitriles can be exemplified by acrylonitrile. The unsaturated carboxylic acid esters can be exemplified by methyl acrylate, ethyl acrylate, methyl methacrylate, and ethyl methacrylate. Aromatic vinyls are preferred among the preceding, and styrene is more preferred.

In (Step A), polymerization may be carried out in the presence of an agent that adjusts the vinyl bond content of the conjugated diene unit, an agent that adjusts the distribution of the conjugated diene unit and constituent unit(s) based on monomer(s) other than the conjugated diene in the conjugated diene polymer chain, or the like (these agents are collectively referred to below as "regulators"). These agents can be exemplified by ether compounds, tertiary amines, and phosphine compounds. The ether compounds can be exemplified by cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, ethylene glycol dibutyl ether, diethylene glycol diethyl ether, and diethylene glycol dibutyl ether; and aromatic ethers such as diphenyl ether and anisole. The tertiary amines can be exemplified by triethylamine, tripropylamine, tributylamine, N,N,N',N'-tetramethylethylenediamine, N,N-diethylaniline, pyridine, and quinoline. The phosphine compounds can be exemplified by trimethylphosphine, triethylphosphine, and triphenylphosphine. These may be used alone or two or more may be used in combination.

The polymerization temperature in (Step A) is typically 25 to 100° C., preferably 35 to 90° C., and more preferably 50 to 80° C. The polymerization time is typically 10 minutes to 5 hours.

In (Step B), the amount of the modifying agent(s) 1 to 5 to be contacted with the polymer prepared in Step A is typically 0.1 to 3 moles, preferably 0.5 to 2 moles, more preferably 0.7 to 1.5 moles, and further preferably 1 to 1.5 moles, per mole of an alkali metal derived from the organoalkali metal catalyst.

In (Step B), the temperature for the contact between the polymer prepared in Step A and at least one of the modifying agents 1 to 5 is typically 25 to 100° C., preferably 35 to 90° C., and more preferably 50 to 80° C. The contact time is typically 60 seconds to 5 hours, preferably 5 minutes to 1 hour, and more preferably 15 minutes to 1 hour.

In the method for producing the conjugated diene polymer, a coupling agent may be added to the hydrocarbon solution of the conjugated diene polymer as necessary, from the initiation of polymerization of monomers in the presence of the alkali metal catalyst to the termination of polymerization. The coupling agent may be a compound represented by the following formula (X):

$$R^{91}{}_aML_{4-a} \quad\quad (X)$$

wherein $R^{91}$ represents an alkyl group, an alkenyl group, a cycloalkenyl group, or an aromatic residue; M represents a silicon atom or a tin atom; L represents a halogen atom or a hydrocarbyloxy group; and a represents an integer of 0 to 2.

The term "aromatic residue" denotes a monovalent group obtained by removing hydrogen bonded to the aromatic ring of an aromatic hydrocarbon.

The coupling agents represented by formula (X) can be exemplified by silicon tetrachloride, methyltrichlorosilane, dimethyldichlorosilane, trimethylchlorosilane, tin tetrachloride, methyltrichlorotin, dimethyldichlorotin, trimethylchlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

The amount of the coupling agent, in view of the processability of the conjugated diene polymer, is preferably not less than 0.03 moles, and more preferably not less than 0.05 moles, per mole of an alkali metal derived from the alkali metal catalyst. In view of fuel economy, the amount is preferably not more than 0.4 moles, and more preferably not more than 0.3 moles.

The conjugated diene polymer can be recovered from the hydrocarbon solution of the conjugated diene polymer by a known recovery method, for example, by (1) addition of a coagulant to the hydrocarbon solution of the conjugated diene polymer or (2) addition of steam to the hydrocarbon solution of the conjugated diene polymer. The recovered conjugated diene polymer may be dried using a known drier, for example, a band drier or an extrusion drier.

In the method for producing the conjugated diene polymer, a treatment in which the group represented by formula (Ia) in the polymer is replaced by a hydroxyl group is preferably carried out by, for example, hydrolysis. This treatment may be carried out on the polymer alone or on a below-mentioned composition including the polymer. Examples of the hydrolysis method include known hydrolysis methods, e.g., methods using steam stripping. The treatment can convert at least one of $X^1$, $X^2$, and $X^3$ in formula (I) into hydroxyl group(s) and can thereby enhance the fuel economy, wet-grip performance, and abrasion resistance in a more balanced manner.

The conjugated diene polymer can be used in the rubber component of the rubber composition of the present invention, and is preferably used in combination with other rubber materials, additives and the like.

Examples of other rubber materials include commonly used diene rubbers such as styrene-butadiene copolymer rubber (SBR), polybutadiene rubber (BR), butadiene-isoprene copolymer rubber, and butyl rubber. Moreover, natural rubber (NR), ethylene-propylene copolymers, ethylene-octene copolymers and the like may also be mentioned. Two or more kinds of these rubber materials may be used in combination. In particular, in view of enhancing the fuel economy, wet-grip performance, and abrasion resistance in a balanced manner, NR and/or BR are preferably used, and both of NR and BR are more preferably used.

The conjugated diene polymer content, based on 100% by mass of the rubber component, is not less than 5% by mass, preferably not less than 10% by mass, more preferably not less than 30% by mass, and still more preferably not less than 50% by mass. A conjugated diene polymer content of less than 5% by mass tends to result in less improvement in fuel economy. The conjugated diene polymer content is preferably not more than 90% by mass, more preferably not more than 85% by mass, still more preferably not more than 80% by mass, and particularly preferably not more than 70% by mass. A conjugated diene polymer content in excess of 90% by mass tends to result in a decline in abrasion resistance and also drive up the cost.

There are no particular limitations on the NR. For example, natural rubbers commonly used in the tire industry can be used, such as SIR20, RSS #3, TSR2C, deproteinized natural rubber (DPNR), and highly purified natural rubber (HPNR).

The NR content, based on 100% by mass of the rubber component, is preferably not less than 5% by mass, more preferably not less than 10% by mass, and still more preferably not less than 15% by mass. The abrasion resistance exhibits a declining trend when the NR content is less than 5% by mass. The NR content is preferably not more than 70% by mass, more preferably not more than 60% by mass, still more preferably not more than 40% by mass, and particularly preferably not more than 30% by mass. The wet-grip performance exhibits a declining trend when the NR content is more than 70% by mass.

There are no particular limitations on the BR, and commonly used BRs in the tire industry can be used, for example, high-cis BR such as BR1220 produced by Zeon Corporation and BR130B and BR150B produced by Ube Industries, Ltd., and BR containing syndiotactic polybutadiene crystals, such as VCR412 and VCR617 produced by Ube Industries, Ltd.

The BR content, based on 100% by mass of the rubber component, is preferably not less than 5% by mass, more preferably not less than 10% by mass, and still more preferably not less than 15% by mass. The abrasion resistance exhibits a declining trend when the BR content is less than 5% by mass. The BR content is preferably not more than 60% by mass, more preferably not more than 50% by mass, and still more preferably not more than 30% by mass. The wet-grip performance exhibits a declining trend when the BR content is more than 60% by mass.

The total content of NR and BR, based on 100% by mass of the rubber component, is preferably not less than 10% by mass, more preferably not less than 20% by mass, and still more preferably not less than 30% by mass. The abrasion resistance exhibits a declining trend when the total content is less than 10% by mass. The total content is also preferably not more than 70% by mass, and more preferably not more than 50% by mass. The wet-grip performance exhibits a declining trend when the total content is more than 70% by mass.

The rubber composition of the present invention contains a liquid resin having a specific softening point. Use of the liquid resin in combination with the conjugated diene polymer and silica can synergistically enhance the fuel economy, wet-grip performance, and abrasion resistance.

The liquid resin is normally a thermoplastic resin having a weight average molecular weight of from several hundreds to several thousands. Such a resin provides adhesion to natural rubber and synthetic rubber when mixed therewith. Examples of the liquid resin include liquid petroleum or coal resin, such as liquid coumarone-indene resin, liquid indene resin, liquid α-methylstyrene resin, liquid vinyltoluene resin, or liquid polyisopentane resin. Other examples of the liquid resin include natural resin in a liquid state such as coumarone resin, naphthene resin, phenol resin, terpene resin, terpene phenolic resin, rosin, rosin esters, hydrogenated rosin derivatives, and hydrogenated terpene resin; and synthetic resin in a liquid state such as alkylphenol-formaldehyde resin, C5 petroleum resin, C9 petroleum resin, aliphatic petroleum resin, xylene-formaldehyde resin, phenol-modified C9 petroleum resin, carboxylic acid-modified C9 petroleum resin, and dicyclopentadiene-modified C9 petroleum resin. The liquid resin is more preferably at least one selected from the group consisting of liquid coumarone-indene resin, liquid indene resin, and liquid α-methylstyrene resin, and is more preferably liquid coumarone-indene resin. A preferable example of the liquid coumarone-indene resin is a copolymer of coumarone, indene, and styrene.

The liquid resin has a softening point of not lower than −20° C., preferably not lower than −5° C., and more preferably not lower than 0° C. The liquid resin having a softening point of lower than −20° C. tends to have an excessively low viscosity. Thus, the kneading property with the rubber component tends to deteriorate. Also, the liquid resin has a softening point of not higher than 20° C., more preferably not higher than 18° C., and still more preferably not higher than 17° C. The liquid resin having a softening point of higher than 20° C. has high heat build-up. Thus, the fuel economy is less likely to be sufficiently enhanced.

The softening point herein is a temperature at which a ball drops in the measurement of a softening point defined in JIS K 6220:2001 using a ring and ball softening point apparatus.

The amount of the liquid resin, per 100 parts by mass of the rubber component, is preferably not less than 1 part by mass, more preferably not less than 2 parts by mass, still more preferably not less than 2.5 parts by mass, and particularly preferably not less than 3 parts by mass. The lower limit of the amount may be not less than 5 parts by mass, not less than 10 parts by mass, or not less than 15 parts by mass. The liquid resin added in an amount of less than 1 part by mass may fail to sufficiently produce its effects. Also, the amount of the liquid resin is preferably not more than 60 parts by mass, more preferably not more than 40 parts by mass, still more preferably not more than 35 parts by mass, and particularly preferably not more than 32 parts by mass. The upper limit of the amount may be not more than 30 parts by mass, not more than 25 parts by mass, or not more than 20 parts by mass. An amount of more than 60 parts by mass tends to deteriorate the abrasion resistance and processability.

The liquid resin serves to soften a rubber composition. The use of the liquid resin thus reduces the oil content in a rubber composition so that fuel economy can be further enhanced. The oil content in the rubber composition of the present invention is preferably not more than 6 parts by mass, more preferably not more than 1 part by mass, and still more preferably 0 parts by mass (i.e. practically no oil), per 100 parts by mass of the rubber component.

The rubber composition of the present invention contains silica. The silica is not particularly limited, and examples thereof include dry silica (anhydrous silicic acid), and wet silica (hydrous silicic acid). Preferred among these is wet silica (hydrous silicic acid) because such silica contains a large number of silanol groups. The silica may be used alone, or in combinations of two or more.

The amount of silica, per 100 parts by mass of the rubber composition, is not less than 5 parts by mass, preferably not less than 10 parts by mass, more preferably not less than 40 parts by mass, still more preferably not less than 45 parts by mass, and particularly preferably not less than 50 parts by mass. The silica added in an amount of less than 5 parts by mass is likely to fail to sufficiently produce its effects, and the abrasion resistance tends to be reduced. Also, the amount of silica is not more than 150 parts by mass, preferably not more than 120 parts by mass, and more preferably not more than 100 parts by mass. An amount of more than 150 parts by mass tends to deteriorate the processability. The silica may be used alone, or in combinations of two or more.

The silica content, based on a total of 100% by mass of silica and carbon black, is preferably not less than 60% by mass, and more preferably not less than 85% by mass, and is also preferably not more than 98% by mass, and more preferably not more than 95% by mass. The fuel economy, wet-grip performance, and abrasion resistance can be enhanced to high levels in a balanced manner when the silica content is in the foregoing range.

The silica preferably has a nitrogen adsorption specific surface area ($N_2SA$) of not less than 40 m$^2$/g, more preferably not less than 50 m$^2$/g, and still more preferably not less than 60 m$^2$/g. If the silica has a $N_2SA$ of less than 40 m$^2$/g, little reinforcing effect is obtained so that the abrasion resistance and breaking strength tend to be reduced. Also, the silica preferably has a nitrogen adsorption specific surface area ($N_2SA$) of not more than 400 m$^2$/g, more preferably not more than 360 m$^2$/g, and still more preferably not more than 300 m$^2$/g. If the silica has a $N_2SA$ of more than 400 m$^2$/g, the silica does not readily disperse, and the fuel economy and processability tend to be reduced.

The nitrogen adsorption specific surface area of silica is a value measured by the BET method in accordance with ASTM D3037-81.

The rubber composition of the present invention preferably contains a silane coupling agent together with silica. In terms of effects like reinforcement-enhancing effect, preferable examples of the silane coupling agent include bis(3-triethoxysilylpropyl)tetrasulfide, and 3-trimethoxysilylpropylbenzothiazolyltetrasulfide.

The silane coupling agent content per 100 parts by mass of silica is preferably not less than 1 part by mass, more preferably not less than 2 parts by mass, still more preferably not less than 3 parts by mass, further preferably not less than 4 parts by mass, and particularly preferably not less than 8 parts by mass. A silane coupling agent content of less than 1 part by mass increases the viscosity of an unvulcanized rubber composition to be obtained, and the processability tends to deteriorate. The silane coupling agent content is preferably not more than 20 parts by mass, and more preferably not more than 15 parts by mass. A silane coupling agent content in excess of 20 parts by mass may fail to produce an effect commensurate with the cost increase.

Known additives may be used as the additives. Examples of the additives include vulcanizing agents such as sulfur; vulcanization accelerators such as thiazole vulcanization accelerators, thiuram vulcanization accelerators, sulfenamide vulcanization accelerators, and guanidine vulcanization accelerators; vulcanization activators such as stearic acid and zinc oxide; organoperoxides; fillers such as carbon black, calcium carbonate, talc, alumina, clay, aluminum hydroxide, and mica; processing aids such as extender oils and lubricants; and antioxidants.

The carbon blacks can be exemplified by furnace blacks (furnace carbon blacks) such as SAF, ISAF, HAF, MAF, FEF, SRF, GPF, APF, FF, CF, SCF, and ECF; acetylene blacks (acetylene carbon blacks); thermal blacks (thermal carbon blacks) such as FT and MT; channel blacks (channel carbon blacks) such as EPC, MPC, and CC; and graphite. These may be used alone or two or more may be used in combination. In view of enhancing the fuel economy, wet-grip performance, and abrasion resistance to high levels in a balanced manner, the carbon black content per 100 parts by mass of the rubber component is preferably not less than 1 part by mass, and more preferably not less than 3 parts by mass. The carbon black content is also preferably not more than 60 parts by mass, more preferably not more than 50 parts by mass, still more preferably not more than 30 parts by mass, and particularly preferably not more than 10 parts by mass.

The carbon black preferably has a nitrogen adsorption specific surface area ($N_2SA$) of not less than 5 m$^2$/g, more preferably not less than 30 m$^2$/g, still more preferably not less than 50 m$^2$/g, and particularly preferably not less than 70 m$^2$/g. The nitrogen adsorption specific surface area is also preferably not more than 250 m$^2$/g, more preferably not more than 200 m$^2$/g, and still more preferably not more than 150 m$^2$/g. The carbon black preferably has a dibutyl phthalate (DBP) absorption of not less than 5 mL/100 g, more preferably not less than 80 mL/100 g. The dibutyl phthalate (DBP) absorption is also preferably not more than 300 mL/100 g, and more preferably not more than 180 mL/100 g. If the carbon black has a $N_2SA$ or DBP absorption of less than the corresponding lower limit of the range, a little reinforcing effect is likely to be obtained and the abrasion resistance tends to be reduced. If the $N_2SA$ or DBP absorption exceeds the corresponding upper limit of the range, the dispersibility is likely to be poor and the hysteresis loss is likely to increase so that the fuel economy tends to be reduced. The nitrogen adsorption specific surface area is measured in accordance with ASTM D4820-93, and the DBP absorption is measured in accordance with ASTM D2414-93. Applicable commercial products are available under the trade names SEAST 6, SEAST 7HM, and SEAST KH produced by Tokai Carbon Co., Ltd., CK3 and Special Black 4A produced by Evonik Degussa, and so forth.

The extender oils can be exemplified by aromatic mineral oils (viscosity-gravity constant (VGC) value)-0.900 to 1.049), naphthenic mineral oils (VGC value=0.850 to 0.899), and paraffinic mineral oils (VGC value=0.790 to 0.849). The polycyclic aromatic content of the extender oil is preferably less than 3% by mass, and more preferably less than 1% by mass. The polycyclic aromatic content is measured based on the British Institute of Petroleum method 346/92. Moreover, the aromatic compound content (CA) of the extender oil is preferably not less than 20% by mass. Two or more of these extender oils may be used in combination.

The vulcanization accelerators can be exemplified by thiazole vulcanization accelerators such as 2-mercaptobenzothiazole, dibenzothiazyl disulfide, and N-cyclohexyl-2-benzothiazylsulfenamide; thiuram vulcanization accelerators such as tetramethylthiuram monosulfide and tetramethylthiuram disulfide; sulfenamide vulcanization accelerators such as N-cyclohexyl-2-benzothiazolesulfenamide, N-t-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine vulcanization accelerators such as diphenylguanidine, di-ortho-tolylguanidine, and ortho-tolylbiguanidine. The amount thereof used, expressed per 100 parts by mass of the rubber component, is preferably 0.1 to 5 parts by mass, and more preferably 0.2 to 3 parts by mass.

A known method can be used to mix the conjugated diene polymer with another rubber material, additives and so forth to prepare the rubber composition. For example, a method can be used in which the ingredients are kneaded using a known mixer, e.g., a roll mixer or a Banbury mixer.

With regard to the kneading conditions during the incorporation of additives other than vulcanizing agents and vulcanization accelerators, the kneading temperature is typically 50 to 200° C., preferably 80 to 190° C., and the kneading time is typically 30 seconds to 30 minutes, preferably 1 to 30 minutes.

During the incorporation of a vulcanizing agent and vulcanization accelerator, the kneading temperature is typically not more than 100° C. and is preferably in the range of room temperature to 80° C. The composition in which the vulcanizing agent and vulcanization accelerator have been incorporated is typically subjected to a vulcanizing treatment such as press vulcanization before use. The vulcanization temperature is typically 120 to 200° C., preferably 140 to 180° C.

The rubber composition of the present invention has an excellent balance among fuel economy, wet-grip performance, and abrasion resistance, and thus can provide a significant improvement in these properties.

The rubber composition of the present invention can be suitably used for various tire components and is particularly well suited for treads.

The pneumatic tire of the present invention can be produced by a usual method using the aforementioned rubber composition. Specifically, the rubber composition that incorporates various additives as necessary, before vulcanization, is extrusion processed into the shape of a component such as a tire tread, and is then arranged by a usual method and assembled with other tire components in a tire building machine to form an unvulcanized tire. This unvulcanized tire is heat-pressed in a vulcanizer to produce a pneumatic tire of the present invention.

The pneumatic tire of the present invention can be suitably used as a tire for passenger vehicles and for trucks/buses (heavy-load tire).

EXAMPLES

The present invention is described by the following examples.

The physical properties were evaluated by the following methods. In the physical property evaluations below, Comparative Example 1 was considered as a standard comparative example in Table 6; Comparative Example 8 was considered as a standard comparative example in Table 7; Comparative Example 9 was considered as a standard comparative example in Table 8; Comparative Example 20 was considered as a standard comparative example in Tables 9 to 11; Comparative Example 33 was considered as a standard comparative example in Tables 12 and 13; and Comparative Example 45 was considered as a standard comparative example in Table 14.

1. Vinyl Bond Content (Unit:Mol %)

The vinyl bond content of a polymer was determined by infrared spectroscopic analysis from the strength of the absorption in the vicinity of 910 $cm^{-1}$, which is an absorption peak for a vinyl group.

2. Styrene Unit Content (Unit:% by Mass)

The styrene unit content of a polymer was determined from the refractive index according to JIS K6383 (1995).

3. Molecular Weight Distribution (Mw/Mn)

The weight-average molecular weight (Mw) and the number-average molecular weight (Mn) were measured by gel permeation chromatography (GPC) under the conditions (1) to (8) described below. The molecular weight distribution (Mw/Mn) of the polymer was then determined from the measured Mw and Mn.

(1) instrument: HLC-8020 produced by Tosoh Corporation
(2) separation columns: 2×GMH-XL in series, produced by Tosoh Corporation
(3) measurement temperature: 40° C.
(4) carrier: tetrahydrofuran
(5) flow rate: 0.6 mL/minute
(6) quantity of injection: 5 μL
(7) detector: differential refractometer
(8) molecular weight standards: polystyrene standards 4. Tan δ

A strip test sample (width: 1 mm or 2 mm, length: 40 mm) was punched out of a vulcanized rubber composition sheet for testing. The tan δ of the test sample was determined with a spectrometer (produced by Ueshima Seisakusho Co., Ltd.) at a dynamic strain amplitude of 1%, a frequency of 10 Hz, and a temperature of 50° C. The reciprocal of the value of tan δ was expressed as an index relative to that in the standard comparative example regarded as 100. A larger index indicates a lower rolling resistance, which in turn indicates better fuel economy.

5. Rolling Resistance

The rolling resistance was measured using a rolling resistance tester by running a test tire with a 15×6JJ rim at an internal pressure of 230 kPa, a load of 3.43 kN, and a speed of 80 km/h. The obtained rolling resistance was expressed as an index relative to that in the standard comparative example regarded as 100. A larger index indicates a lower rolling resistance, which in turn indicates better fuel economy.

6. Wet-Grip Performance

The produced test tires were mounted on all the wheels of a vehicle (Japanese front engine front drive car, 2000 cc), and the braking distance with an initial speed of 100 km/h was measured on a wet asphalt road surface. The result was expressed as an index. A larger value of the index indicates better wet-skid performance (wet-grip performance). The index was obtained based on the following equation.

(Wet-grip performance index)=(Braking distance in standard comparative example)/(Braking distance of each composition)×100

7. Abrasion Resistance 1

The volume loss of each vulcanized rubber composition was measured with a LAT tester (Laboratory Abrasion and Skid Tester) at a load of 50 N, a speed of 20 km/h, and a slip angle of 5 degrees. The values (abrasion resistance index 1) in Tables are relative values to the volume loss in the standard comparative example regarded as 100. A larger value indicates better abrasion resistance.

8. Abrasion Resistance 2

The produced test tires were mounted on all the wheels of a vehicle (Japanese front engine front drive car car, 2000 cc), and the vehicle was driven. The change in the groove depth of the tread pattern before and after 30000 km running was determined. Based on the equation below, the change in the groove depth of the tires of each composition was expressed as an index relative to the abrasion resistance index 2 of the standard comparative example regarded as 100. A larger index indicates better abrasion resistance.

Abrasion resistance index 2=(Groove depth change in standard comparative example)/(Groove depth change of each composition)×100

Production Example 1 (Synthesis of Polymer 1)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 11.1 mmol of bis(diethylamino)methylvinylsilane in cyclohexane and 13.1 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.1 mmol of 3-diethylaminopropyl-triethoxysilane was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 1 was recovered from the polymer solution by steam stripping. Table 1 shows the evaluation results of Polymer 1. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 2 (Synthesis of Polymer 2)

The interior of a 5-L stainless steel polymerization reactor was washed and dried, and then replaced with dry nitrogen. Next, 2.55 kg of hexane (specific gravity=0.68 g/cm$^3$), 137 g of 1,3-butadiene, 43 g of styrene, 1.5 mL of tetrahydrofuran, and 1.2 mL of ethylene glycol diethyl ether were introduced into the polymerization reactor. Thereafter, 3.6 mmol of n-butyllithium in n-hexane was further introduced and the 1,3-butadiene and styrene were copolymerized for 2.5 hours. The polymerization was carried out under stirring at a rate of 130 rpm and a temperature within the polymerization reactor of 65° C. while the monomers were continuously fed into the polymerization reactor. The amount of 1,3-butadiene fed was 205 g, and the amount of styrene fed was 65 g.

After the 2.5-hour polymerization, 2.8 mmol of bis(diethylamino)methylvinylsilane in cyclohexane was introduced into the polymerization reactor under stirring at a rate of 130 rpm and a temperature within the polymerization reactor of 65° C., followed by stirring for 30 minutes.

Next, 20 mL of a hexane solution containing 0.14 mL of methanol was introduced into the polymerization reactor, and the polymer solution was stirred for 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 2 was recovered from the polymer solution by steam stripping. Table 1 shows the evaluation results of Polymer 2. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 3 (Synthesis of Polymer 3)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 11.1 mmol of bis(diethylamino)methylvinylsilane in cyclohexane and 13.1 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name:

Sumilizer TP-D, produced by Sumitomo Chemical Co., Ltd.). Then, Polymer 3 was recovered from the polymer solution by steam stripping. Table 1 shows the evaluation results of Polymer 3. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 4 (Synthesis of Polymer 4)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 13.1 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.1 mmol of 3-diethylaminopropyltriethoxysilane was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 4 was recovered from the polymer solution by steam stripping. Table 1 shows the evaluation results of Polymer 4. Since the compound represented by formula (IX) was not used in the synthesis of Polymer 4, Polymer 4 did not contain the constituent unit represented by formula (I).

Production Example 5 (Synthesis of Polymer 5)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 13.1 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 5 was recovered from the polymer solution by steam stripping. Table 1 shows the evaluation results of Polymer 5. Since the compound represented by formula (IX) was not used in the synthesis of Polymer 5, Polymer 5 did not contain the constituent unit represented by formula (I).

Production Example 6 (Synthesis of Polymer 6)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 11.1 mmol of bis(diethylamino)methylvinylsilane in cyclohexane and 13.1 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.1 mmol of 3-diethylaminopropyl-triethoxysilane was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, the polymer solution was evaporated at ordinary temperature over 24 hours, and further dried under reduced pressure at 55° C. for 12 hours, so that Polymer 6 was obtained. Table 1 shows the evaluation results of Polymer 6. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

TABLE 1

| | Polymer | | | | | |
|---|---|---|---|---|---|---|
| | 1 | 2 | 3 | 4 | 5 | 6 |
| Styrene unit content (% by mass) | 25 | 25 | 24 | 25 | 24 | 25 |
| Vinyl bond content (mol %) | 59 | 59 | 60 | 59 | 58 | 60 |
| Molecular weight distribution (Mw/Mn) | 1.2 | 1.1 | 1.2 | 1.1 | 1.1 | 1.2 |

Production Example 7 (Synthesis of Polymer 7)

The interior of a 20-L stainless steel polymerization reactor was washed and dried, and then replaced with dry nitrogen. Next, 10.2 kg of hexane (specific gravity=0.68 g/cm³), 547 g of 1,3-butadiene, 173 q of styrene, 6.1 mL of tetrahydrofuran, and 5.0 mL of ethylene glycol diethyl ether were introduced into the polymerization reactor. Thereafter, 11.0 mmol of bis(diethylamino)methylvinylsilane in cyclohexane and 14.3 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.0 mmol of 1,3-dimethyl-2-imidazolidinone was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 7 was recovered from the polymer solution by steam stripping. Table 2 shows the evaluation results of Polymer 7. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 8 (Synthesis of Polymer 8)

The interior of a 20-L stainless steel polymerization reactor was washed and dried, and then replaced with dry nitrogen. Next, 10.2 kg of hexane (specific gravity=0.68 g/cm³), 547 g of 1,3-butadiene, 173 g of styrene, 6.1 mL of tetrahydrofuran, and 5.0 mL of ethylene glycol diethyl ether were introduced into the polymerization reactor. Thereafter, 12.9 mmol of n-butyllithium in n-hexane was further introduced. The 1,3-butadiene and styrene were copolymerized for 0.83 hours. The polymerization was carried out under stirring at a rate of 130 rpm and a temperature within the polymerization reactor of 65° C. while the monomers were continuously fed into the polymerization reactor.

After the 0.83-hour polymerization, 11.0 mmol of bis(diethylamino)methylvinylsilane in cyclohexane was introduced into the polymerization reactor under stirring at a rate of 130 rpm and a temperature within the polymerization reactor of 65° C.

Next, the monomers were continuously fed into the polymerization reactor, and the 1,3-butadiene and styrene were copolymerized for 1.67 hours. During the entire polymerization, the amount of 1,3-butadiene fed was 821 g, and the amount of styrene fed was 259 g.

The resulting polymer solution was stirred at a rate of 130 rpm, and 11.0 mmol of 1,3-dimethyl-2-imidazolidinone was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 8 was recovered from the polymer solution by steam stripping. Table 2 shows the evaluation results of Polymer 8. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 9 (Synthesis of Polymer 9)

The interior of a 20-L stainless steel polymerization reactor was washed and dried, and then replaced with dry nitrogen. Next, 10.2 kg of hexane (specific gravity=0.68 g/cm³), 547 g of 1,3-butadiene, 173 g of styrene, 6.1 mL of tetrahydrofuran, and 5.0 mL of ethylene glycol diethyl ether were introduced into the polymerization reactor. Thereafter, 11.0 mmol of bis(diethylamino)methylvinylsilane in cyclohexane and 14.3 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was stirred at a rate of 130 rpm, and 11.0 mmol of 1-phenyl-2-pyrrolidone was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 9 was recovered from the polymer solution by steam stripping. Table 2 shows the evaluation results of Polymer 9. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 10 (Synthesis of Polymer 10)

The interior of a 20-L stainless steel polymerization reactor was washed and dried, and then replaced with dry nitrogen. Next, 10.2 kg of hexane (specific gravity=0.68 g/cm³), 547 g of 1,3-butadiene, 173 g of styrene, 6.1 mL of tetrahydrofuran, and 5.0 mL of ethylene glycol diethyl ether were introduced into the polymerization reactor. Thereafter, 11.0 mmol of bis(diethylamino)methylvinylsilane in cyclohexane and 13.4 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.0 mmol of N-methyl-ε-caprolactam was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 10 was recovered from the polymer solution by steam stripping. Table 2 shows the evaluation results of Polymer 10. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 11 (Synthesis of Polymer 11)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 8.26 mmol of bis(diethylamino)methylvinylsilane in cyclohexane and 14.3 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.8 mmol of 4,4'-bis(diethylamino)benzophenone was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 11 was recovered from the polymer solution by steam stripping. Table 2 shows the evaluation results of Polymer 11. The content of the constituent unit represented by formula (I) in the polymer, as calculated from the amounts of raw materials introduced and the amounts of raw materials fed into the polymerization reactor, was 0.005 mmol/g-polymer per unit mass of the polymer.

Production Example 12 (Synthesis of Polymer 12)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 12.2 mmol of bis(diethylamino)methylvinylsilane in cyclohexane and 15.1 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 12.2 mmol of 4'-(imidazol-1-yl)-acetophenone was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 12 was recovered from the polymer solution by steam stripping. Table 2 shows the evaluation results of Polymer 12. The content of the constituent unit represented by formula (I) in the polymer, as calculated from the amounts of raw materials introduced and the amounts of raw materials fed into the polymerization reactor, was 0.007 mmol/g-polymer per unit mass of the polymer.

Production Example 13 (Synthesis of Polymer 13)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 11.0 mmol of bis(diethylamino)methylvinylsilane in cyclohexane and 14.3 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.0 mmol of 1,3-dimethyl-2-imidazolidinone was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, the polymer solution was evaporated at ordinary temperature over 24 hours, and further dried under reduced pressure at 55° C. for 12 hours, so that Polymer 13 was obtained. Table 2 shows the evaluation results of Polymer 13. The content of the constituent unit represented by formula (I) in the polymer, as calculated from the amounts of raw materials introduced and the amounts of raw materials fed into the polymerization reactor, was 0.006 mmol/ g-polymer per unit mass of the polymer.

TABLE 2

| | Polymer | | | | | | |
|---|---|---|---|---|---|---|---|
| | 7 | 8 | 9 | 10 | 11 | 12 | 13 |
| Styrene unit content (% by mass) | 25 | 25 | 25 | 25 | 25 | 25 | 25 |
| Vinyl bond content (mol %) | 60 | 60 | 60 | 59 | 59 | 60 | 62 |
| Molecular weight distribution (Mw/Mn) | 1.2 | 1.3 | 1.2 | 1.2 | 1.2 | 1.3 | 1.2 |

Production Example 14 (Synthesis of Polymer 14)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 10.5 mmol of bis(diethylamino)methylvinylsilane in cyclohexane and 14.9 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was stirred at a rate of 130 rpm, and 10.5 mmol of N-(3-dimethylaminopropyl)acrylamide was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 14 was recovered from the polymer solution by steam stripping. Table 3 shows the evaluation results of Polymer 14. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 15 (Synthesis of Polymer 15)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 12.9 mmol of n-butyllithium in n-hexane was further introduced, and the 1,3-butadiene and styrene were copolymerized for 0.83 hours. The polymerization was carried out under stirring at a rate of 130 rpm and a temperature within the polymerization reactor of 65° C. while the monomers were continuously fed into the polymerization reactor.

After the 0.83-hour polymerization, 10.5 mmol of bis (diethylamino)methylvinylsilane in cyclohexane was introduced into the polymerization reactor under stirring at a rate of 130 rpm and a temperature within the polymerization reactor of 65° C.

Next, the monomers were continuously fed into the polymerization reactor, and the 1,3-butadiene and styrene were copolymerized for 1.67 hours. The polymerization was carried out under stirring at a rate of 130 rpm and a temperature within the polymerization reactor of 65° C. During the entire polymerization, the amount of 1,3-butadiene fed was 821 g, and the amount of styrene fed was 259 g.

The resulting polymer solution was then stirred at a rate of 130 rpm, and 10.5 mmol of N-(3-dimethylaminopropyl) acrylamide was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 15 was recovered from the polymer solution by steam stripping. Table 3 shows the evaluation results of Polymer 15. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 16 (Synthesis of Polymer 16)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 10.5 mmol of bis(diethylamino)methylvinylsilane in cyclohexane and 13.4 mmol of n-butyllithium in n-hexane were further introduced, and the 1,3-butadiene and styrene were copolymerized for one hour. The polymerization was carried out under stirring at a rate of 130 rpm and a temperature within the polymerization reactor of 65° C. while the monomers were continuously fed into the polymerization reactor.

After the one hour polymerization, 10.5 mmol of bis (diethylamino)methylvinylsilane in cyclohexane was introduced into the polymerization reactor under stirring at a rate of 130 rpm and a temperature within the polymerization reactor of 65° C.

Next, the monomers were continuously fed into the polymerization reactor, and the 1,3-butadiene and styrene were copolymerized for 0.5 hours. The polymerization was carried out under stirring at a rate of 130 rpm and a temperature within the polymerization reactor of 65° C. After the 0.5-hour polymerization, 10.5 mmol of bis(diethylamino)methylvinylsilane in cyclohexane was introduced into the polymerization reactor under stirring at a rate of 130 rpm and a temperature within the polymerization reactor of 65° C.

Next, the monomers were continuously fed into the polymerization reactor, and the 1,3-butadiene and styrene were copolymerized for 1.5 hours. The polymerization was carried out under stirring at a rate of 130 rpm and a temperature within the polymerization reactor of 65° C. During the entire polymerization, the amount of 1,3-butadiene fed was 821 g, and the amount of styrene fed was 259 g.

The resulting polymer solution was then stirred at a rate of 130 rpm, and 10.5 mmol of N-(3-dimethylaminopropyl) acrylamide was added thereto, followed by stirring for 15 minutes.

Then, 20 mL of a hexane solution containing 0.54 mL of methanol was added to the polymer solution, and the polymer solution was stirred for additional 5 minutes. To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 16 was recovered from the polymer solution by steam stripping. Table 3 shows the evaluation results of Polymer 16. The content of the constituent unit represented by formula (I) in the polymer, as calculated from the amounts of raw materials introduced and the amounts of raw materials fed into the polymerization reactor, was 0.017 mmol/g-polymer per unit mass of the polymer.

Production Example 17 (Synthesis of Polymer 17)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 10.5 mmol of bis(di(n-butyl)amino)methylvinylsilane in cyclohexane and 13.4 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 10.5 mmol of N-(3-dimethylaminopropyl) acrylamide was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 17 was recovered from the polymer solution by steam stripping. Table 3 shows the evaluation results of Polymer 17. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 18 (Synthesis of Polymer 18)

The interior of a 5-L stainless steel polymerization reactor was washed and dried, and then replaced with dry nitrogen.

Next, 2.55 kg of hexane (specific gravity=0.68 g/cm$^3$), 137 g of 1,3-butadiene, 43 g of styrene, 1.5 mL of tetrahydrofuran, and 1.2 mL of ethylene glycol diethyl ether were introduced into the polymerization reactor. Thereafter, 3.6 mmol of n-butyllithium in n-hexane was further introduced, and the 1,3-butadiene and styrene were copolymerized for 2.5 hours. The polymerization was carried out under stirring at a rate of 130 rpm and a temperature within the polymerization reactor of 65° C. while the monomers were continuously fed into the polymerization reactor. The amount of 1,3-butadiene fed was 205 g, and the amount of styrene fed was 65 g.

After the 2.5-hour polymerization, 2.8 mmol of bis(diethylamino)methylvinylsilane in cyclohexane was introduced into the polymerization reactor under stirring at a rate of 130 rpm and a temperature within the polymerization reactor of 65° C., followed by stirring for 30 minutes.

Next, 20 mL of a hexane solution containing 0.14 mL of methanol was introduced into the polymerization reactor, and the polymer solution was stirred for 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 18 was recovered from the polymer solution by steam stripping. Table 3 shows the evaluation results of Polymer 18. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 19 (Synthesis of Polymer 19)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 10.5 mmol of bis(diethylamino)methylvinylsilane in cyclohexane and 14.9 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 19 was recovered from the polymer solution by steam stripping. Table 3 shows the evaluation results of Polymer 19. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 20 (Synthesis of Polymer 20)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 14.9 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 10.5 mmol of N-(3-dimethylaminopropyl)acrylamide was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 20 was recovered from the polymer solution by steam stripping. Table 3 shows the evaluation results of Polymer 20. Since the compound represented by formula (IX) was not used in the synthesis of Polymer 20, Polymer 20 did not contain the constituent unit represented by formula (I).

Production Example 21 (Synthesis of Polymer 21)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 14.9 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 21 was recovered from the polymer solution by steam stripping. Table 3 shows the evaluation results of Polymer 21. Since the compound represented by formula (IX) was not used in the synthesis of Polymer 21, Polymer 21 did not contain the constituent unit represented by formula (I).

Production Example 22 (Synthesis of Polymer 22)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 10.5 mmol of bis(diethylamino)methylvinylsilane in cyclohexane and 14.9 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 10.5 mmol of N-(3-dimethylaminopropyl)acrylamide was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, the polymer solution was evaporated at ordinary temperature over 24 hours, and further dried under reduced pressure at 55° C. for 12 hours, so that Polymer 22 was obtained. Table 3 shows the evaluation results of Polymer 22. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

TABLE 3

|  | Polymer | | | | | | | | |
| --- | --- | --- | --- | --- | --- | --- | --- | --- | --- |
|  | 14 | 15 | 16 | 17 | 18 | 19 | 20 | 21 | 22 |
| Styrene unit content (% by mass) | 25 | 24 | 24 | 25 | 25 | 25 | 24 | 24 | 25 |
| Vinyl bond content (mol %) | 59 | 60 | 58 | 59 | 59 | 60 | 60 | 58 | 59 |
| Molecular weight distribution (Mw/Mn) | 1.2 | 1.1 | 1.1 | 1.3 | 1.1 | 1.2 | 1.1 | 1.1 | 1.2 |

Production Example 23 (Synthesis of Polymer 23)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 16.0 mmol of bis(diethylamino)methylvinylsilane in cyclohexane and 18.5 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 4.0 mmol of 1,3,5-tris(3-trimethoxysilylpropyl)isocyanurate was added thereto, followed by stirring for 15 minutes. Then, 20 mL of a hexane solution containing 0.80 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 23 was recovered from the polymer solution by steam stripping. Table 4 shows the evaluation results of Polymer 23. The content of the constituent unit represented by formula (I) in the polymer, as calculated from the amounts of raw materials introduced and the amounts of raw materials fed into the polymerization reactor, was 0.009 mmol/g-polymer per unit mass of the polymer.

Production Example 24 (Synthesis of Polymer 24)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 17.3 mmol of n-butyllithium in n-hexane was further introduced, and the 1,3-butadiene and styrene were copolymerized for one hour. The polymerization was carried out under stirring at a rate of 130 rpm and a temperature within the polymerization reactor of 65° C. while the monomers were continuously fed into the polymerization reactor.

After the one hour polymerization, 14.4 mmol of bis(diethylamino)methylvinylsilane in cyclohexane was introduced into the polymerization reactor under stirring at a rate of 130 rpm and a temperature within the polymerization reactor of 65° C.

Next, the monomers were continuously fed into the polymerization reactor, and the 1,3-butadiene and styrene were copolymerized for 0.5 hours. The polymerization was carried out under stirring at a rate of 130 rpm and a temperature within the polymerization reactor of 65° C. After the 0.5-hour polymerization, 14.4 mmol of bis(diethylamino)methylvinylsilane in cyclohexane was introduced into the polymerization reactor under stirring at a rate of 130 rpm and a temperature within the polymerization reactor of 65° C.

Next, the monomers were continuously fed into the polymerization reactor, and the 1,3-butadiene and styrene were copolymerized for 0.5 hours. The polymerization was carried out under stirring at a rate of 130 rpm and a temperature within the polymerization reactor of 65° C.

After the 0.5-hour polymerization, 14.4 mmol of bis(diethylamino)methylvinylsilane in cyclohexane was introduced into the polymerization reactor under stirring at a rate of 130 rpm and a temperature within the polymerization reactor of 65° C.

Next, the monomers were continuously fed into the polymerization reactor, and the 1,3-butadiene and styrene were copolymerized for 0.5 hours. The polymerization was carried out under stirring at a rate of 130 rpm and a temperature within the polymerization reactor of 65° C. During the entire polymerization, the amount of 1,3-butadiene fed was 821 g, and the amount of styrene fed was 259 g.

The resulting polymer solution was then stirred at a rate of 130 rpm, and 3.6 mmol of 1,3,5-tris(3-trimethoxysilylpropyl)isocyanurate was added thereto, followed by stirring for 15 minutes. Then, 20 mL of a hexane solution containing 0.80 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 24 was recovered from the polymer solution by steam stripping. Table 4 shows the evaluation results of Polymer 24. The content of the constituent unit represented by formula (I) in the polymer, as calculated from the amounts of raw materials introduced and the amounts of raw materials fed into the polymerization reactor, was 0.024 mmol/g-polymer per unit mass of the polymer.

Production Example 25 (Synthesis of Polymer 25)

The interior of a 5-L stainless steel polymerization reactor was washed and dried, and then replaced with dry nitrogen. Next, 2.55 kg of hexane (specific gravity=0.68 g/cm$^3$), 137 g of 1,3-butadiene, 43 g of styrene, 1.5 mL of tetrahydrofuran, and 1.2 mL of ethylene glycol diethyl ether were introduced into the polymerization reactor. Thereafter, 3.6 mmol of n-butyllithium in n-hexane was further introduced, and the 1,3-butadiene and styrene were copolymerized for 2.5 hours. The polymerization was carried out under stirring at a rate of 130 rpm and a temperature within the polymerization reactor of 65° C. while the monomers were continuously fed into the polymerization reactor. The amount of 1,3-butadiene fed was 205 g, and the amount of styrene fed was 65 g.

After the 2.5-hour polymerization, 2.8 mmol of bis(diethylamino)methylvinylsilane in cyclohexane was introduced into the polymerization reactor under stirring at a rate of 130 rpm and a temperature within the polymerization reactor of 65° C., followed by stirring for 30 minutes.

Next, 20 mL of a hexane solution containing 0.14 mL of methanol was introduced into the polymerization reactor, and the polymer solution was stirred for 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 25 was recovered from the polymer solution by steam stripping. Table 4 shows the evaluation results of Polymer 25. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 26 (Synthesis of Polymer 26)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 16.0 mmol of bis(diethylamino)methylvinylsilane in cyclohexane and 18.5 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

Then, 20 mL of a hexane solution containing 0.80 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 26 was recovered from the polymer solution by steam stripping. Table 4 shows the evaluation results of Polymer 26. The content of the constituent unit represented by formula (I) in the polymer, as calculated from the amounts of raw materials introduced and the amounts of raw materials fed into the polymerization reactor, was 0.009 mmol/g-polymer per unit mass of the polymer.

Production Example 27 (Synthesis of Polymer 27)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 18.5 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 4.0 mmol of 1,3,5-tris(3-trimethoxysilylpropyl)isocyanurate was added thereto, followed by stirring for 15 minutes. Then, 20 mL of a hexane solution containing 0.80 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 27 was recovered from the polymer solution by steam stripping. Table 4 shows the evaluation results of Polymer 27. Since the compound represented by formula (IX) was not used in the synthesis of Polymer 27, Polymer 27 did not contain the constituent unit represented by formula (I).

Production Example 28 (Synthesis of Polymer 28)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 18.5 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

Then, 20 mL of a hexane solution containing 0.80 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 28 was recovered from the polymer solution by steam stripping. Table 4 shows the evaluation results of Polymer 28. Since the compound represented by formula (IX) was not used in the synthesis of Polymer 28, Polymer 28 did not contain the constituent unit represented by formula (I).

Production Example 29 (Synthesis of Polymer 29)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 16.0 mmol of bis(diethylamino)methylvinylsilane in cyclohexane and 18.5 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 4.0 mmol of 1,3,5-tris(3-trimethoxysilyl-propyl)isocyanurate was added thereto, followed by stirring for 15 minutes. Then, 20 mL of a hexane solution containing 0.80 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, the polymer solution was evaporated at ordinary temperature over 24 hours, and further dried under reduced pressure at 55° C. for 12 hours, so that Polymer 29 was obtained. Table 4 shows the evaluation results of Polymer 29. The content of the constituent unit represented by formula (I) in the polymer, as calculated from the amounts of raw materials introduced and the amounts of raw materials fed into the polymerization reactor, was 0.009 mmol/g-polymer per unit mass of the polymer.

Production Example 30 (Synthesis of Polymer 30)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 16.0 mmol of bis(diethylamino)methylvinylsilane in cyclohexane and 18.5 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 4.0 mmol of 3-(methoxy)propyltrimethoxysilane was added thereto, followed by stirring for 15 minutes. Then, 20 mL of a hexane solution containing 0.80 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 30 was recovered from the polymer solution by steam stripping. Table 4 shows the evaluation results of Polymer 30. The content of the constituent unit represented by formula (I) in the polymer, as calculated from the amounts of raw materials introduced and the amounts of raw materials fed into the polymerization reactor, was 0.009 mmol/g-polymer per unit mass of the polymer.

TABLE 4

| | Polymer | | | | | | | |
|---|---|---|---|---|---|---|---|---|
| | 23 | 24 | 25 | 26 | 27 | 28 | 29 | 30 |
| Styrene unit content (% by mass) | 25 | 25 | 24 | 24 | 25 | 24 | 25 | 24 |
| Vinyl bond content (mol %) | 59 | 59 | 60 | 60 | 59 | 58 | 60 | 59 |
| Molecular weight distribution (Mw/Mn) | 1.5 | 1.6 | 1.1 | 1.2 | 1.3 | 1.1 | 1.5 | 1.4 |

Production Example 31 (Synthesis of Polymer 31)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 11.5 mmol of bis(diethylamino)methylvinylsilane in cyclohexane and 14.1 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.5 mmol of N,N-dimethylformamide dimethyl acetal was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 31 was recovered from the polymer solution by steam stripping. Table 5 shows the evaluation results of Polymer 31. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 32 (Synthesis of Polymer 32)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 14.1 mmol of n-butyllithium in n-hexane was further introduced, and the 1,3-butadiene and styrene were copolymerized for one hour. The polymerization was carried out under stirring at a rate of 130 rpm and a temperature within the polymerization reactor of 65° C. while the monomers were continuously fed into the polymerization reactor.

After the one hour polymerization, 11.0 mmol of bis(diethylamino)methylvinylsilane in cyclohexane was introduced into the polymerization reactor under stirring at a rate of 130 rpm and a temperature within the polymerization reactor of 65° C.

Next, the monomers were continuously fed into the polymerization reactor while the 1,3-butadiene and styrene were copolymerized for 0.5 hours. The polymerization was carried out under stirring at a rate of 130 rpm and a temperature within the polymerization reactor of 65° C.

After the 0.5-hour polymerization, 11.0 mmol of bis(diethylamino)methylvinylsilane in cyclohexane was introduced into the polymerization reactor under stirring at a rate of 130 rpm and a temperature within the polymerization reactor of 65° C.

Next, the monomers were continuously fed into the polymerization reactor while the 1,3-butadiene and styrene were copolymerized for 0.5 hours. The polymerization was carried out under stirring at a rate of 130 rpm and a temperature within the polymerization reactor of 65° C.

After the 0.5-hour polymerization, 11.0 mmol of bis(diethylamino)methylvinylsilane in cyclohexane was introduced into the polymerization reactor under stirring at a rate of 130 rpm and a temperature within the polymerization reactor of 65° C.

Next, the monomers were continuously fed into the polymerization reactor while the 1,3-butadiene and styrene were copolymerized for 0.5 hours. The polymerization was carried out under stirring at a rate of 130 rpm and a temperature within the polymerization reactor of 65° C. During the entire polymerization, the amount of 1,3-butadiene fed was 821 g, and the amount of styrene fed was 259 g.

The resulting polymer solution was then stirred at a rate of 130 rpm, and 11.0 mmol of N,N-dimethylformamide dimethyl acetal was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 32 was recovered from the polymer solution by steam stripping. Table 5 shows the evaluation results of Polymer 32. The content of the constituent unit represented by formula (I) in the polymer, as calculated from the amounts of raw materials introduced and the amounts of raw materials fed into the polymerization reactor, was 0.018 mmol/g-polymer per unit mass of the polymer.

Production Example 33 (Synthesis of Polymer 33)

The interior of a 5-L stainless steel polymerization reactor was washed and dried, and then replaced with dry nitrogen. Next, 2.55 kg of hexane (specific gravity=0.68 g/cm$^3$), 137 g of 1,3-butadiene, 43 g of styrene, 1.5 mL of tetrahydrofuran, and 1.2 mL of ethylene glycol diethyl ether were introduced into the polymerization reactor. Thereafter, 3.6 mmol of n-butyllithium in n-hexane was further introduced, and the 1,3-butadiene and styrene were copolymerized for 2.5 hours. The polymerization was carried out under stirring at a rate of 130 rpm and a temperature within the polymerization reactor of 65° C. while the monomers were continuously fed into the polymerization reactor. The amount of 1,3-butadiene fed was 205 g, and the amount of styrene fed was 65 g.

After the 2.5-hour polymerization, 2.8 mmol of bis(diethylamino)methylvinylsilane in cyclohexane was introduced into the polymerization reactor under stirring at a rate of 130 rpm and a temperature within the polymerization reactor of 65° C., followed by stirring for 30 minutes. Next, 20 mL of a hexane solution containing 0.14 mL of methanol was introduced into the polymerization reactor, and the polymer solution was stirred for 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 33 was recovered from the polymer solution by steam stripping. Table 5 shows the evaluation results of Polymer 33. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 34 (Synthesis of Polymer 34)

The interior of a 20-L stainless steel polymerization reactor was washed and dried, and then replaced with dry nitrogen. Next, 10.2 kg of hexane (specific gravity=0.68 g/cm$^3$), 547 g of 1,3-butadiene, 173 g of styrene, 6.1 mL of tetrahydrofuran, and 5.0 mL of ethylene glycol diethyl ether were introduced into the polymerization reactor. Thereafter, 11.5 mmol of bis(diethylamino)methylvinylsilane in cyclohexane and 14.1 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 34 was recovered from the polymer solution by steam stripping. Table 5 shows the evaluation results of Polymer 34. The content of the constituent unit represented by formula (I) in the polymer, as calculated from the amounts of raw materials introduced and the amounts of raw materials fed into the polymerization reactor, was 0.006 mmol/g-polymer per unit mass of the polymer.

Production Example 35 (Synthesis of Polymer 35)

The interior of a 20-L stainless steel polymerization reactor was washed and dried, and then replaced with dry nitrogen. Next, 10.2 kg of hexane (specific gravity=0.68 g/cm³), 547 g of 1,3-butadiene, 173 g of styrene, 6.1 mL of tetrahydrofuran, and 5.0 mL of ethylene glycol diethyl ether were introduced into the polymerization reactor. Thereafter, 14.1 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.5 mmol of N,N-dimethylformamide dimethyl acetal was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 35 was recovered from the polymer solution by steam stripping. Table 5 shows the evaluation results of Polymer 35. Since the compound represented by formula (IX) was not used in the synthesis of Polymer 35, Polymer 35 did not contain the constituent unit represented by formula (I).

Production Example 36 (Synthesis of Polymer 36)

The interior of a 20-L stainless steel polymerization reactor was washed and dried, and then replaced with dry nitrogen. Next, 10.2 kg of hexane (specific gravity=0.68 g/cm³), 547 g of 1,3-butadiene, 173 g of styrene, 6.1 mL of tetrahydrofuran, and 5.0 mL of ethylene glycol diethyl ether were introduced into the polymerization reactor. Thereafter, 14.1 mmol of n-butyllithium in n-hexane was further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, Polymer 36 was recovered from the polymer solution by steam stripping. Table 5 shows the evaluation results of Polymer 36. Since the compound represented by formula (IX) was not used in the synthesis of Polymer 36, Polymer 36 did not contain the constituent unit represented by formula (I).

Production Example 37 (Synthesis of Polymer 37)

The interior of a 20-L stainless steel polymerization reactor was washed and dried, and then replaced with dry nitrogen. Next, 10.2 kg of hexane (specific gravity=0.68 g/cm³), 547 g of 1,3-butadiene, 173 g of styrene, 6.1 mL of tetrahydrofuran, and 5.0 mL of ethylene glycol diethyl ether were introduced into the polymerization reactor. Thereafter, 11.5 mmol of bis(diethylamino)methylvinylsilane in cyclohexane and 14.1 mmol of n-butyllithium in n-hexane were further introduced to initiate polymerization.

The 1,3-butadiene and styrene were copolymerized for 3 hours under stirring at a rate of 130 rpm and a temperature within the polymerization reactor of 65° C. while the monomers were continuously fed into the polymerization reactor. During the entire polymerization, the amount of 1,3-butadiene fed was 821 g, and the amount of styrene fed was 259 g.

The resulting polymer solution was then stirred at a rate of 130 rpm, and 11.5 mmol of N,N-dimethylformamide dimethyl acetal was added thereto, followed by stirring for 15 minutes. Then, 20 mL of a hexane solution containing 0.54 mL of methanol was added to the polymer solution, and the polymer solution was stirred for additional 5 minutes.

To the resulting polymer solution were added 1.8 g of 2-tert-butyl-6-(3-tert-butyl-2-hydroxy-5-methylbenzyl)-4-methylphenyl acrylate (trade name: Sumilizer GM, produced by Sumitomo Chemical Co., Ltd.) and 0.9 g of pentaerythrityl tetrakis(3-laurylthiopropionate) (trade name: Sumilizer TP-D, produced by Sumitomo Chemical Co., Ltd.). Then, the polymer solution was evaporated at ordinary temperature over 24 hours, and further dried under reduced pressure at 55° C. for 12 hours, so that Polymer 37 was obtained. Table 5 shows the evaluation results of Polymer 37. The content of the constituent unit represented by formula (I) in the polymer, as calculated from the amounts of raw Materials introduced and the amounts of raw materials fed into the polymerization reactor, was 0.006 mmol/g-polymer per unit mass of the polymer.

TABLE 5

| | Polymer | | | | | | |
|---|---|---|---|---|---|---|---|
| | 31 | 32 | 33 | 34 | 35 | 36 | 37 |
| Styrene unit content (% by mass) | 25 | 25 | 25 | 25 | 25 | 24 | 24 |
| Vinyl bond content (mol %) | 59 | 59 | 59 | 60 | 59 | 59 | 60 |
| Molecular weight distribution (Mw/Mn) | 1.6 | 1.3 | 1.1 | 1.3 | 1.1 | 1.1 | 1.2 |

The chemicals used in examples and comparative examples are described below.
NR: RSS #3
BR: Ubepol BR150B produced by Ube Industries, Ltd.
SBR: NS116R (styrene unit content: 20% by mass, vinyl bond content: 60 mol %) produced by Zeon Corporation
Polymers 1 to 37: see Production Examples 1 to 37 above
Silica: Ultrasil VN3-G ($N_2SA$: 175 m²/g) produced by Evonik Degussa
Silane coupling agent: Si69 (bis(3-triethoxysilylpropyl)tetrasulfide) produced by Evonik Degussa
Carbon black 1: Diablack N339 ($N_2SA$: 96 m²/g, DBP absorption: 124 mL/100 g) produced by Mitsubishi Chemical Corporation Carbon black 2: Diablack N220 ($N_2SA$: 114 m$^2$/g, DBP absorption: 114 mL/100 g) produced by Mitsubishi Chemical Corporation
Liquid resin 1: NOVARES C10 (Liquid coumarone-indene resin, softening point: 5 to 15° C., viscosity: 10 Pa·s) produced by Rutgers Chemicals AG
Liquid resin 2: Nitto Resin Coumarone L-20 (copolymer (liquid) of coumarone, indene, and styrene, softening point: −20 to −10° C., viscosity: 20 Pa·s) produced by NITTO CHEMICALS CO., LTD.
Liquid resin 3: MARUKACLEAR H (polyisopentane (liquid), softening point: −20 to −10° C., viscosity: 10 Pa·s) produced by Maruzen Petrochemical Co., Ltd.
Liquid resin 4: NOVARES TL10 (Liquid resin mainly containing α-methylstyrene and indene, softening point: 5 to 15° C.) produced by Rutgers Chemicals AG
Solid resin 1: PENSEL D160 (solid rosin ester resin, softening point: 150° C. or higher) produced by Arakawa Chemical Industries, Ltd.
Solid resin 2: NOVARES C90 (solid coumarone-indene resin, softening point: 85 to 95° C.) produced by Rutgers Chemicals AG
Oil: X-140 produced by Idemitsu Kosan Co., Ltd.
Antioxidant: Antigene 3C produced by Sumitomo Chemical Co., Ltd.
Stearic acid: stearic acid beads "Tsubaki" produced by NOF Corporation
Zinc oxide: zinc white #1 produced by Mitsui Mining & Smelting Co., Ltd.
Wax: Sunnoc N produced by Cuchi Shinko Chemical Industrial Co., Ltd.
Sulfur: sulfur powder produced by Tsurumi Chemical Industry Co., Ltd.
Vulcanization accelerator 1: Soxinol CZ produced by Sumitomo Chemical Co., Ltd.
Vulcanization accelerator 2: Soxinol D produced by Sumitomo Chemical Co., Ltd.

Examples and Comparative Examples

According to the each formulation shown in Tables 6 to 14, the materials other than the sulfur and vulcanization accelerators were kneaded for 5 minutes at 150° C. using a 1.7-L Banbury mixer from Kobe Steel, Ltd., to obtain a kneadate. The sulfur and vulcanization accelerators were then added to the obtained kneadate and kneading was performed using an open roll mill for 5 minutes at 80° C. to obtain an unvulcanized rubber composition. The obtained unvulcanized rubber composition was press-vulcanized for 20 minutes at 170° C. using a 0.5 mm-thick mold to obtain a vulcanized rubber composition.

In addition, the obtained unvulcanized rubber composition was formed into a tread shape and assembled with other tire components in a tire building machine to form an unvulcanized tire. The unvulcanized tire was vulcanized for 12 minutes at 170° C. to prepare a test tire (size: 195/65R15).

The obtained vulcanized rubber compositions, and test tires were evaluated by the aforementioned testing methods. Tables 6 to 14 show the results of these tests.

TABLE 6

| | | Example | | | | | Comparative Example | | | | | | |
|---|---|---|---|---|---|---|---|---|---|---|---|---|---|
| | | 1 | 2 | 3 | 4 | 5 | 1 | 2 | 3 | 4 | 5 | 6 | 7 |
| Composition (parts by mass) | NR | 20 | 20 | 20 | 20 | 20 | 20 | 20 | 20 | 20 | 20 | 20 | 20 |
| | BR | 20 | 20 | 20 | 20 | 20 | 20 | 20 | 20 | 20 | 20 | 20 | 20 |
| | Polymer 1 | 60 | 60 | 60 | 60 | — | — | — | — | — | 60 | — | 60 |
| | Polymer 2 | — | — | — | — | — | — | 60 | — | — | — | — | — |
| | Polymer 3 | — | — | — | — | — | — | — | 60 | — | — | — | — |
| | Polymer 4 | — | — | — | — | — | — | — | — | 60 | — | — | — |
| | Polymer 5 | — | — | — | — | — | 60 | — | — | — | — | 60 | — |
| | Polymer 6 | — | — | — | — | 60 | — | — | — | — | — | — | — |
| | Silica | 75 | 75 | 75 | 75 | 75 | 75 | 75 | 75 | 75 | 75 | 75 | 75 |
| | Silane coupling agent | 6 | 6 | 6 | 6 | 6 | 6 | 6 | 6 | 6 | 6 | 6 | 6 |
| | Carbon black 1 | 5 | 5 | 5 | 5 | 5 | 5 | 5 | 5 | 5 | 5 | 5 | 5 |
| | Liquid resin 1 | 5 | — | — | 10 | 5 | — | — | — | — | — | 5 | — |
| | Liquid resin 2 | — | 5 | — | — | — | — | — | — | — | — | — | — |
| | Liquid resin 3 | — | — | 5 | — | — | — | — | — | — | — | — | — |
| | Solid resin 1 | — | — | — | — | — | — | — | — | — | — | — | 5 |
| | Oil | 15 | 15 | 15 | 10 | 15 | 20 | 20 | 20 | 20 | 20 | 15 | 15 |
| | Antioxidant | 1.5 | 1.5 | 1.5 | 1.5 | 1.5 | 1.5 | 1.5 | 1.5 | 1.5 | 1.5 | 1.5 | 1.5 |
| | Stearic acid | 2 | 2 | 2 | 2 | 2 | 2 | 2 | 2 | 2 | 2 | 2 | 2 |
| | Zinc oxide | 2.5 | 2.5 | 2.5 | 2.5 | 2.5 | 2.5 | 2.5 | 2.5 | 2.5 | 2.5 | 2.5 | 2.5 |
| | Wax | 1 | 1 | 1 | 1 | 1 | 1 | 1 | 1 | 1 | 1 | 1 | 1 |
| | Sulfur | 2 | 2 | 2 | 2 | 2 | 2 | 2 | 2 | 2 | 2 | 2 | 2 |
| | Vulcanization accelerator 1 | 1.8 | 1.8 | 1.8 | 1.8 | 1.8 | 1.8 | 1.8 | 1.8 | 1.8 | 1.8 | 1.8 | 1.8 |
| | Vulcanization accelerator 2 | 1.2 | 1.2 | 1.2 | 1.2 | 1.2 | 1.2 | 1.2 | 1.2 | 1.2 | 1.2 | 1.2 | 1.2 |
| Evaluation | tan δ index | 125 | 127 | 120 | 129 | 120 | 100 | 110 | 111 | 108 | 102 | 96 | 92 |
| | Rolling resistance index | 120 | 126 | 117 | 125 | 118 | 100 | 108 | 106 | 105 | 102 | 95 | 91 |
| | Wet-grip performance index | 134 | 138 | 127 | 138 | 128 | 100 | 114 | 117 | 117 | 92 | 105 | 106 |
| | Abrasion resistance index 1 | 115 | 117 | 117 | 108 | 111 | 100 | 107 | 105 | 104 | 102 | 97 | 96 |

TABLE 7

| | | Comparative Example 8 | Example 6 |
|---|---|---|---|
| Composition (parts by mass) | NR | — | — |
| | BR | — | — |
| | Polymer 1 | — | 60 |
| | Polymer 2 | — | — |
| | Polymer 3 | — | — |
| | Polymer 4 | — | — |
| | Polymer 5 | 100 | 40 |
| | Polymer 6 | — | — |

TABLE 7-continued

|  | Comparative Example 8 | Example 6 |
|---|---|---|
| Silica | 75 | 75 |
| Silane coupling agent | 6 | 6 |
| Carbon black1 | 5 | 5 |
| Liquid resin 1 | 5 | 5 |
| Liquid resin 2 | — | — |
| Liquid resin 3 | — | — |
| Solid resin 1 | — | — |
| Oil | 15 | 15 |
| Antioxidant | 1.5 | 1.5 |
| Stearic acid | 2 | 2 |

TABLE 7-continued

|  |  | Comparative Example 8 | Example 6 |
|---|---|---|---|
|  | Zinc oxide | 2.5 | 2.5 |
|  | Wax | 1 | 1 |
|  | Sulfur | 2 | 2 |
|  | Vulcanization accelerator 1 | 1.8 | 1.8 |
|  | Vulcanization accelerator 2 | 12 | 12 |
| Evaluation | tanδ index | 100 | 120 |
|  | Rolling resistance index | 100 | 126 |
|  | Wet-grip performance index | 100 | 125 |
|  | Abrasion resistance index 1 | 100 | 112 |

TABLE 8

|  |  | Comparative Example |  |  |  |  | Example |  |  |  |  |  |  |  |  |  |
|---|---|---|---|---|---|---|---|---|---|---|---|---|---|---|---|---|
|  |  | 9 | 10 | 11 | 12 | 13 | 7 | 8 | 9 | 10 | 11 | 12 | 13 | 14 | 15 | 16 |
| Composition (parts by mass) | NR | 20 | 20 | 20 | 20 | 20 | 20 | 20 | 20 | 20 | — | 20 | 20 | 20 | 20 | 20 |
|  | BR | 20 | 20 | 20 | 20 | 20 | 20 | 20 | 20 | 20 | 20 | 20 | 20 | 20 | 20 | 20 |
|  | SBR | 60 | — | — | — | 60 | — | — | — | — | — | — | — | — | — | — |
|  | Polymer 7 | — | 60 | — | 60 | — | 60 | — | — | — | 80 | — | — | — | — | — |
|  | Polymer 8 | — | — | 60 | — | — | — | 60 | 60 | 60 | — | — | — | — | — | — |
|  | Polymer 9 | — | — | — | — | — | — | — | — | — | — | 60 | — | — | — | — |
|  | Polymer 10 | — | — | — | — | — | — | — | — | — | — | — | 60 | — | — | — |
|  | Polymer 11 | — | — | — | — | — | — | — | — | — | — | — | — | 60 | — | — |
|  | Polymer 12 | — | — | — | — | — | — | — | — | — | — | — | — | — | 60 | — |
|  | Polymer 13 | — | — | — | — | — | — | — | — | — | — | — | — | — | — | 60 |
|  | Silica | 75 | 75 | 75 | 75 | 75 | 75 | 75 | 75 | 75 | 75 | 75 | 75 | 75 | 75 | 75 |
|  | Silane coupling agent | 6 | 6 | 6 | 6 | 6 | 6 | 6 | 6 | 6 | 6 | 6 | 6 | 6 | 6 | 6 |
|  | Carbon black 1 | 5 | 5 | 5 | 5 | 5 | 5 | 5 | 5 | 5 | 5 | 5 | 5 | 5 | 5 | 5 |
|  | Liquid resin 1 | — | — | — | — | 20 | 20 | 20 | — | — | 20 | 20 | 20 | 20 | 20 | 20 |
|  | Liquid resin 4 | — | — | — | — | — | — | — | 20 | 30 | — | — | — | — | — | — |
|  | Solid resin 2 | — | — | — | 20 | — | — | — | — | — | — | — | — | — | — | — |
|  | Oil | 20 | 20 | 20 | — | — | — | — | — | — | — | — | — | — | — | — |
|  | Antioxidant | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 | 1.2 | 1.2 |
| Evaluation | Rolling resistance index | 100 | 127 | 130 | 116 | 105 | 135 | 138 | 137 | 130 | 129 | 134 | 136 | 135 | 137 | 135 |
|  | Wet-grip performance index | 100 | 126 | 128 | 126 | 102 | 131 | 133 | 131 | 136 | 139 | 130 | 130 | 129 | 132 | 133 |
|  | Abrasion resistance index 1 | 100 | 119 | 121 | 121 | 102 | 124 | 126 | 131 | 122 | 119 | 123 | 126 | 127 | 125 | 123 |

TABLE 9

|  |  | Comparative Example |  |  |  |  |  |  |  |  |  |
|---|---|---|---|---|---|---|---|---|---|---|---|
|  |  | 14 | 15 | 16 | 17 | 18 | 19 | 20 | 21 | 22 | 23 |
| Composition (parts by mass) | NR | 20 | 20 | 20 | 20 | 20 | 20 | 20 | 20 | 20 | 20 |
|  | BR | 20 | 20 | 20 | 20 | 20 | 20 | 20 | 20 | 20 | 20 |
|  | Polymer 14 | 60 | — | — | — | 20 | — | — | — | — | — |
|  | Polymer 15 | — | 60 | — | — | — | — | — | — | — | — |
|  | Polymer 16 | — | — | 60 | — | — | — | — | — | — | — |
|  | Polymer 17 | — | — | — | 60 | — | — | — | — | — | — |
|  | Polymer 18 | — | — | — | — | 40 | — | — | 60 | — | — |
|  | Polymer 19 | — | — | — | — | — | — | — | — | 60 | — |
|  | Polymer 20 | — | — | — | — | — | — | — | — | — | 60 |
|  | Polymer 21 | — | — | — | — | — | — | 60 | — | — | — |
|  | Polymer 22 | — | — | — | — | — | 60 | — | — | — | — |
|  | Silica | 75 | 75 | 75 | 75 | 75 | 75 | 75 | 75 | 75 | 75 |
|  | Silane coupling agent | 6 | 6 | 6 | 6 | 6 | 6 | 6 | 6 | 6 | 6 |
|  | Carbon black 1 | 5 | 5 | 5 | 5 | 5 | 5 | 5 | 5 | 5 | 5 |
|  | Oil | 20 | 20 | 20 | 20 | 20 | 20 | 20 | 20 | 20 | 20 |
|  | Antioxidant | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Liquid resin 1 | — | — | — | — | — | — | — | — | — | — |
|  | Liquid resin 4 | — | — | — | — | — | — | — | — | — | — |

TABLE 9-continued

|  |  | Comparative Example | | | | | | | | | |
|---|---|---|---|---|---|---|---|---|---|---|---|
|  |  | 14 | 15 | 16 | 17 | 18 | 19 | 20 | 21 | 22 | 23 |
|  | Solid resin 1 | — | — | — | — | — | — | — | — | — | — |
|  | Sulfur | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 |
| Evaluation | Rolling resistance index | 136 | 138 | 140 | 140 | 115 | 128 | 100 | 109 | 111 | 113 |
|  | Wet-grip performance index | 139 | 140 | 142 | 144 | 120 | 131 | 100 | 118 | 121 | 122 |
|  | Abrasion resistance index 2 | 120 | 121 | 125 | 127 | 110 | 115 | 100 | 109 | 110 | 112 |

TABLE 10

|  |  | Example | | | | | | Comparative Example | | | |
|---|---|---|---|---|---|---|---|---|---|---|---|
|  |  | 17 | 18 | 19 | 20 | 21 | 22 | 24 | 25 | 26 | 27 |
| Composition | NR | 20 | 20 | 20 | 20 | 20 | 20 | 20 | 20 | 20 | 20 |
| (parts by mass) | BR | 20 | 20 | 20 | 20 | 20 | 20 | 20 | 20 | 20 | 20 |
|  | Polymer 14 | 60 | — | — | — | 20 | — | — | — | — | — |
|  | Polymer 15 | — | 60 | — | — | — | — | — | — | — | — |
|  | Polymer 16 | — | — | 60 | — | — | — | — | — | — | — |
|  | Polymer 17 | — | — | — | 60 | — | — | — | — | — | — |
|  | Polymer 18 | — | — | — | — | 40 | — | — | 60 | — | — |
|  | Polymer 19 | — | — | — | — | — | — | — | — | 60 | — |
|  | Polymer 20 | — | — | — | — | — | — | — | — | — | 60 |
|  | Polymer 21 | — | — | — | — | — | — | 60 | — | — | — |
|  | Polymer 22 | — | — | — | — | — | 60 | — | — | — | — |
|  | Silica | 75 | 75 | 75 | 75 | 75 | 75 | 75 | 75 | 75 | 75 |
|  | Silane coupling agent | 6 | 6 | 6 | 6 | 6 | 6 | 6 | 6 | 6 | 6 |
|  | Carbon black 1 | 5 | 5 | 5 | 5 | 5 | 5 | 5 | 5 | 5 | 5 |
|  | Oil | — | — | — | — | — | — | — | — | — | — |
|  | Antioxidant | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Liquid resin 1 | 20 | 20 | 20 | 20 | 20 | 20 | 20 | 20 | 20 | 20 |
|  | Liquid resin 4 | — | — | — | — | — | — | — | — | — | — |
|  | Solid resin 1 | — | — | — | — | — | — | — | — | — | — |
|  | Sulfur | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 |
| Evaluation | Rolling resistance index | 146 | 149 | 152 | 150 | 126 | 139 | 108 | 117 | 119 | 120 |
|  | Wet-grip performance index | 147 | 147 | 150 | 151 | 127 | 139 | 105 | 122 | 125 | 126 |
|  | Abrasion resistance index 2 | 128 | 129 | 135 | 135 | 119 | 124 | 105 | 113 | 115 | 117 |

TABLE 11

|  |  | Example | | | | | | Comparative Example | | | | |
|---|---|---|---|---|---|---|---|---|---|---|---|---|
|  |  | 23 | 24 | 25 | 26 | 27 | 28 | 28 | 29 | 30 | 31 | 32 |
| Composition | NR | 20 | 20 | 20 | 20 | 20 | 20 | 20 | 20 | 20 | 20 | 20 |
| (parts by mass) | BR | 20 | 20 | 20 | 20 | 20 | 20 | 20 | 20 | 20 | 20 | 20 |
|  | Polymer 14 | 60 | — | — | — | 20 | — | — | — | — | — | 60 |
|  | Polymer 15 | — | 60 | — | — | — | — | — | — | — | — | — |
|  | Polymer 16 | — | — | 60 | — | — | — | — | — | — | — | — |
|  | Polymer 17 | — | — | — | 60 | — | — | — | — | — | — | — |
|  | Polymer 18 | — | — | — | — | 40 | — | — | 60 | — | — | — |
|  | Polymer 19 | — | — | — | — | — | — | — | — | 60 | — | — |
|  | Polymer 20 | — | — | — | — | — | — | — | — | — | 60 | — |
|  | Polymer 21 | — | — | — | — | — | — | 60 | — | — | — | — |
|  | Polymer 22 | — | — | — | — | — | 60 | — | — | — | — | — |
|  | Silica | 75 | 75 | 75 | 75 | 75 | 75 | 75 | 75 | 75 | 75 | 75 |
|  | Silane coupling agent | 6 | 6 | 6 | 6 | 6 | 6 | 6 | 6 | 6 | 6 | 6 |
|  | Carbon black | 5 | 5 | 5 | 5 | 5 | 5 | 5 | 5 | 5 | 5 | 5 |
|  | Oil | — | — | — | — | — | — | — | — | — | — | — |
|  | Antioxidant | 1.5 | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 |
|  | Liquid resin 1 | — | — | — | — | — | — | — | — | — | — | — |
|  | Liquid resin 4 | 20 | 20 | 20 | 20 | 20 | 20 | 20 | 20 | 20 | 20 | — |
|  | Solid resin 1 | — | — | — | — | — | — | — | — | — | — | 20 |

TABLE 11-continued

|  |  | Example |  |  |  |  |  | Comparative Example |  |  |  |  |
|---|---|---|---|---|---|---|---|---|---|---|---|---|
|  |  | 23 | 24 | 25 | 26 | 27 | 28 | 28 | 29 | 30 | 31 | 32 |
|  | Sulfur | 2 | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 | 1.2 |
| Evaluation | Rolling resistance index | 147 | 150 | 153 | 151 | 127 | 140 | 108 | 118 | 120 | 121 | 135 |
|  | Wet-grip performance index | 145 | 145 | 148 | 149 | 125 | 137 | 103 | 120 | 123 | 123 | 145 |
|  | Abrasion resistance index 2 | 132 | 133 | 139 | 139 | 123 | 129 | 108 | 116 | 119 | 120 | 130 |

TABLE 12

|  |  | Example |  |  |  |  |  |  |  |  |  |
|---|---|---|---|---|---|---|---|---|---|---|---|
|  |  | 29 | 30 | 31 | 32 | 33 | 34 | 35 | 36 | 37 | 38 |
| Composition (parts by mass) | NR | 20 | 20 | 20 | 20 | 20 | 20 | 20 | 20 | 20 | 20 |
|  | BR | 20 | 20 | 20 | 20 | 20 | 20 | 20 | 20 | 20 | 20 |
|  | Polymer 23 | 60 | — | — | — | — | — | — | — | — | 60 |
|  | Polymer 24 | — | 60 | 60 | 60 | 60 | 60 | 60 | — | — | — |
|  | Polymer 25 | — | — | — | — | — | — | — | — | — | — |
|  | Polymer 26 | — | — | — | — | — | — | — | — | — | — |
|  | Polymer 27 | — | — | — | — | — | — | — | — | — | — |
|  | Polymer 28 | — | — | — | — | — | — | — | — | — | — |
|  | Polymer 29 | — | — | — | — | — | — | — | 60 | — | — |
|  | Polymer 30 | — | — | — | — | — | — | — | — | 60 | — |
|  | Silica | 75 | 75 | 75 | 75 | 75 | 75 | 75 | 75 | 75 | 75 |
|  | Silane coupling agent | 6 | 6 | 6 | 6 | 6 | 6 | 6 | 6 | 6 | 6 |
|  | Carbon black 2 | 5 | 5 | 5 | 5 | 5 | 5 | 5 | 5 | 5 | 5 |
|  | Oil | — | — | — | — | 5 | 10 | 15 | — | — | — |
|  | Liquid resin 1 | 20 | 20 | 5 | 40 | 15 | 10 | 5 | 20 | 20 | — |
|  | Liquid resin 4 | — | — | — | — | — | — | — | — | — | 20 |
|  | Antioxidant | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 |
| Evaluation | tanδ index | 140 | 142 | 120 | 145 | 137 | 135 | 132 | 134 | 132 | 138 |
|  | Rolling resistance index | 137 | 140 | 115 | 142 | 133 | 130 | 128 | 130 | 130 | 135 |
|  | Wet-grip performance index | 138 | 140 | 110 | 145 | 132 | 130 | 127 | 128 | 127 | 137 |
|  | Abrasion resistance index 1 | 125 | 128 | 130 | 105 | 119 | 116 | 113 | 117 | 116 | 125 |

TABLE 13

|  |  | Comparative Example |  |  |  |  |  |  |  |  |  |  |  |
|---|---|---|---|---|---|---|---|---|---|---|---|---|---|
|  |  | 33 | 34 | 35 | 36 | 37 | 38 | 39 | 40 | 41 | 42 | 43 | 44 |
| Composition (parts by mass) | NR | 20 | 20 | 20 | 20 | 20 | 20 | 20 | 20 | 20 | 20 | 20 | 20 |
|  | BR | 20 | 20 | 20 | 20 | 20 | 20 | 20 | 20 | 20 | 20 | 20 | 20 |
|  | Polymer 23 | — | — | — | — | — | — | — | — | — | 60 | — | 60 |
|  | Polymer 24 | — | — | — | — | — | — | — | — | — | — | — | — |
|  | Polymer 25 | — | 60 | — | — | — | — | 60 | — | — | — | — | — |
|  | Polymer 26 | — | — | 60 | — | — | — | — | 60 | — | — | — | — |
|  | Polymer 27 | — | — | — | 60 | — | — | — | — | 60 | — | — | — |
|  | Polymer 28 | 60 | — | — | — | — | 60 | — | — | — | — | 60 | — |
|  | Polymer 29 | — | — | — | — | — | — | — | — | — | — | — | — |
|  | Polymer 30 | — | — | — | — | 60 | — | — | — | — | — | — | — |
|  | Silica | 75 | 75 | 75 | 75 | 75 | 75 | 75 | 75 | 75 | 75 | 75 | 75 |
|  | Silane coupling agent | 6 | 6 | 6 | 6 | 6 | 6 | 6 | 6 | 6 | 6 | 6 | 6 |
|  | Carbon black2 | 5 | 5 | 5 | 5 | 5 | 5 | 5 | 5 | 5 | 5 | 5 | 5 |
|  | Oil | 20 | 20 | 20 | 20 | 20 | 10 | 10 | 10 | 10 | 20 | — | — |
|  | Liquid resin 1 | — | — | — | — | — | 10 | 10 | 10 | 10 | — | 20 | — |
|  | Solid resin 2 | — | — | — | — | — | — | — | — | — | — | — | 20 |
|  | Antioxidant | 1.5 | 1.5 | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 | 1.2 | 1.2 |

TABLE 13-continued

|  |  | Comparative Example | | | | | | | | | | | |
|---|---|---|---|---|---|---|---|---|---|---|---|---|
|  |  | 33 | 34 | 35 | 36 | 37 | 38 | 39 | 40 | 41 | 42 | 43 | 44 |
| Evaluation | tanδ index | 100 | 118 | 122 | 110 | 125 | 103 | 120 | 125 | 112 | 131 | 105 | 115 |
|  | Rolling resistance index | 100 | 109 | 112 | 106 | 118 | 105 | 112 | 115 | 109 | 125 | 107 | 110 |
|  | Wet-grip performance index | 100 | 115 | 120 | 110 | 125 | 102 | 118 | 123 | 113 | 135 | 104 | 138 |
|  | Abrasion resistance index 1 | 100 | 110 | 114 | 112 | 113 | 103 | 113 | 115 | 115 | 121 | 105 | 120 |

TABLE 14

|  |  | Example | | | | | | Comparative Example | | | | | | |
|---|---|---|---|---|---|---|---|---|---|---|---|---|---|
|  |  | 39 | 40 | 41 | 42 | 43 | 44 | 45 | 46 | 47 | 48 | 49 | 50 | 51 |
| Composition | NR | 20 | 20 | 20 | 20 | 20 | 20 | 20 | 20 | 20 | 20 | 20 | 20 | 20 |
| (parts by mass) | BR | 20 | 20 | 20 | 20 | 20 | 20 | 20 | 20 | 20 | 20 | 20 | 20 | 20 |
|  | Polymer 31 | 60 | — | 20 | 60 | — | 60 | — | — | — | — | — | 60 | 60 |
|  | Polymer 32 | — | 60 | — | — | — | — | — | — | — | — | — | — | — |
|  | Polymer 33 | — | — | 40 | — | — | — | — | 60 | — | — | — | — | — |
|  | Polymer 34 | — | — | — | — | — | — | — | — | 60 | — | — | — | — |
|  | Polymer 35 | — | — | — | — | — | — | — | — | — | 60 | — | — | — |
|  | Polymer 36 | — | — | — | — | — | — | 60 | — | — | — | 60 | — | — |
|  | Polymer 37 | — | — | — | — | 60 | — | — | — | — | — | — | — | — |
|  | Silica | 75 | 75 | 75 | 50 | 75 | 75 | 75 | 75 | 75 | 75 | 75 | 75 | 75 |
|  | Silane coupling agent | 6 | 6 | 6 | 6 | 6 | 6 | 6 | 6 | 6 | 6 | 6 | 6 | 6 |
|  | Carbon black 2 | 5 | 5 | 5 | 5 | 5 | 5 | 5 | 5 | 5 | 5 | 5 | 5 | 5 |
|  | Oil | 5 | 18 | 3 | 5 | 10 | 20 | 20 | 20 | 20 | 20 | 5 | 20 | 5 |
|  | Liquid resin 1 | 20 | 5 | 40 | 15 | 10 | — | — | — | — | — | 20 | — | — |
|  | Liquid resin 4 | — | — | — | — | — | 20 | — | — | — | — | — | — | — |
|  | Solid resin 1 | — | — | — | — | — | — | — | — | — | — | — | — | 20 |
|  | Antioxidant | 1.5 | 1.5 | 1.5 | 1.5 | 1.5 | 1.5 | 1.5 | 1.5 | 1.5 | 1.5 | 1.5 | 1.5 | 1.5 |
|  | Stearic acid | 2 | 2 | 2 | 2 | 2 | 2 | 2 | 2 | 2 | 2 | 2 | 2 | 2 |
|  | Zinc oxide | 2.5 | 2.5 | 2.5 | 2.5 | 2.5 | 2.5 | 2.5 | 2.5 | 2.5 | 2.5 | 2.5 | 2.5 | 2.5 |
|  | Wax | 1 | 1 | 1 | 1 | 1 | 1 | 1 | 1 | 1 | 1 | 1 | 1 | 1 |
|  | Sulfur | 2 | 2 | 2 | 2 | 2 | 2 | 2 | 2 | 2 | 2 | 2 | 2 | 2 |
|  | Vulcanization accelerator 1 | 1.8 | 1.8 | 1.8 | 1.8 | 1.8 | 1.8 | 1.8 | 1.8 | 1.8 | 1.8 | 1.8 | 1.8 | 1.8 |
|  | Vulcanization accelerator 2 | 1.2 | 1.2 | 1.2 | 1.2 | 1.2 | 1.2 | 1.2 | 1.2 | 1.2 | 1.2 | 1.2 | 1.2 | 1.2 |
| Evaluation | tanδ index | 138 | 120 | 146 | 137 | 128 | 142 | 100 | 117 | 118 | 110 | 110 | 103 | 106 |
|  | Rolling resistance index | 136 | 115 | 140 | 130 | 123 | 135 | 100 | 110 | 112 | 105 | 94 | 104 | 100 |
|  | Wet-grip performance index | 137 | 109 | 141 | 131 | 127 | 134 | 100 | 113 | 114 | 98 | 112 | 96 | 98 |
|  | Abrasion resistance index 1 | 124 | 131 | 104 | 120 | 118 | 112 | 100 | 95 | 100 | 113 | 103 | 100 | 102 |

As shown in Tables 6 to 14, in the case of the rubber compositions of the examples each of which contained a liquid resin having a specific softening point (liquid rein 1, 2, 3, or 4), and a polymer (polymer 1, 6, 7 to 17, 22 to 24, 29 to 32, or 37) containing a constituent unit based on a conjugated diene and a constituent unit represented by the above formula (I), and having a terminal modified with a specific compound, the fuel economy, wet-grip performance, and abrasion resistance were improved synergistically and achieved at high levels in a balanced manner as compared to the rubber compositions of the comparative examples.

The invention claimed is:

1. A rubber composition, comprising a rubber component, silica, and a liquid resin having a softening point of –20 to 20° C.,
wherein the rubber component contains, based on 100% by mass of the rubber component, 5 to 90% by mass of a conjugated diene polymer containing a constituent unit based on 1,3-butadiene, a constituent unit based on styrene, and a constituent unit represented by formula (I) below, at least one terminal of the polymer being modified with at least one compound selected from the group consisting of a compound represented by formula (II) below, a compound represented by formula (IIIa-2) below, a compound represented by formula (IIIa-3) below, a compound represented by formula (IIIb-1-1) below, a compound represented by formula (IIIb-1-2) below, a compound represented by formula (IV) below, a compound represented by formula (Va-2) below, a compound represented by formula (VIa) below, and a compound represented by formula (VII-1) below,
wherein the rubber component further contains natural rubber and polybutadiene rubber,
wherein the rubber component contains, based on 100% by mass of the rubber component, 5 to 60% by mass of natural rubber,
wherein the rubber component contains, based on 100% by mass of the rubber component, 5 to 60% by mass of polybutadiene rubber,
wherein the liquid resin is at least one selected from the group consisting of liquid coumarone-indene resin, liquid indene resin, liquid α-methylstyrene resin, and liquid polyisopentane resin,
wherein an amount of the liquid resin is 1 to 60 parts by mass per 100 parts by mass of the rubber component, and
an amount of the silica is 5 to 150 parts by mass per 100 parts by mass of the rubber component,

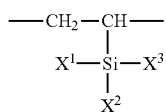
(I)

wherein $X^1$, $X^2$, and $X^3$ each independently represent, a hydroxyl group or a $C_{1-4}$ alkyl group, and two of $X^1$, $X^2$, and $X^3$ are hydroxyl groups;

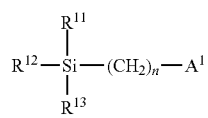
(II)

wherein n represents an integer of 1 to 10; $R^{11}$, $R^{12}$, and $R^{13}$ each independently represent a $C_{1-4}$ alkyl group or a $C_{1-4}$ alkoxy group, and at least one of $R^{11}$, $R^{12}$, or $R^{13}$ is an alkoxy group; and $A^1$ is a group represented by the formula (IIa):

(IIa)

wherein $R^{14}$ and $R^{15}$ each independently represent a $C_{1-6}$ alkyl group, a $C_{1-6}$ alkylene oxide group, a $C_{1-6}$ alkylene oxide alkyl group, or a $C_{1-6}$ trialkylsilyl group;

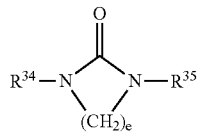
(IIIa-2)

wherein e represents an integer of 2 to 7, and $R^{34}$ and $R^{35}$ each independently represent a $C_{1-20}$ alkyl group;

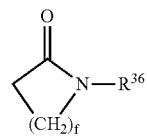
(IIIa-3)

wherein f represents an integer of 2 to 7, and $R^{36}$ represents a $C_{1-20}$ alkyl or aryl group;

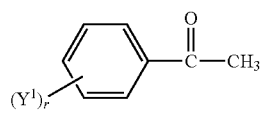
(IIIb-1-1)

wherein r represents an integer of 1 or 2; and $Y^1$ represents a dialkylamino group, an imidazolyl group, or a morpholino group, and when a plurality of $Y^1$'s are present, the plurality of $Y^1$'s may be the same as or different from one another;

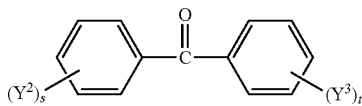
(IIIb-1-2)

wherein s represents an integer of 1 or 2; t represents an integer of 0 to 2; $Y^2$ and $Y^3$ each represent a dialkylamino group, an imidazolyl group, or a morpholino group, and when a plurality of $Y^2$'s are present, the plurality of $Y^2$'s may be the same as or different from one another, and when a plurality of $Y^3$'s are present, the plurality of $Y^3$'s may be the same as or different from one another;

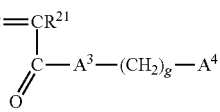
(IV)

wherein g represents an integer of 1 to 10; $R^{21}$ represents a hydrogen atom, a $C_{1-6}$ alkyl group, or a $C_{1-6}$ alkoxyalkyl group; $A^3$ represents the following group: —$NR^{22}$— where $R^{22}$ represents a hydrogen atom or a $C_{1-4}$ alkyl group; and $A^4$ is a group represented by the formula (IVa):

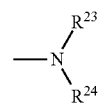
(IVa)

wherein $R^{23}$ and $R^{24}$ each independently represent a $C_{1-6}$ alkyl group, a $C_{1-6}$ alkylene oxide group, a $C_{1-6}$ alkylene oxide alkyl group, or a $C_{1-6}$ trialkylsilyl group;

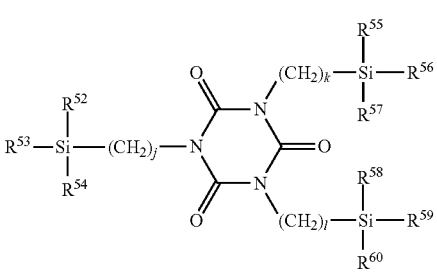
(Va-2)

wherein j, k, and l each independently represent an integer of 1 to 10; and $R^{52}$ to $R^{60}$ each independently represent a $C_{1-4}$ alkyl group or a $C_{1-4}$ alkoxy group, at least one of $R^{52}$, $R^{53}$, and $R^{54}$ is an alkoxy group, at least one of $R^{55}$, $R^{56}$, and $R^{57}$ is an alkoxy group, and at least one of $R^{58}$, $R^{59}$, and $R^{60}$ is an alkoxy group;

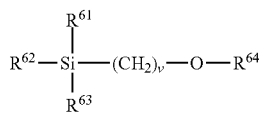
(VIa)

wherein v represents an integer of 1 to 10; $R^{61}$, $R^{62}$, and $R^{63}$ each independently represent a $C_{1-4}$ alkyl group or a $C_{1-4}$ alkoxy group, and at least one of $R^{61}$, $R^{62}$, and $R^{63}$ is an alkoxy group; and $R^{64}$ represents a $C_{1-10}$ alkyl group;

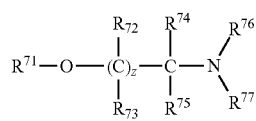
(VII-1)

wherein z represents an integer of 0 to 10; $R^{71}$ represents a $C_{1-5}$ alkyl group; $R^{72}$, $R^{73}$, $R^{74}$ and $R^{75}$ each independently represent a hydrogen atom, a $C_{1-5}$ alkyl group, a $C_{1-5}$ alkoxyalkyl group, or a $C_{1-5}$ alkoxy group, and when a plurality of $R^{72}$'s and a plurality of $R^{73}$'s are present, the plurality of $R^{72}$'s and the plurality of $R^{73}$'s may be the same as or different from one another; and $R^{76}$ and $R^{77}$ each independently represent a $C_{1-6}$ alkyl group.

2. The rubber composition according to claim 1, wherein one of $R^{74}$ and $R^{75}$ in formula (VII-1) is a hydrogen atom.

3. The rubber composition according to claim 1, wherein the conjugated diene polymer has a vinyl bond content of at least 10 mol % but not more than 80 mol % per 100 mol % of the constituent unit based on 1,3-butadiene.

4. The rubber composition according to claim 1, wherein the silica has a nitrogen adsorption specific surface area of 40 to 400 m$^2$/g.

5. The rubber composition according to claim 1, which is for use as a rubber composition for a tread.

6. A pneumatic tire, produced using the rubber composition according to claim 1.

* * * * *